US009748566B2

(12) United States Patent
Kawakami et al.

(10) Patent No.: US 9,748,566 B2
(45) Date of Patent: Aug. 29, 2017

(54) LITHIUM-ION SECONDARY BATTERY AND ELECTRONIC DEVICE

(71) Applicant: SEMICONDUCTOR ENERGY LABORATORY CO., LTD., Atsugi-shi, Kanagawa-ken (JP)

(72) Inventors: Takahiro Kawakami, Kanagawa (JP); Tatsuya Ikenuma, Kanagawa (JP); Teruaki Ochiai, Kanagawa (JP); Shuhei Yoshitomi, Kanagawa (JP); Mako Motoyoshi, Kanagawa (JP); Hiroyuki Miyake, Kanagawa (JP); Yohei Momma, Kanagawa (JP); Takuya Hirohashi, Kanagawa (JP); Satoshi Seo, Kanagawa (JP)

( * ) Notice: Subject to any disclaimer, the term of this patent is extended or adjusted under 35 U.S.C. 154(b) by 0 days.

(21) Appl. No.: 14/704,508

(22) Filed: May 5, 2015

(65) Prior Publication Data

US 2015/0325855 A1   Nov. 12, 2015

(30) Foreign Application Priority Data

May 9, 2014  (JP) ................. 2014-097946
May 21, 2014  (JP) ................. 2014-105515
Oct. 28, 2014  (JP) ................. 2014-219383

(51) Int. Cl.
*H01M 4/36* (2006.01)
*H01M 4/485* (2010.01)
(Continued)

(52) U.S. Cl.
CPC ............ *H01M 4/485* (2013.01); *G04G 21/00* (2013.01); *G06F 1/16* (2013.01); *G06F 1/163* (2013.01);
(Continued)

(58) Field of Classification Search
CPC ......... G06F 1/16; H01M 4/366; H01M 4/505; H01M 4/525; H01M 4/625; H01M 10/052; H01M 4/483; H01M 4/623; Y02E 60/122
See application file for complete search history.

(56) References Cited

U.S. PATENT DOCUMENTS

| 4,302,518 A | 11/1981 | Goodenough et al. |
|---|---|---|
| 4,668,595 A | 5/1987 | Yoshino et al. |

(Continued)

FOREIGN PATENT DOCUMENTS

| CN | 103339767 A | 10/2013 |
|---|---|---|
| CN | 104067435 A | 9/2014 |

(Continued)

OTHER PUBLICATIONS

International Search Report (Application No. PCT/IB2015/053041) Dated Sep. 1, 2015.

(Continued)

*Primary Examiner* — Mark F Huff
*Assistant Examiner* — Monique Wills
(74) *Attorney, Agent, or Firm* — Nixon Peabody LLP; Jeffrey L. Costellia

(57) ABSTRACT

A lithium-ion secondary battery with high capacity is provided. Alternatively, a lithium-ion secondary battery with improved cycle characteristics is provided. To achieve this, an active material including a particle having a cleavage plane and a layer containing carbon covering at least part of the cleavage plane is provided. The particle having the cleavage plane contains lithium, manganese, nickel, and oxygen. The layer containing carbon preferably contains graphene. When a lithium-ion secondary battery is fabricated using an electrode including the particle having the cleavage plane at least part of which is covered with the (Continued)

layer containing carbon as an active material, the discharge capacity can be increased and the cycle characteristics can be improved.

20 Claims, 51 Drawing Sheets

(51) Int. Cl.
    *H01M 4/48*     (2010.01)
    *H01M 4/62*     (2006.01)
    *H01M 4/583*     (2010.01)
    *G06F 1/16*     (2006.01)
    *H01M 4/505*     (2010.01)
    *G04G 21/00*     (2010.01)
    *H01M 4/525*     (2010.01)
    *H01M 10/052*     (2010.01)

(52) U.S. Cl.
    CPC .......... *G06F 1/1626* (2013.01); *G06F 1/1635* (2013.01); *G06F 1/1652* (2013.01); *H01M 4/483* (2013.01); *H01M 4/505* (2013.01); *H01M 4/583* (2013.01); *H01M 4/623* (2013.01); *H01M 4/625* (2013.01); *H01M 4/366* (2013.01); *H01M 4/525* (2013.01); *H01M 10/052* (2013.01); *H01M 2220/30* (2013.01)

(56) References Cited

U.S. PATENT DOCUMENTS

| | | | |
|---|---|---|---|
| 5,443,929 A | 8/1995 | Yamamoto et al. | |
| 5,783,333 A | 7/1998 | Mayer | |
| 5,834,139 A | 11/1998 | Shodai et al. | |
| 5,871,866 A | 2/1999 | Barker et al. | |
| 5,910,382 A | 6/1999 | Goodenough et al. | |
| 6,085,015 A | 7/2000 | Armand et al. | |
| 6,514,640 B1 | 2/2003 | Armand et al. | |
| 7,393,476 B2 | 7/2008 | Shiozaki et al. | |
| 8,557,440 B2 | 10/2013 | Yu et al. | |
| 2001/0010807 A1 | 8/2001 | Matsubara | |
| 2002/0164156 A1* | 11/2002 | Bilbrey .................. | H04N 5/76 386/248 |
| 2002/0195591 A1 | 12/2002 | Ravet et al. | |
| 2004/0234857 A1 | 11/2004 | Shiozaki et al. | |
| 2006/0051671 A1 | 3/2006 | Thackeray et al. | |
| 2006/0121352 A1 | 6/2006 | Kejha et al. | |
| 2007/0026315 A1 | 2/2007 | Lampe-Onnerud et al. | |
| 2007/0099086 A1 | 5/2007 | Kang et al. | |
| 2007/0122712 A1 | 5/2007 | Kang et al. | |
| 2007/0160906 A1 | 7/2007 | Tooyama et al. | |
| 2007/0212609 A1 | 9/2007 | Iwami | |
| 2009/0087731 A1 | 4/2009 | Fukui et al. | |
| 2009/0123813 A1 | 5/2009 | Chiang et al. | |
| 2009/0220862 A1 | 9/2009 | Toyama et al. | |
| 2010/0159330 A1* | 6/2010 | Sugiura ................. | H01M 4/131 429/231.4 |
| 2010/0233542 A1 | 9/2010 | Endo et al. | |
| 2011/0229757 A1 | 9/2011 | Kawakami et al. | |
| 2012/0328951 A1* | 12/2012 | Hirohashi .............. | B82Y 30/00 429/231.7 |
| 2013/0177806 A1* | 7/2013 | Caldwell ............... | H01M 4/366 429/212 |
| 2013/0189585 A1 | 7/2013 | Kang et al. | |
| 2013/0316237 A1 | 11/2013 | Miki | |
| 2014/0023920 A1* | 1/2014 | Yamazaki ............. | H01M 4/133 429/211 |
| 2014/0332715 A1 | 11/2014 | Kawakami et al. | |
| 2015/0014581 A1 | 1/2015 | Kawakami et al. | |
| 2015/0014605 A1 | 1/2015 | Kawakami et al. | |
| 2015/0099179 A1 | 4/2015 | Kawakami et al. | |

FOREIGN PATENT DOCUMENTS

| | | |
|---|---|---|
| JP | 08-037007 A | 2/1996 |
| JP | 11-025983 | 1/1999 |
| JP | 2008-166156 A | 7/2008 |
| JP | 2015-082374 A | 4/2015 |
| KR | 10-0728783 | 6/2007 |
| KR | 2007-0056875 A | 6/2007 |
| WO | WO-2012/105009 | 8/2012 |
| WO | WO-2013/108396 | 7/2013 |

OTHER PUBLICATIONS

Written Opinion (Application No. PCT/IB2015/053041) Dated Sep. 1, 2015.
M. Thackeray et al., "$Li_2MnO_3$-stabilized $LiMO_2$ (M=Mn, Ni, Co) electrodes for lithium-ion batteries", *J. Mater. Chem.*, 2007, vol. 17, Issue 30, pp. 3112-3125.

* cited by examiner

FIG. 14A
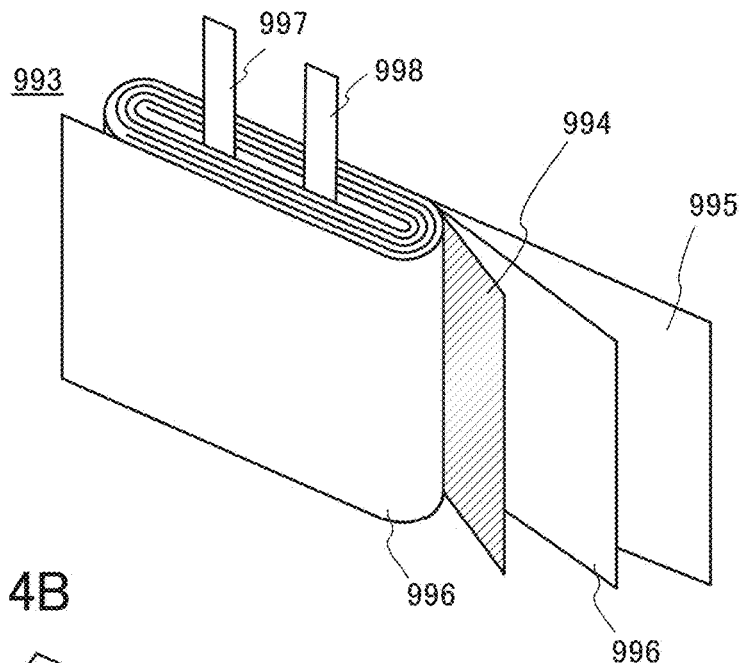
FIG. 14B
FIG. 14C
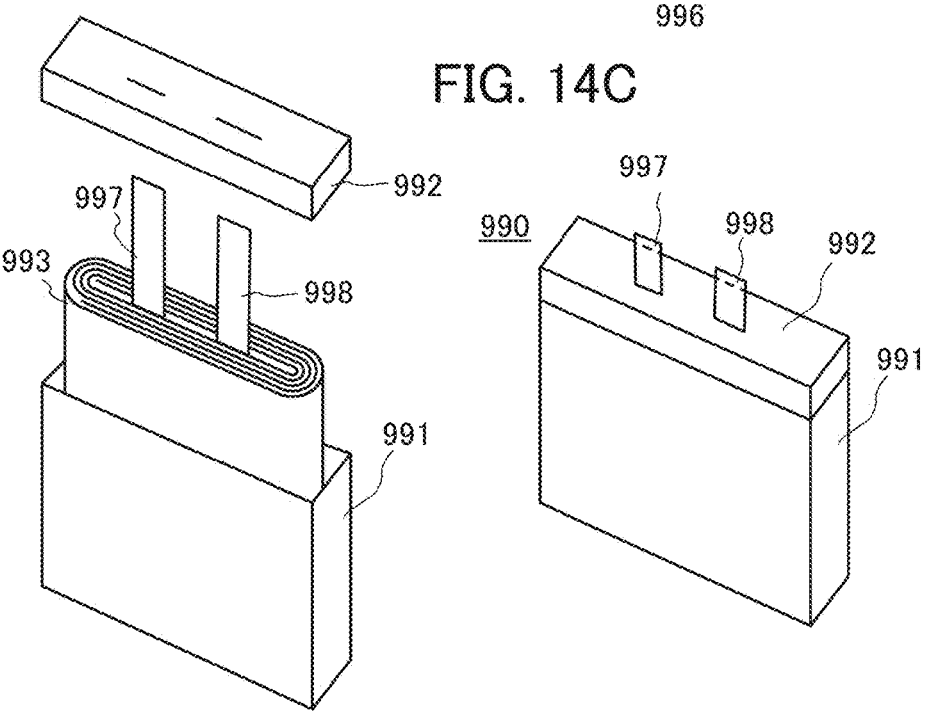

FIG. 16A1
FIG. 16A2
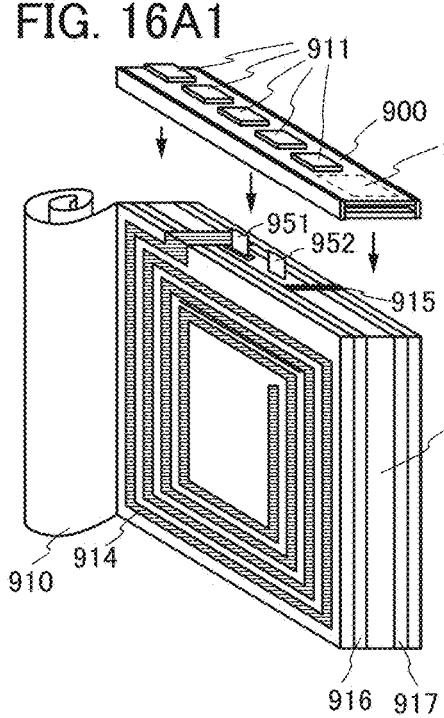
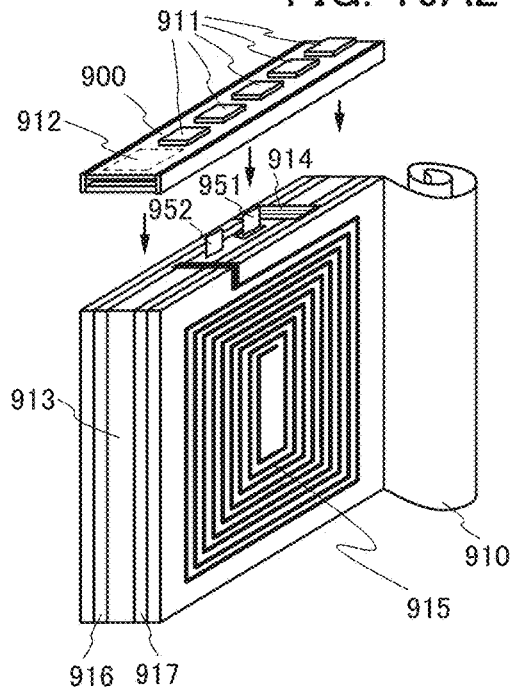
FIG. 16B1
FIG. 16B2
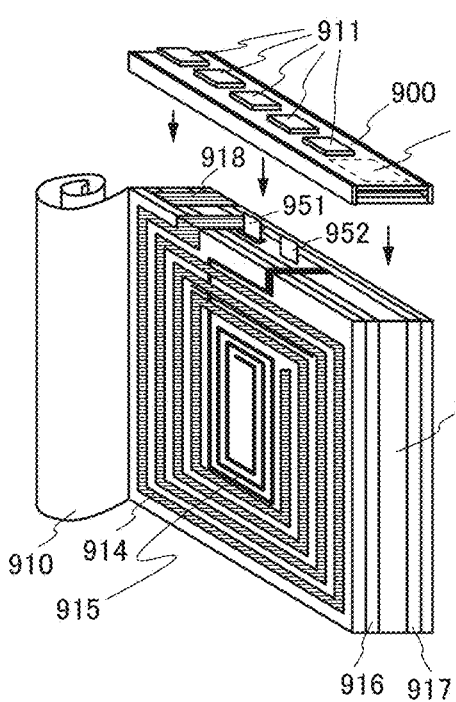
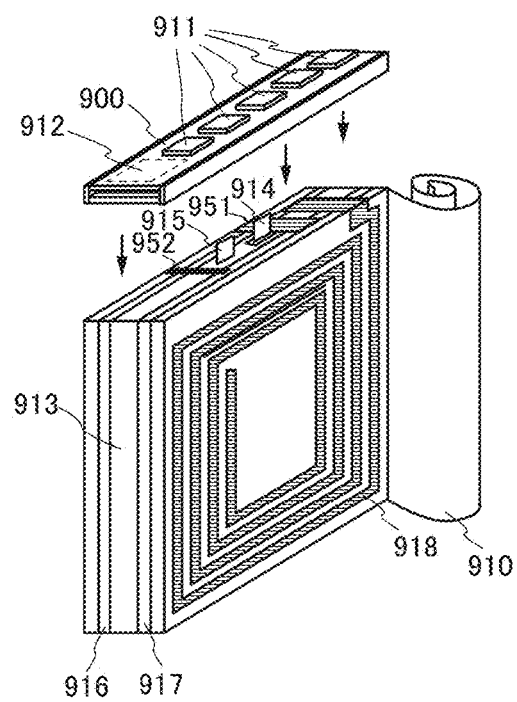

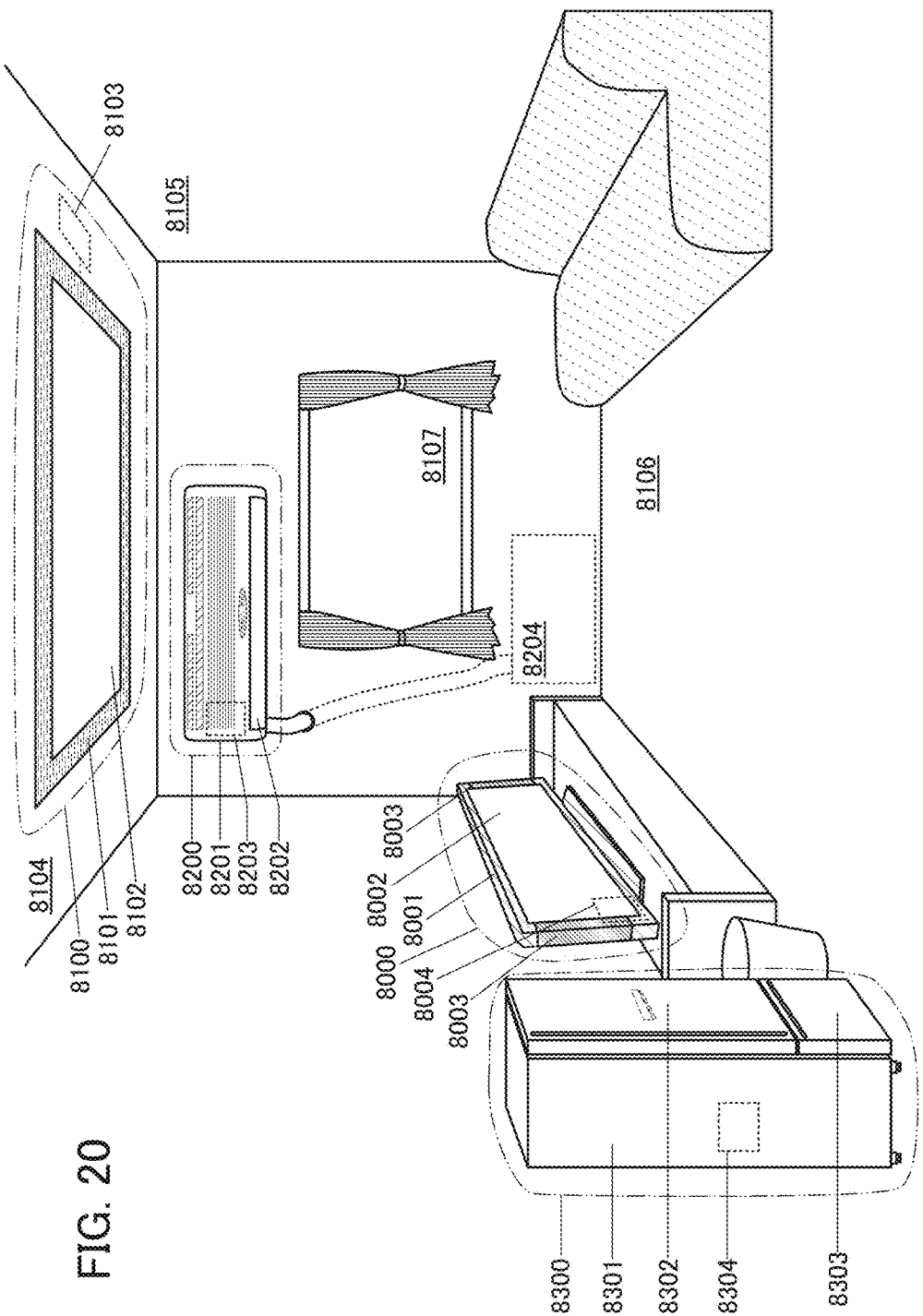

Measured value
a: R=8.2mm ⇒ d=0.232nm
b: R=10.4mm ⇒ d=0.183nm
c: R=4.2mm ⇒ d=0.453nm ∠aob=21.8°
∠aoc=71.3°
∠boc=50.5°

Li2MnO3(84-1634)
[010] direction
 (200): d=0.233nm
 (201): d=0.185nm
 (001): d=0.474nm ∠aob=21.6°
∠aoc=70.5°
∠boc=48.8°

Li2MnO3(84-1634)
[013] direction
 (13-1): d=0.233nm
 (23-1): d=0.185nm
 (100): d=0.465nm ∠aob=21.9°
∠aoc=70.3°
∠boc=48.3°

* Current density per active material weight of 30mA/g

* Current density per active material weight of 30mA/g

Measured value
OA: d = 0.479nm
OB: d = 0.368nm
OC: d = 0.399nm
∠AOB = 60.3°
∠AOC = 107.7°
∠BOC = 47.4°

Li2MnO3(84-1634)
OA: ( 0 0 1) → 0.474nm
OB: (-1 1 1) → 0.367nm
OC: (-1 1 0) → 0.408nm
∠AOB = 59.2°
∠AOC = 107.0°
∠BOC = 47.8°

Incident on [110] direction

LITHIUM-ION SECONDARY BATTERY AND ELECTRONIC DEVICE

TECHNICAL FIELD

The present invention relates to an object, a method, or a manufacturing method. The present invention relates to a process, a machine, manufacture, or a composition of matter. In particular, one embodiment of the present invention relates to a semiconductor device, a display device, a light-emitting device, a power storage device, a storage device, a driving method thereof, or a manufacturing method thereof. In particular, one embodiment of the present invention relates to a structure of a secondary battery and a method for manufacturing the secondary battery. One embodiment of the present invention particularly relates to a positive electrode active material of a lithium-ion secondary battery.

BACKGROUND ART

In recent years, portable electronic devices such as smartphones and tablets have spread rapidly. Also with growing interest in the environment, hybrid cars and electric cars have attracted attention, thereby increasing the importance of secondary batteries. Examples of the secondary batteries include a nickel-metal hydride battery, a lead-acid battery, and a lithium-ion secondary battery. In particular, lithium-ion secondary batteries have been actively developed because the capacity thereof can be increased and the size thereof can be reduced.

A basic secondary battery includes a positive electrode, a negative electrode, and an electrolyte (an electrolyte solution or a solid electrolyte) provided therebetween. Typically, the positive electrode and the negative electrode each include a current collector and an active material layer provided over the current collector. In the case of a lithium-ion secondary battery, a material capable of receiving and releasing lithium ions is used as an active material for a positive electrode and a negative electrode.

As examples of positive electrode active materials of a lithium-ion secondary battery, phosphate compounds disclosed in Patent Document 1, such as lithium iron phosphate ($LiFePO_4$), lithium manganese phosphate ($LiMnPO_4$), lithium cobalt phosphate ($LiCoPO_4$), and lithium nickel phosphate ($LiNiPO_4$), each having an olivine structure and containing lithium (Li) and iron (Fe), manganese (Mn), cobalt (Co), or nickel (Ni) are known.

REFERENCE

Patent Document

[Patent Document 1] Japanese Published Patent Application No. H11-025983

DISCLOSURE OF INVENTION

An object of one embodiment of the present invention is to provide a power storage device with high capacity. Another object of one embodiment of the present invention is to provide a power storage device with improved cycle characteristics. Another object of one embodiment of the present invention is to provide a highly reliable power storage device. Another object of one embodiment of the present invention is to provide a long-life power storage device. Another object of one embodiment of the present invention is to increase a yield of a power storage device. Another object of one embodiment of the present invention is to provide a novel power storage device, a novel electrode, a novel active material, or the like.

Note that the description of these objects does not preclude the existence of other objects. In one embodiment of the present invention, there is no need to achieve all the objects. Other objects will be apparent from and can be derived from the description of the specification, the drawings, the claims, and the like.

In one embodiment of the present invention, an active material including a particle having a cleavage plane and a layer containing carbon covering at least part of the cleavage plane of the particle is provided. The particle having the cleavage plane contains lithium, manganese, nickel, and oxygen. The layer containing carbon includes graphene. The thickness of the layer containing carbon is preferably greater than or equal to 1 nm and less than or equal to 50 nm.

The particle having the cleavage plane has a layered rock-salt crystal structure. Alternatively, the particle having the cleavage plane has a layered rock-salt crystal structure and a spinel crystal structure. The cleavage plane of the particle having a layered rock-salt crystal structure has a crystal plane of a (001) plane or a (100) plane.

An electrode including the active material of one embodiment of the present invention has a charge/discharge capacity of greater than or equal to 260 mAh/g in the first 15 cycles with an oxidation-reduction potential of Li used as a reference potential and a voltage range of higher than or equal to 2.0 V and lower than or equal to 4.8 V.

In another embodiment of the present invention, an electrode including a current collector and an active material layer containing the active material, a conductive additive, and a binder is provided.

In another embodiment of the present invention, a lithium-ion secondary battery including a first electrode containing the active material and a second electrode is provided. The first electrode is capable of operating as one of a positive electrode and a negative electrode, and the second electrode is capable of operating as the other of the positive electrode and the negative electrode.

One embodiment of the present invention can provide a power storage device with high capacity. One embodiment of the present invention can provide a power storage device with improved cycle characteristics. One embodiment of the present invention can provide a highly reliable power storage device. One embodiment of the present invention can provide a power storage device with a long lifetime.

According to one embodiment of the present invention, a yield of a power storage device can be increased. According to one embodiment of the present invention, a novel power storage device, a novel electrode, a novel active material, or the like can be provided. Note that the description of these effects does not preclude the existence of other effects. In one embodiment of the present invention, there is no need to obtain all the effects. Other effects will be apparent from and can be derived from the description of the specification, the drawings, the claims, and the like.

BRIEF DESCRIPTION OF DRAWINGS

FIGS. 14A to 14C illustrate an example of a power storage device.

FIGS. 16A1, 16A2, 16B1, and 16B2 each illustrate an example of a power storage device.

FIG. 20 illustrates examples of electronic devices.

BEST MODE FOR CARRYING OUT THE INVENTION

Figure 1:
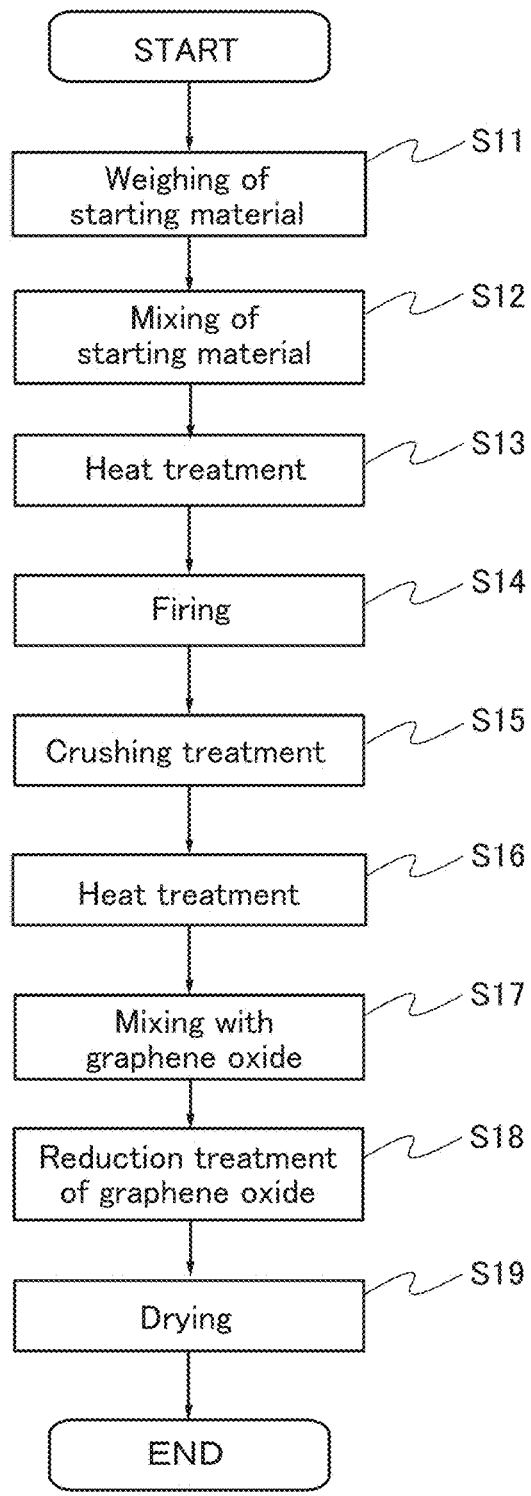
FIG. 1 is a flow chart illustrating a method for forming an active material.

Embodiments and examples of the present invention will be described below in detail with reference to the drawings. However, the present invention is not limited to the description below, and it is easily understood by those skilled in the art that modes and details disclosed herein can be modified in various ways. Furthermore, the present invention is not construed as being limited to the description of the embodiments and examples.

Embodiment 1

In this embodiment, an active material of one embodiment of the present invention and a formation method thereof will be described with reference to FIG. 1 and FIGS. 2A to 2C.

An active material of one embodiment of the present invention includes a particle having a cleavage plane and a layer containing carbon covering at least part of the cleavage plane. The particle having the cleavage plane contains at least lithium, manganese, and oxygen. The particle having the cleavage plane may further contain at least one element selected from chromium, cobalt, aluminum, nickel, iron, magnesium, molybdenum, zinc, indium, gallium, copper, titanium, niobium, silicon, phosphorus, and the like.

Note that an active material generally refers only to a material that relates to intercalation and deintercalation of ions functioning as carriers; however, an active material described in this specification and the like also includes a layer containing carbon that covers a general "active material."

In this specification and the like, "cleavage" means cracking of a crystal along a specific direction, a "cleavage plane"

refers to a crystal plane made by cleavage, and a "cleavage property" means a property of easy cracking along a specific direction.

An example of the particle having the cleavage plane is a lithium-manganese composite oxide represented by a composition formula $Li_xMn_yM_zO_w$. Thus, the lithium-manganese composite oxide represented by the composition formula $Li_xMn_yM_zO_w$ will be described as an active material in this embodiment. Here, the element M is preferably silicon, phosphorus, or a metal element other than lithium and manganese. Furthermore, it is preferable that $0 \leq x/(y+z) < 2$, $z > 0$, and $0.26 \leq (y+z)/w < 0.5$ be satisfied. Note that the lithium-manganese composite oxide is an oxide containing at least lithium and manganese, and may contain at least one selected from chromium, cobalt, aluminum, nickel, iron, magnesium, molybdenum, zinc, indium, gallium, copper, titanium, niobium, silicon, phosphorus, and the like. The lithium-manganese composite oxide preferably has a layered rock-salt crystal structure. The lithium-manganese composite oxide may have a layered rock-salt crystal structure and a spinel crystal structure. The average particle diameter of the lithium-manganese composite oxides is preferably greater than or equal to 5 nm and less than or equal to 50 μm, for example.

Note that a "layered rock-salt crystal structure" in this specification and the like refers to a crystal structure in which a lithium layer and a layer containing lithium and a metal are alternately stacked with an oxygen layer provided therebetween, that is, a crystal structure in which a layer containing a metal ion and lithium and a lithium layer are alternately stacked with an oxide ion provided therebetween.

A synthesis method of the lithium-manganese composite oxide represented by the composition formula $Li_xMn_yM_zO_w$ will be described.

A manganese compound and a lithium compound can be used as raw materials of the lithium-manganese composite oxide. In addition to the manganese compound and the lithium compound, a compound containing at least one selected from chromium, cobalt, aluminum, nickel, iron, magnesium, molybdenum, zinc, indium, gallium, copper, titanium, niobium, silicon, phosphorus, and the like can be used as a raw material. Examples of the manganese compound are manganese dioxide, manganese sesquioxide, trimanganese tetroxide, hydrous manganese oxide, manganese carbonate, and manganese nitrate. Examples of the lithium compound are lithium hydroxide, lithium carbonate, and lithium nitrate.

In this embodiment, $MnCO_3$ (manganese compound), $Li_2CO_3$ (lithium compound), and NiO are used as starting materials.

First, $Li_2CO_3$, $MnCO_3$, and NiO are each weighed as a starting material as shown in Step S11 in FIG. 1.

In the case where $Li_2CO_3$, $MnCO_3$, and NiO are used as starting materials at a ratio for weighing (molar ratio) of 1:0.7:0.3, for example, a lithium-manganese composite oxide $Li_2Mn_{0.7}Ni_{0.3}O_3$ is formed as a final product. In this case, the atomic ratio of Li to (Mn+Ni) in the lithium-manganese composite oxide is 2:1.

In one embodiment of the present invention, the ratio for weighing (molar ratio) of the starting materials is adjusted so that the atomic ratio of Li to (Mn+Ni) in the lithium-manganese composite oxide becomes slightly different from 2:1.

In this embodiment, the starting materials are weighed so that the ratio for weighing (molar ratio) of $Li_2CO_3$ to $MnCO_3$ and NiO becomes 0.84:0.8062:0.318.

Next, $Li_2CO_3$, $MnCO_3$, and NiO are mixed as shown in Step S12 in FIG. 1. There is no particular limitation on a method for mixing the starting materials, and a known crusher or a known mill such as a ball mill, a bead mill, a jet mill, or a roller mill can be used. A crushing and grinding method may be a dry method or a wet method. There is no particular limitation on a solvent that is used in a wet method, and water, alcohol, or acetone can be used as the solvent, for example.

When the starting materials are mixed by a wet method, heat treatment shown in Step S13 in FIG. 1 for evaporating a solvent contained in the mixed starting materials is performed. The heat treatment is performed at higher than or equal to 50° C. and lower than or equal to 150° C. The solvent used when the starting materials are crushed and grinded is evaporated by the heat treatment, whereby a mixed material is obtained.

Then, the mixed material is put in a crucible and firing shown in Step S14 in FIG. 1 is performed at higher than or equal to 800° C. and lower than or equal to 1000° C. The firing is performed for longer than or equal to 5 hours and shorter than or equal to 20 hours in an air gas (dry air) at a flow rate of 10 L/min, for example. The firing atmosphere may be an air atmosphere or an atmosphere containing an oxygen gas. Owing to the firing of the mixed material, primary particles (lithium-manganese composite oxides) are formed and the primary particles are sintered to be a large secondary particle.

Figure 2A:
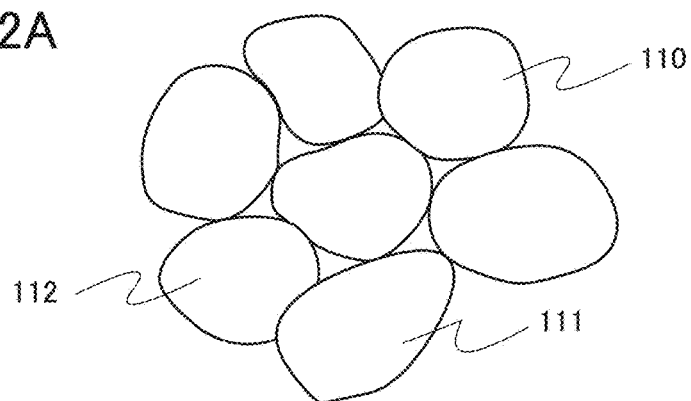
FIG. 2A is a schematic diagram of sintered lithium-manganese composite oxides.

FIG. 2A illustrates a large secondary particle in which a plurality of primary particles 110 to 112 are sintered.

Next, crushing treatment shown in Step S15 in FIG. 1 is performed on the large secondary particle in which a plurality of primary particles are sintered, so that the large secondary particle is crushed into the primary particles or powder of particles as small as the primary particles. The crushing treatment in this specification and the like includes an operation of grinding the primary particles. Note that grinding means further crushing of the primary particles. As in the case of mixing the starting materials, a known crusher or a known mill can be used for the crushing treatment. A crushing and grinding method may be a dry method or a wet method. There is no particular limitation on a solvent that is used in a wet method, and water, alcohol, or acetone can be used as the solvent, for example. The large secondary particle in which a plurality of primary particles are sintered is preferably subjected to the crushing treatment because the specific surface area of the particles is increased after the crushing treatment.

In this embodiment, the crushing treatment of the large secondary particle in which a plurality of primary particles are sintered is performed with a bead mill by a wet method using acetone.

When the crushing treatment is performed by a wet method, heat treatment for evaporating a solvent is performed after the crushing treatment. The heat treatment may be performed in a manner similar to that of the heat treatment in Step S13. After that, vacuum drying is performed, whereby powdery lithium-manganese composite oxide is obtained.

The crystallinity of the lithium-manganese composite oxide subjected to the crushing treatment might be disordered by the impact of the crushing treatment. In addition, oxygen vacancies might be formed in the lithium-manganese composite oxide. Thus, heat treatment is preferably performed on the powdery lithium-manganese composite oxide subjected to the vacuum drying.

The heat treatment shown in Step S16 in FIG. 1 is performed in the following manner: the lithium-manganese composite oxides subjected to the crushing treatment are put in a crucible and heated at higher than or equal to 300° C. and lower than or equal to 1000° C., preferably higher than or equal to 600° C. and lower than or equal to 900° C. The heat treatment is performed for longer than or equal to 5 hours and shorter than or equal to 20 hours in an air gas (dry air) at a flow rate of 10 L/min, for example. The atmosphere may be an air atmosphere or an atmosphere containing an oxygen gas.

The heat treatment performed on the lithium-manganese composite oxides subjected to the crushing treatment can repair oxygen vacancies and compensate the crystal disorder caused by the impact of the crushing treatment. Note that another crushing treatment may be performed on the powdery lithium-manganese composite oxide subjected to the heat treatment, in which case the crushing treatment can be performed in a manner similar to that of the crushing treatment in Step S15 in FIG. 1.

Through the above steps, the lithium-manganese composite oxide represented by the composition formula $Li_xMn_yM_zO_w$ can be formed. In this embodiment, the raw materials are weighed so that the ratio for weighing (molar ratio) of $Li_2CO_3$ to $MnCO_3$ and NiO becomes 0.84:0.8062:0.318, whereby a lithium-manganese composite oxide represented by a composition formula $Li_{1.68}Mn_{0.8062}M_{0.318}O_3$ can be formed.

The atomic ratio of Li to (Mn+Ni) in the lithium-manganese composite oxide described in this embodiment is adjusted to be slightly different from 2:1. Thus, voltage and discharge capacity are large as compared with the case where a lithium-manganese composite oxide whose atomic ratio of Li to (Mn+Ni) is 2:1 is used for an electrode.

Figure 2B:
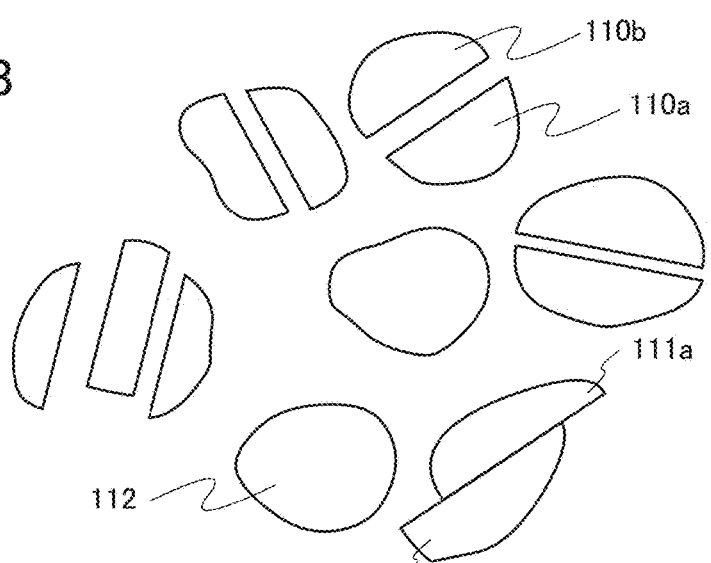
FIG. 2B is a schematic diagram of cleaved lithium-manganese composite oxides.

In a method for forming the lithium-manganese composite oxide, a crushing step of a secondary particle in which primary particles are sintered is important because the step influences the characteristics of a battery. In the crushing step, a shear (grinding stress) is applied to the secondary particle in which the primary particles are sintered, whereby a powdery lithium-manganese composite oxide is formed. In the case where the lithium-manganese composite oxide has a layered rock-salt crystal structure, a primary particle might be cleaved and cracked along a plane parallel or perpendicular to the layer at this time. The cleaved and cracked primary particle is called a particle having a cleavage plane or a particle with a cleavage plane exposed, in this specification and the like. Note that some primary particles do not have a cleavage plane. FIG. 2B illustrates particles 110a and 110b into which the primary particle 110 is cleaved, and particles 111a and 111b into which the primary particle 111 is cleaved.

An active material having a cleavage property, such as the lithium-manganese composite oxide having a layered rock-salt crystal structure, might be cracked not only in the crushing step but also in a formation process of an electrode because a pressure is applied to an active material layer when the electrode is pressurized.

When a wound battery is formed, a great stress is caused at the time of winding an electrode. Even when a wound body of the electrode is stored in a housing, the active material might be further cracked because an outward stress from an axis of winding is caused all the time.

Such cleavage and cracking of the active material cause a decrease in the discharge capacity and cycle characteristics of a battery.

Thus, in one embodiment of the present invention, a layer containing carbon is provided on at least part of a cleavage plane of a lithium-manganese composite oxide. The layer containing carbon may cover the entire cleavage plane or the whole lithium-manganese composite oxide having a cleavage plane.

It is preferred to use graphene as the layer containing carbon. Graphene has excellent electrical characteristics of high conductivity and excellent physical properties of high flexibility and high mechanical strength.

Note that graphene in this specification includes single-layer graphene and multilayer graphene including two to hundred layers. Single-layer graphene refers to a one-atom-thick sheet of carbon molecules having π bonds. Graphene oxide refers to a compound formed by oxidation of such graphene. When graphene oxide is reduced to give graphene, oxygen contained in the graphene oxide is not entirely deintercalated and part of the oxygen remains in graphene. When graphene contains oxygen, the proportion of oxygen measured by XPS is higher than or equal to 2 atomic % and lower than or equal to 20 atomic %, preferably higher than or equal to 3 atomic % and lower than or equal to 15 atomic %.

The thickness of the layer containing carbon provided on at least part of a cleavage plane of the lithium-manganese composite oxide is preferably greater than or equal to 1 nm and less than or equal to 50 nm.

The lithium-manganese composite oxide has a layered rock-salt crystal structure. Alternatively, the lithium-manganese composite oxide of one embodiment of the present invention has a layered rock-salt crystal structure and a spinel crystal structure.

The present inventors have found that a cleavage plane of the lithium-manganese composite oxide having a layered rock-salt crystal structure has a crystal plane of a (001) plane, a (00-1) plane, a (100) plane, a (-100) plane, a (010) plane, a (0-10) plane, a (021) plane, a (02-1) plane, a (0-21) plane, or a (0-2-1) plane. Thus, the layer containing carbon is preferably provided so as to be in contact with the cleavage plane of the lithium-manganese composite oxide having a crystal plane of the (001) plane, the (00-1) plane, the (100) plane, the (-100) plane, the (010) plane, the (0-10) plane, the (021) plane, the (02-1) plane, the (0-21) plane, or the (0-2-1) plane.

Next, a method for providing the layer containing carbon on the lithium-manganese composite oxide will be described. In this embodiment, reduced graphene oxide (RGO) obtained by reducing graphene oxide (GO) is used as the layer containing carbon.

Various synthesis methods such as a Hummers method, a modified Hummers method, and oxidation of graphite can be used to form graphene oxide.

For example, in a Hummers method, graphite such as flake graphite is oxidized to give graphite oxide. The obtained graphite oxide is graphite that is oxidized in places and thus to which a functional group such as a carbonyl group, a carboxyl group, or a hydroxyl group is bonded. In the graphite oxide, the crystallinity of the graphite is lost and the distance between layers is increased. Therefore, graphene oxide can be easily obtained by separation of the layers from each other by ultrasonic treatment or the like.

The length of one side (also referred to as a flake size) of the graphene oxide is greater than or equal to 50 nm and less than or equal to 100 μm, preferably greater than or equal to 800 nm and less than or equal to 20 μm. It is preferable that the flake size be as large as possible to cover surfaces of the lithium-manganese composite oxides with ease.

First, graphene oxide and water are put in a mixer to form a dispersion solution of graphene oxide. At this time, graphene oxide at greater than or equal to 0.5 wt % and less than or equal to 5 wt % is preferably used. Graphene oxide at less than 0.5 wt % might be insufficient to cover the surfaces of the lithium-manganese composite oxides, whereas graphene oxide at greater than 5 wt % causes an increase in the volume and weight of the electrode.

Next, the lithium-manganese composite oxides are put in the dispersion solution and kneading is performed as shown in Step S17 in FIG. 1. Note that kneading means mixing something until it has a high viscosity. The kneading can separate aggregation of lithium manganese composite oxide powder; thus, the graphene oxide and the lithium manganese composite oxides can be uniformly dispersed.

Then, the mixture of the graphene oxide and the lithium-manganese composite oxides is dried under reduced pressure in a bell jar and then is ground in a mortar, so that the lithium manganese composite oxides covered with graphene oxide is obtained.

Subsequently, reduction treatment is performed on the graphene oxide covering the surfaces of the lithium-manganese composite oxides as shown in Step S18 in FIG. 1. The reduction treatment of the graphene oxide may be performed by heat treatment or by causing a reaction in a solvent containing a reducing agent. In this embodiment, the graphene oxide is made to react in a solvent containing a reducing agent.

When the graphene oxide is made to react in the solvent containing the reducing agent, the graphene oxide covering the surfaces of the lithium-manganese composite oxides is reduced to give graphene. Note that oxygen in graphene oxide is not necessarily entirely deintercalated and may remain partly in the graphene. In the case where graphene contains oxygen, the proportion of oxygen in the graphene measured by XPS is higher than or equal to 2 atomic % and lower than or equal to 20 atomic %, preferably higher than or equal to 3 atomic % and lower than or equal to 15 atomic %. This reduction treatment is preferably performed at temperatures of room temperature to 150° C., more preferably at temperatures of room temperature to 80° C. The reduction treatment with heating can promote the reduction reaction. The reduction time of the graphene oxide can be longer than or equal to 3 minutes and shorter than or equal to 10 hours.

Examples of the reducing agent include ascorbic acid, hydrazine, dimethyl hydrazine, hydroquinone, sodium boron hydride ($NaBH_4$), tetra butyl ammonium bromide (TBAB), lithium aluminum hydride ($LiAlH_4$), N,N-diethylhydroxylamine, and a derivative thereof. For example, ascorbic acid and hydroquinone are preferable to hydrazine and sodium tetrahydroborate in that they are safe owing to low reducing ability and utilized industrially with ease.

A polar solvent can be used as the solvent. Any material can be used for the solvent as long as it can dissolve the reducing agent. Examples of the material of the solvent include water, methanol, ethanol, acetone, tetrahydrofuran (THF), dimethylformamide (DMF), 1-methyl-2-pyrrolidone (NMP), dimethyl sulfoxide (DMSO), ethylene glycol, diethylene glycol, glycerin, and a mixed solution of any two or more of the above.

As the reducing solution containing a reducing agent and a solvent, a mixed solution of ethanol and ascorbic acid, or a mixed solution of water, ascorbic acid, and lithium hydroxide can be used. In this embodiment, a reducing solution containing ascorbic acid, water, and lithium hydroxide is used.

When the graphene oxide covering the lithium-manganese composite oxides is made to react in the reducing solution, protons of ascorbic acid are added to the graphene oxide and then $H_2O$ is released, whereby the graphene oxide is reduced. As a result, the surfaces of the lithium-manganese composite oxides are covered with graphene.

After the reduction treatment, the reducing solution is filtered and a substance is obtained. The filtration can be suction filtration or the like.

Next, the obtained substance is washed. The washing is preferably performed using a solution given as the solvent contained in the reducing solution. The solution may be the same as or different from the solvent contained in the reducing solution.

Then, the washed substance is dried as shown in Step S19 in FIG. 1. The drying step preferably has two stages: predrying and main drying.

Figure 49:
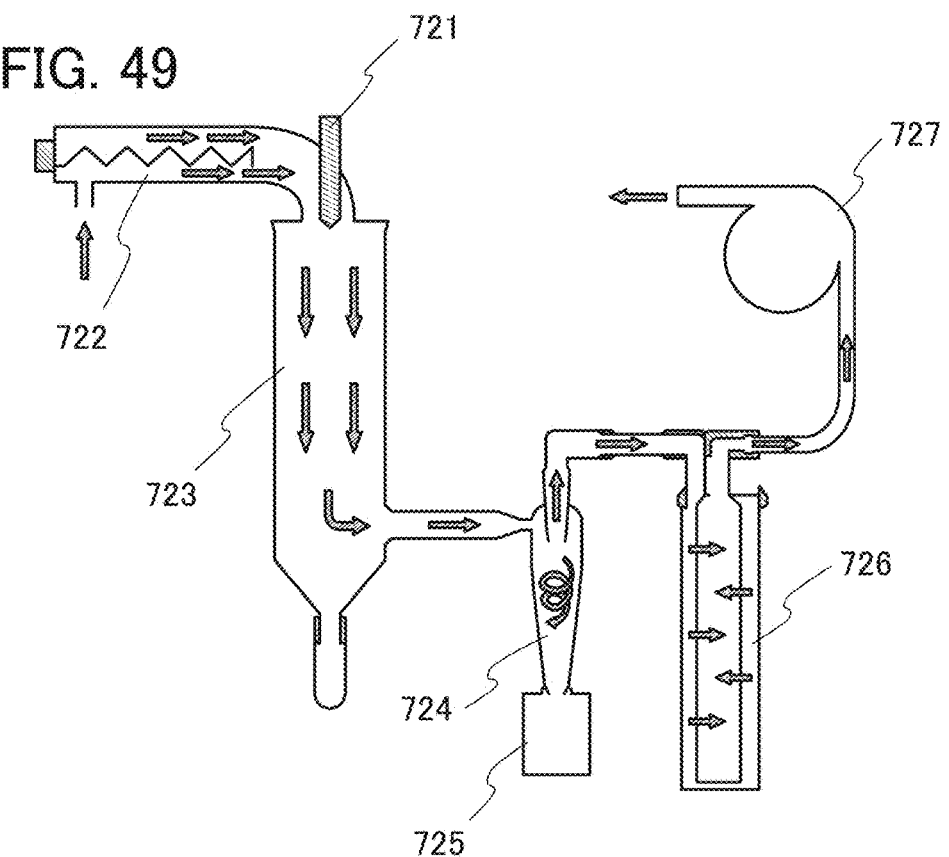
FIG. 49 illustrates a spray dryer.

The predrying is performed using a spray dryer device, for example. The spray dryer device is an apparatus which can conduct continuous drying to turn a solution into dry particles in a moment with a hot air. FIG. 49 is a schematic diagram of the spray dryer device. A solution is sprayed in the form of fine liquid drops from a two-fluid nozzle 721, is exposed to hot air blown from a heating means 722 while increasing the surface area per unit volume, and is dried in a moment in a spray cylinder 723 to be particles. Then, the particles are separated by a cyclone 724, and desired powder is collected in a container 725. A tube (not illustrated) is connected to the two-fluid nozzle 721, and the solution is transferred to the two-fluid nozzle 721 with the use of a pump. A tube made of silicone is used as the tube, for example. Reference numerals 726 and 727 represent an outlet filter that removes unnecessary powder and an aspirator that makes the flow of a gas, respectively. Note that arrows in FIG. 49 indicate the flow of a dry gas.

For example, to form dispersion liquid, pure water is added to the washed substance. The dispersion liquid is poured into the spray dryer device illustrated in FIG. 49, sprayed from the two-fluid nozzle 721, and dried in a moment in the spray cylinder 723. The drying is performed with nitrogen heated to 50° C. to 300° C. by the heating means 722, for example. Then, the particles are separated by the cyclone 724, and the desired powder is collected in the container 725.

Subsequently, main drying is performed on the powder dried in the spray dryer device. The main drying is performed under a reduced pressure (in vacuum) or in a reduction atmosphere. This drying step may be performed at temperatures of 50° C. to 300° C. for 1 hour to 48 hours, for example. The drying allows sufficient evaporation or removal of the polar solvent and moisture. The drying step can also facilitate the reduction of graphene oxide.

Although the case where the drying step includes the predrying and the main drying is described in this embodiment, one embodiment of the present invention is not limited thereto. The drying step may include at least one of the predrying and the main drying.

Figure 2C:
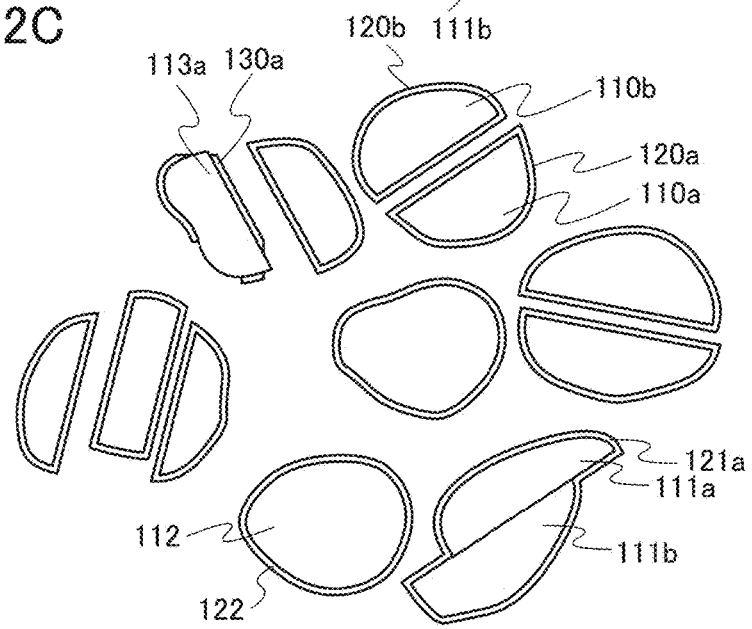
FIG. 2C is a schematic diagram of lithium-manganese composite oxides each covered with a layer containing carbon.

Through the above steps, the graphene oxide is reduced, so that graphene can be formed on the surface of the lithium manganese composite oxides. As illustrated in FIG. 2C, graphene 120a is formed so as to cover the particle 110a and graphene 120b is formed so as to cover the particle 110b. FIG. 2C illustrates some examples where graphene is provided on the entire surface of the lithium-manganese composite oxide; however, one embodiment of the present invention is not limited thereto. For example, when the primary particle 111 is cleaved to be the particles 111a and 111b and the particles 111a and 111b slide along the cleavage plane, graphene may be formed so as to collectively cover the particles 111a and 111b. In that case, graphene 121a is formed so as to cover exposed portions of the cleavage planes of the particles 111a and 111b. Furthermore, graphene 130a is provided on at least part of a cleavage plane of a particle 113a. Note that in the case where cleavage is not caused like a primary particle 112, graphene 122 may be formed so as to cover the whole of the primary particle 112.

Note that oxygen in graphene oxide is not necessarily entirely deintercalated and may remain partly in the graphene. In the case where graphene contains oxygen, the proportion of oxygen in the graphene measured by XPS is higher than or equal to 2 atomic % and lower than or equal to 20 atomic %, preferably higher than or equal to 3 atomic % and lower than or equal to 15 atomic %.

Through the above steps, an active material in which graphene is provided on at least part of a cleavage plane of the lithium-manganese composite oxide can be formed. Note that although some primary particles do not have a cleavage plane, graphene is preferably provided on surfaces of such particles.

Graphene has excellent electrical characteristics of high conductivity and excellent physical properties of high flexibility and high mechanical strength. For this reason, in a battery including an electrode containing the active material, the lithium-manganese composite oxide can be prevented from being further cleaved and cracked because of the volume change even when the lithium-manganese composite oxide repeats expansion and contraction accompanied by repeated charge and discharge of the battery.

The substance obtained through the reduction step of graphene oxide is dried using the spray dryer device, whereby the lithium-manganese composite oxides covered with graphene can become a secondary particles. As a result, the particle diameter of the active material can be greater than or equal to 1 μm and less than or equal to 50 μm.

In the active material, which includes the secondary particle obtained through the reduction step of graphene oxide and the drying step, lithium-manganese composite oxides are bound with graphene. Thus, the conductivity of the active material can be high as compared with the case where lithium-manganese composite oxides are directly bound to be a secondary particle and a surface thereof is covered with graphene. When the active material is used for an electrode, the resistance of the electrode can be reduced.

Furthermore, by making lithium-manganese composite oxides be a secondary particle, the surface area of the active material can be reduced, the compounding amount of a binder can be reduced, and the capacity per weight or per volume of the electrode can be increased.

In addition, pressure applied to the lithium-manganese composite oxides, which is due to pressure applied to the electrode in a formation process of the electrode, can be alleviated owing to the mechanical strength of graphene. This can prevent the lithium-manganese composite oxides from being further cleaved and cracked.

Moreover, even when a great stress is caused at the time of winding an electrode of a wound battery or even when an outward stress from an axis of winding is applied to the electrode all the time in the case where a wound body of the electrode is stored in a housing, the lithium-manganese composite oxides can be prevented from being further cleaved and cracked.

When the active material in which at least part of the cleavage plane is covered with graphene is used for an electrode as described above, a decrease in the voltage and discharge capacity of a battery can be prevented. Accordingly, the charge-discharge cycle characteristics of the battery can be improved. Furthermore, when the active material of one embodiment of the present invention is used for an electrode, a high-capacity power storage device having a discharge capacity per active material weight of higher than or equal to 300 mAh/g can be manufactured.

This embodiment can be implemented in combination with any of the other embodiments as appropriate.

Embodiment 2

In this embodiment, an electrode of one embodiment of the present invention and a method for forming the electrode will be described.

<Structure of Electrode>

Figure 3A:
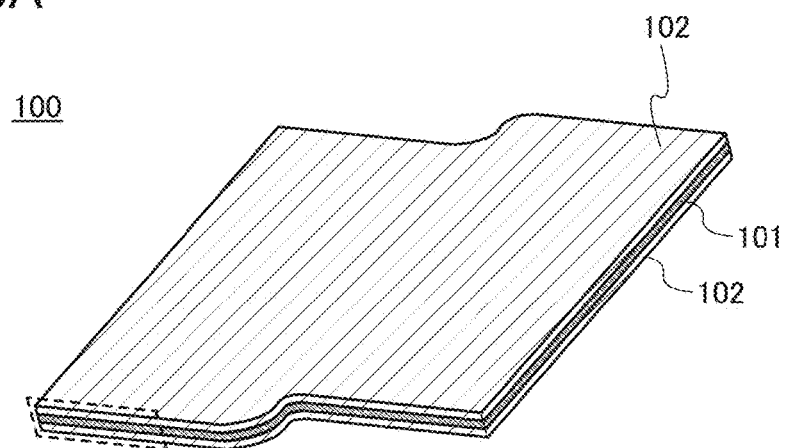
FIGS. 3A and 3B are schematic diagrams illustrating an electrode.
Figure 3B:
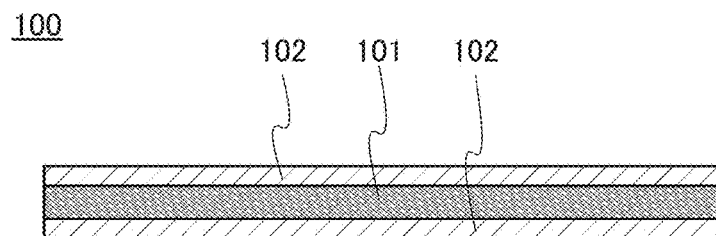

FIG. 3A is an overhead view of an electrode 100, and FIG. 3B is a cross-sectional view of a portion surrounded by a broken line in FIG. 3A. The electrode 100 has a structure in which an active material layer 102 is provided over a current collector 101. Although the active material layers 102 are provided such that the current collector 101 is sandwiched therebetween in FIG. 3A, the active material layer 102 may be formed over only one surface of the current collector 101.

There is no particular limitation on the current collector 101 as long as it has high conductivity without causing a significant chemical change in a power storage device. For example, the current collector 101 can be formed using a metal such as stainless steel, gold, platinum, zinc, iron, nickel, copper, aluminum, titanium, tantalum, or manganese, an alloy thereof, sintered carbon, or the like. Alternatively, copper or stainless steel that is coated with carbon, nickel, titanium, or the like can be used to form the current collector 101. Alternatively, the current collector 101 can be formed using an aluminum alloy to which an element that improves heat resistance, such as silicon, neodymium, scandium, or molybdenum, is added. Still alternatively, a metal element that forms silicide by reacting with silicon can be used. Examples of the metal element that forms silicide by reacting with silicon include zirconium, titanium, hafnium, vanadium, niobium, tantalum, chromium, molybdenum, tungsten, cobalt, nickel, and the like. The current collector 101 can have any of various shapes including a foil-like shape, a plate-like shape (sheet-like shape), a net-like shape, a cylindrical shape, a coil shape, a punching-metal shape, an expanded-metal shape, a porous shape, and a shape of non-woven fabric as appropriate. The current collector 101 may be formed to have micro irregularities on the surface thereof in order to enhance adhesion to the active material layer, for example. The current collector 101 preferably has a thickness of 5 μm to 30 μm inclusive.

The positive electrode active material layer 102 includes the active material. An active material refers only to a material that relates to insertion and extraction of ions that carriers. In this specification and the like, a material that is actually an "active material" and the material including a conductive additive, a binder, and the like are collectively referred to as an active material layer.

In the case where the active material is used as a negative electrode active material, for example, a carbon-based material, an alloy-based material, or the like can be used.

Examples of the carbon-based material include graphite, graphitizing carbon (soft carbon), non-graphitizing carbon (hard carbon), a carbon nanotube, graphene, and carbon black.

Examples of graphite include artificial graphite such as meso-carbon microbeads (MCMB), coke-based artificial graphite, and pitch-based artificial graphite and natural graphite such as spherical natural graphite.

Graphite has a low potential substantially equal to that of a lithium metal (higher than or equal to 0.1 V and lower than or equal to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferred because of its advantages such as relatively high capacity per unit volume, small volume expansion, low cost, and higher level of safety than that of a lithium metal.

For the negative electrode active material, a material which enables charge-discharge reactions by an alloying reaction and a dealloying reaction with lithium can be used. A material containing at least one of Ga, Si, Al, Si, Ge, Sn, Pb, Sb, Bi, Ag, Au, Zn, Cd, In, and the like can be used, for example. Such elements have higher capacity than carbon. In particular, silicon has a significantly high theoretical capacity of 4200 mAh/g. Examples of an alloy-based material using such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, for the negative electrode active materials, an oxide such as SiO, SnO, $SnO_2$, titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active materials, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active materials and thus the negative electrode active materials can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active materials; for example, a transition metal oxide with which an alloying reaction with lithium is not caused, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

In the case where the active material is a positive electrode active material, a material into and from which lithium ions can be intercalated and deintercalated can be used; for example, a material having an olivine crystal structure, a layered rock-salt crystal structure, a spinel crystal structure, or a NASICON crystal structure, or the like can be used.

Although the case of using the active material described in Embodiment 1 as the positive electrode active material is described in this embodiment, a different active material may be used.

Examples of active materials other than the active material described in Embodiment 1 include compounds such as $LiFeO_2$, $LiCoO_2$, $LiNiO_2$, $LiMn_2O_4$, $V_2O_5$, $Cr_2O_5$, and $MnO_2$.

Alternatively, lithium-containing complex phosphate, $LiMPO_4$ (general formula, where M is one or more of Fe(II), Mn(II), Co(II), and Ni(II)), can be used. Typical examples of $LiMPO_4$ are lithium metal phosphate compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, lithium-containing complex silicate such as $Li_{(2-j)}MSiO_4$ (general formula, where M is one or more of Fe(II), Mn(II), Co(II), and Ni(II), and 0≤j≤2) may be used. Typical examples of $Li_{(2-j)}MSiO_4$ are lithium silicate compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a NASICON compound expressed by $A_xM_2(XO_4)_3$ (general formula, where A=Li, Na, or Mg, M=Fe, Mn, Ti, V, Nb, or Al, X=S, P, Mo, W, As, or Si) can be used for the active material. Examples of the NASICON compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula, where M=Fe or Mn), a perovskite fluoride such as $NaF_3$ and $FeF_3$, a metal chalcogenide (a sulfide, a selenide, or a telluride) such as $TiS_2$ and $MoS_2$, a material with an inverse spinel structure such as $LiMVO_4$, a vanadium oxide ($V_2O_5$, $V_6O_{13}$, $LiV_3O_8$, or the like), a manganese oxide, an organic sulfur compound, or the like can be used as the positive electrode active material.

In the case where carrier ions are alkali metal ions other than lithium ions, or alkaline-earth metal ions, a compound containing carriers such as an alkali metal (e.g., sodium or potassium) or an alkaline-earth metal (e.g., calcium, strontium, barium, beryllium, or magnesium) instead of lithium of the lithium compound, the lithium-containing complex phosphate, or the lithium-containing complex silicate may be used as the positive electrode active material.

The average particle size of the positive electrode active material is preferably, for example, greater than or equal to 5 nm and less than or equal to 50 μm.

The active material layer 102 may include a conductive additive. Examples of the conductive additive include natural graphite, artificial graphite such as meso-carbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (acetylene black (AB)) and graphene. Alternatively, metal powder or metal fiber of copper, nickel, aluminum, silver, gold, or the like, a conductive ceramic material, or the like can be used.

Flaky graphene has excellent electrical characteristics of high conductivity and excellent physical properties of high flexibility and high mechanical strength. For this reason, the use of graphene as the conductive additive can increase the points and the area where the active materials are in contact with each other.

The active material layer 102 preferably includes a binder, more preferably a binder that contains water-soluble polymers. The active material layer 102 may include a plurality of kinds of binders.

As the binder, a rubber material such as styrene-butadiene rubber (SBR), styrene-isoprene-styrene rubber, acrylonitrile-butadiene rubber, butadiene rubber, or ethylene-propylene-diene copolymer is preferably used. Any of these rubber materials is more preferably used in combination with water-soluble polymers. Since these rubber materials have rubber elasticity and easily expand and contract, it is possible to obtain a highly reliable electrode that is resistant to stress due to expansion and contraction of an active material by charge and discharge, bending of the electrode, or the like. On the other hand, the rubber materials have a hydrophobic group and thus are unlikely to be soluble in water in some cases. In such a case, particles are dispersed in water without being dissolved, so that increasing the viscosity of a composition containing a solvent used for the formation of the active material layer 102 (also referred to as an electrode binder composition) up to the viscosity suitable for application might be difficult. Water-soluble polymers having an excellent function of adjusting viscosity, such as a polysaccharide, can moderately increase the viscosity of the solution and can be uniformly dispersed together with a rubber material. Thus, a favorable electrode with high uniformity (e.g., an electrode with uniform electrode thickness or electrode resistance) can be obtained.

As the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, isobutylene, polyethylene terephthalate, nylon, polyvinylidene fluoride (PVdF), or polyacrylonitrile (PAN) can be used.

A single binder may be used or plural kinds of binders may be used in combination.

<Formation Method of Electrode>

Next, a method for forming the electrode 100 of one embodiment of the present invention will be described.

First, an electrode binder composition is formed. The electrode binder composition can be formed in such a manner that the above-described active material to which a conductive additive, a binder, and the like are added as appropriate is mixed with a solvent, for example. The electrode binder composition may be slurry or a paste. As the solvent, for example, water or N-methyl-2-pyrrolidone (NMP) can be used.

The case where the electrode 100 is a positive electrode of a storage battery will be described as an example. Described here is an example where the active material of one embodiment of the present invention is used as an active material, acetylene black is used as a conductive additive, PVdF is used as a binder, and NMP is used as a solvent.

First, the active material of one embodiment of the present invention, acetylene black, and polyvinylidene fluoride are mixed. Then, NMP is added to the obtained mixture and mixed until predetermined viscosity is obtained; thus, the electrode binder composition can be formed. In this step, the mixing and the addition of the polar solvent may be repeated more than once.

Through the above steps, the electrode binder composition in which the active material, the conductive additive, and the binder are uniformly dispersed can be obtained.

Here, an undercoat may be formed over the current collector. Note that the undercoat is a coating layer provided to reduce contact resistance or to improve adhesion between the current collector and the active material layer. Examples of the undercoat include a carbon layer, a metal layer, a layer containing carbon and high molecules, and a layer containing metal and high molecules. Forming the undercoat over the current collector can reduce the contact resistance between the current collector and the active material layer formed later, and/or can increase adhesion between the active material layer and the current collector. In addition, the adhesion between the current collector and the active material layer can be increased. In the case of using graphene as the conductive additive, the undercoat is preferably not dissolved by a reducing solution in the process of reducing graphene oxide.

As the undercoat, for example, an aqueous solution in which graphite, acetylene black, and the like are dispersed or the aqueous solution into which high molecules are mixed can be used. Examples of the undercoat include a mixture of graphite and sodium polyacrylate (PAA) and a mixture of AB and PVdF. The compounding ratio of black lead to PAA is preferably 95:5 to 50:50, and the compounding ratio of AB to PVdF is preferably 70:30 to 50:50.

Note that if there is no problem with the adhesion between the current collector and the active material layer, the electrode strength, and the contact resistance, it is not necessary to apply the undercoat to the current collector.

Next, slurry is provided on one or both surfaces of the current collector by a coating method such as a doctor blade method.

When a secondary particle of the lithium-manganese composite oxides is used as the active material as described in Embodiment 1, the slurry can be applied thick to the current collector.

Furthermore, by making lithium-manganese composite oxides be a secondary particle, the surface area of the active material can be reduced, the compounding amount of a binder can be reduced, and the capacity per weight or per volume of the electrode can be increased.

Next, the slurry formed over the current collector is dried by a method such as ventilation drying or reduced pressure (vacuum) drying to form the active material layer. The drying is preferably performed using a hot wind with temperatures of 50° C. to 180° C. Through this step, the polar solvent contained in the active material layer is evaporated. Note that there is no particular limitation on the atmosphere.

The active material layer may be pressed by a compression method such as a roll press method or a flat plate press method to increase the density of the active material layer. When the pressing is performed while being heated at higher than or equal to 90° C. and lower than or equal to 180° C., preferably lower than or equal to 120° C., the binder (e.g., PVdF) contained in the undercoat or the active material layer is softened to such an extent that the characteristics of the electrode is not changed, further increasing the adhesion between the current collector and the active material layer.

Then, the pressed active material layer is dried. The drying is preferably performed under a reduced pressure (in vacuum) or in a reduction atmosphere. This drying step may be performed at temperatures of 50° C. to 300° C. for 1 hour to 48 hours, for example. The drying allows sufficient evaporation or removal of the polar solvent and moisture in the active material layer.

The current collector over which the active material layer is formed may be further pressed. Thus, the adhesion between the current collector and the active material layer can be increased. In addition, the density of the active material layer can be increased. When the pressing is performed while being heated at higher than or equal to 90° C. and lower than or equal to 180° C., preferably lower than or equal to 120° C., the binder (e.g., PVdF) contained in the undercoat or the active material layer is softened to such an extent that the characteristics of the electrode is not changed, further increasing the adhesion between the current collector and the active material layer.

Lastly, the current collector and the active material layer are stamped to have a predetermined size, whereby the electrode is formed.

With the use of the active material of one embodiment of the present invention, pressure applied to the lithium-manganese composite oxides, which is due to pressure applied to the electrode in a formation process of the electrode, can be alleviated owing to the mechanical strength of graphene. This can prevent the lithium-manganese composite oxides from being further cleaved and cracked.

Moreover, even when a great stress is caused at the time of winding an electrode of a wound battery or even when an outward stress from an axis of winding is applied to the electrode all the time in the case where a wound body of the electrode is stored in a housing, the lithium-manganese composite oxides can be prevented from being further cleaved and cracked by the stress.

When the active material in which at least part of the cleavage plane is covered with graphene is used for an electrode as described above, a decrease in the voltage and discharge capacity of a battery can be prevented. Accordingly, the charge-discharge cycle characteristics of the battery can be improved.

Furthermore, with the use of the secondary particle of the lithium-manganese composite oxides as the active material in the electrode, the active material layer over the current collector can be made thick. In addition, when the lithium-manganese composite oxides are made to be a secondary particle, the proportion of a binder used for forming the active material layer can be small as compared with the case where the lithium-manganese composite oxides are not made to be a secondary particle. As a result, the supported amount of the active material contained in the active material layer can be increased and the capacity of the electrode can be increased.

Furthermore, by making lithium-manganese composite oxides be a secondary particle, the surface area of the active material can be reduced, the compounding amount of a binder can be reduced, and the capacity per weight or per volume of the electrode can be increased.

Moreover, when the active material of one embodiment of the present invention is used for an electrode, a high-capacity power storage device having a discharge capacity per active material weight of higher than or equal to 300 mAh/g can be manufactured.

This embodiment can be implemented in combination with any of the other embodiments as appropriate.

Embodiment 3

Described in this embodiment will be an example of a power storage device using the electrode of one embodiment of the present invention.

Note that the power storage device in this specification and the like indicates all elements and devices that have the function of storing electric power. For example, a storage battery such as a lithium-ion secondary battery, a lithium-ion capacitor, and an electric double layer capacitor are included in the category of the power storage device.

<Thin Storage Battery>

Figure 4:
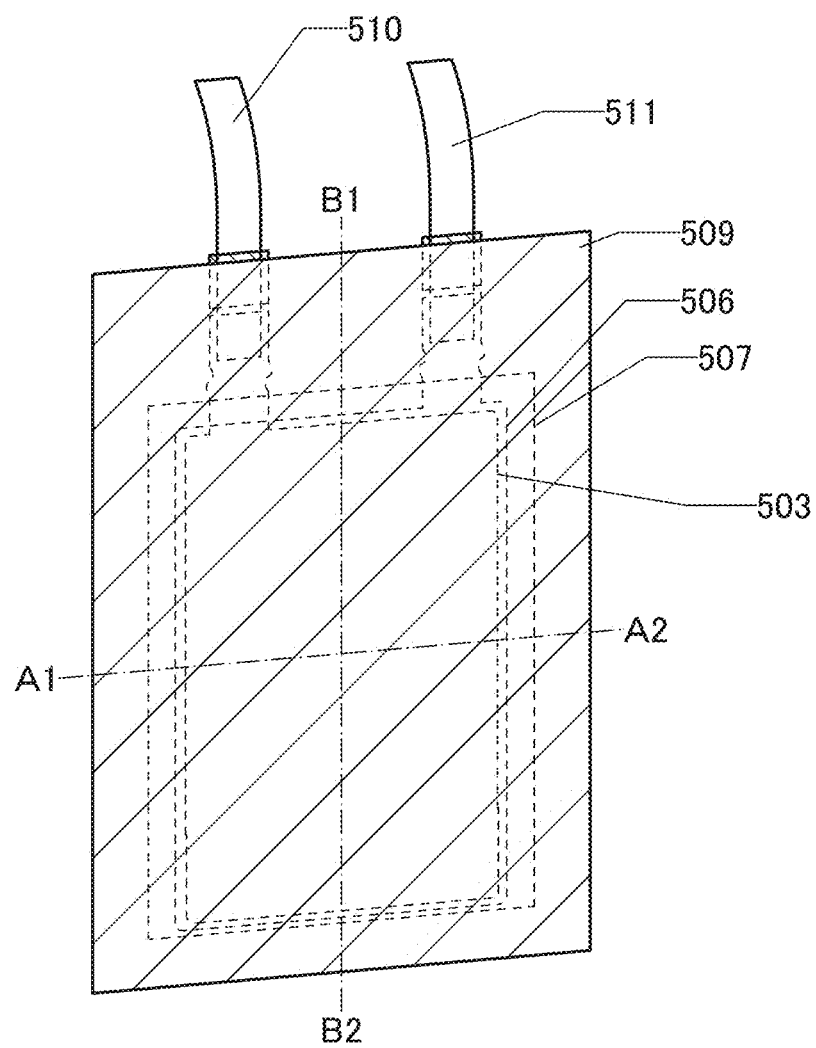
FIG. 4 illustrates a thin storage battery.

FIG. 4 illustrates a thin storage battery as an example of a storage device. When a flexible thin storage battery is used in an electronic device at least part of which is flexible, the storage battery can be bent as the electronic device is bent.

Figure 5A:
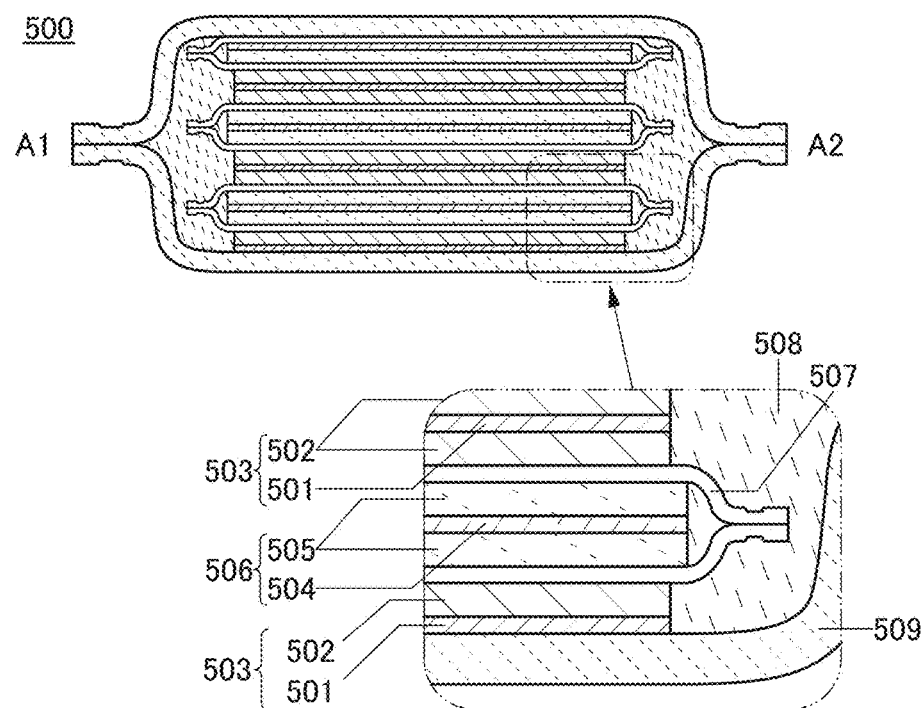
FIGS. 5A and 5B are each a cross-sectional view of a storage battery.
Figure 5B:
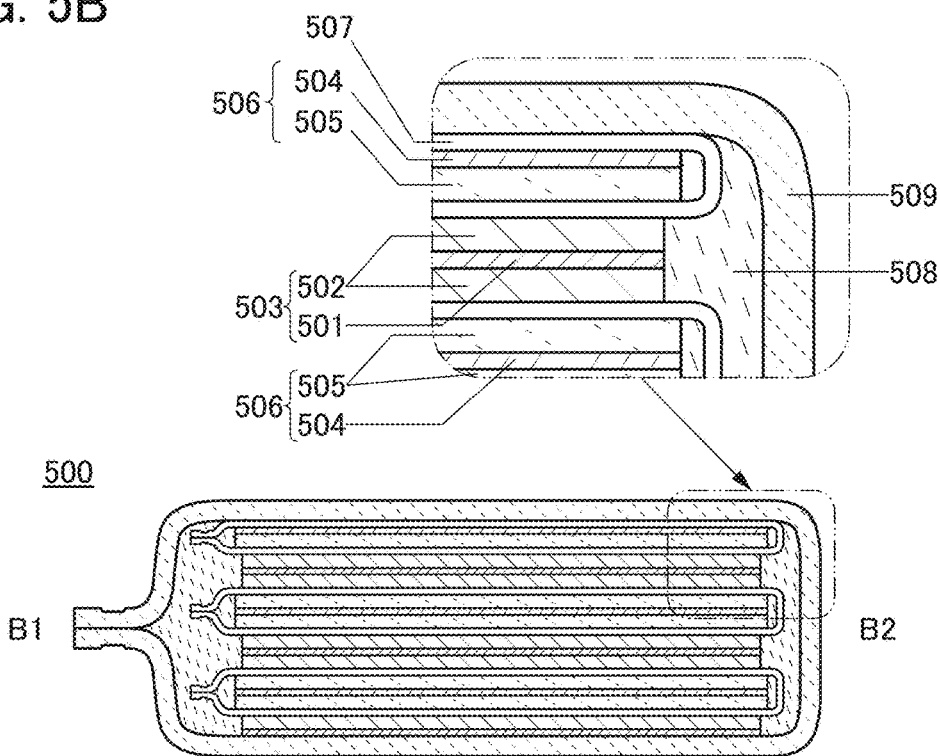

FIG. 4 is an external view of a thin storage battery 500. FIG. 5A is a cross-sectional view along dashed-dotted line A1-A2 in FIG. 4, and FIG. 5B is a cross-sectional view along dashed-dotted line B1-B2 in FIG. 4. The thin storage battery 500 includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. The electrolytic solution 508 is included in the exterior body 509.

As at least one of the positive electrode 503 and the negative electrode 506, the electrode of one embodiment of the present invention is used. The electrode of one embodiment of the present invention may be used as both the positive electrode 503 and the negative electrode 506.

Here, a structure of the positive electrode 503 will be described. The electrode of one embodiment of the present invention is preferably used as the positive electrode 503. Here, an example of using the electrode 100 described in Embodiment 2 as the positive electrode 503 will be described.

As a solvent of the electrolytic solution 508, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a high-molecular material that undergoes gelation is used as a solvent of the electrolytic solution, safety against liquid leakage and the like is improved. Furthermore, a secondary battery can be thinner and more lightweight. Typical examples of the high-molecular material that undergoes gelation include a silicone gel, an acrylic gel, an acrylonitrile gel, a polyethylene oxide-based gel, a polypropylene oxide-based gel, a fluorine-based polymer gel, and the like.

Alternatively, the use of one or more kinds of ionic liquids (room temperature molten salts) which have features of non-flammability and non-volatility as a solvent of the electrolytic solution can prevent a power storage device from exploding or catching fire even when a power storage device internally shorts out or the internal temperature increases owing to overcharging or the like. An ionic liquid contains a cation and an anion. The ionic liquid of one embodiment of the present invention contains an organic cation and an anion. Examples of the organic cation used for the electrolytic solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolytic solution include a monovalent amide-based anion, a monovalent methide-based anion, a fluorosulfonate anion, a perfluoroalkylsulfonate anion, tetrafluoroborate, perfluoroalkylborate, hexafluorophosphate, and perfluoroalkylphosphate.

In the case of using lithium ions as carriers, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolytic solution used for a power storage device is preferably highly purified and contains a small amount of dust particles and elements other than the constituent elements of the electrolytic solution (hereinafter, also simply referred to as impurities). Specifically, the weight ratio of impurities to the electrolytic solution is less than or equal to 1 wt %, preferably less than or equal to 0.1 wt %, and more preferably less than or equal to 0.01 wt %.

Furthermore, an additive agent such as vinylene carbonate, propane sultone (PS), tert-butylbenzene (TBB), fluoroethylene carbonate (FEC), or LiBOB may be added to the electrolytic solution. The concentration of such an additive agent in the whole solvent is, for example, higher than or equal to 0.1 wt % and lower than or equal to 5 wt %.

Alternatively, a gelled electrolyte obtained in such a manner that a polymer is swelled with an electrolytic solution may be used. Examples of the gelled electrolyte (polymer-gel electrolyte) include a host polymer that is used as a support and contains the electrolytic solution described above.

Examples of host polymers include a polymer having a polyalkylene oxide structure, such as polyethylene oxide (PEO); PVdF; polyacrylonitrile; and a copolymer containing any of them. For example, PVdF-HFP, which is a copolymer of PVdF and hexafluoropropylene (HFP) can be used. The formed polymer may be porous.

Instead of the electrolytic solution, a solid electrolyte including an inorganic material such as a sulfide-based inorganic material or an oxide-based inorganic material, or a solid electrolyte including a macromolecular material such as a polyethylene-oxide-based (PEO-based) macromolecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

As the separator 507, paper; nonwoven fabric; glass fiber; ceramics; synthetic fiber containing nylon (polyamide), vinylon (polyvinyl alcohol-based fiber), polyester, acrylic, polyolefin, or polyurethane; or the like can be used.

Figure 6A:
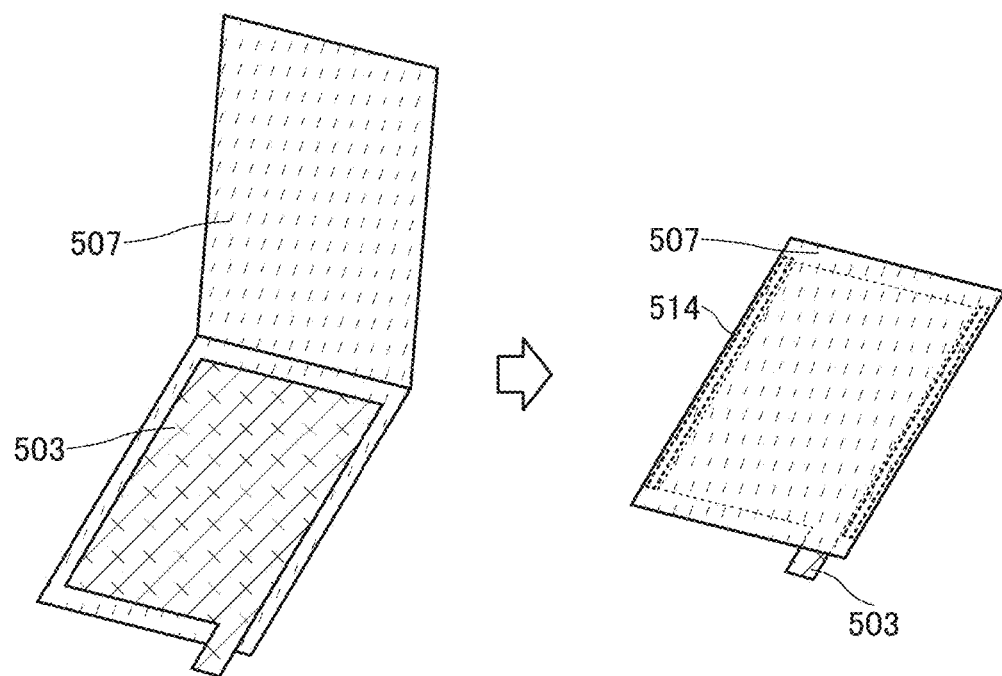
FIGS. 6A and 6B are each a diagram for illustrating a thin storage battery.
Figure 6B:
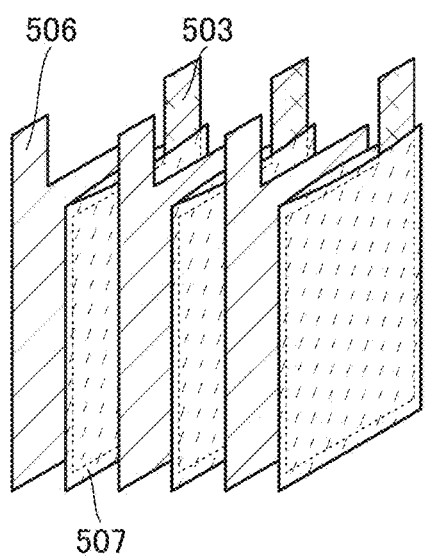

The separator 507 is preferably formed to have a bag-like shape to surround one of the positive electrode 503 and the negative electrode 506. For example, as illustrated in FIG. 6A, the separator 507 is folded in two so that the positive electrode 503 is sandwiched, and sealed with a sealing portion 514 in a region outside the region overlapping with the positive electrode 503; thus, the positive electrode 503 can be reliably supported inside the separator 507. Then, as illustrated in FIG. 6B, the positive electrodes 503 surrounded by the separators 507 and the negative electrodes 506 are alternately stacked and provided in the exterior body 509, whereby the thin storage battery 500 can be formed.

Next, aging after fabrication of a storage battery will be described. Aging is preferably performed after fabrication of a storage battery. The aging can be performed under the following conditions, for example. Charge is performed at a rate of 0.001 C or more and 0.2 C or less at a temperature higher than or equal to room temperature and lower than or equal to 50° C. In the case where an electrolytic solution is decomposed and a gas is generated and accumulated in the cell, the electrolytic solution cannot be in contact with a surface of the electrode in some regions. That is to say, an effectual reaction area of the electrode is reduced and effectual current density is increased.

When the current density is extremely high, a voltage drop occurs depending on the resistance of the electrode, lithium is intercalated into graphite, and lithium is deposited on the surface of graphite. The lithium deposition might reduce capacity. For example, if a coating film or the like is grown on the surface after lithium deposition, lithium deposited on the surface cannot be dissolved again. This lithium cannot contribute to capacity. In addition, when deposited lithium is physically collapsed and conduction with the electrode is lost, the lithium also cannot contribute to capacity. Therefore, the gas is preferably released before the potential of the electrode reaches the potential of lithium because of a voltage drop.

After the release of the gas, the charging state may be maintained at a temperature higher than room temperature, preferably higher than or equal to 30° C. and lower than or equal to 60° C., more preferably higher than or equal to 35° C. and lower than or equal to 50° C. for, for example, 1 hour to 100 hours. In the initial charge, an electrolytic solution decomposed on the surface forms a coating film on the surface of graphite. The formed coating film may thus be densified when the charging state is held at a temperature higher than room temperature after the release of the gas, for example.

Figure 7A:
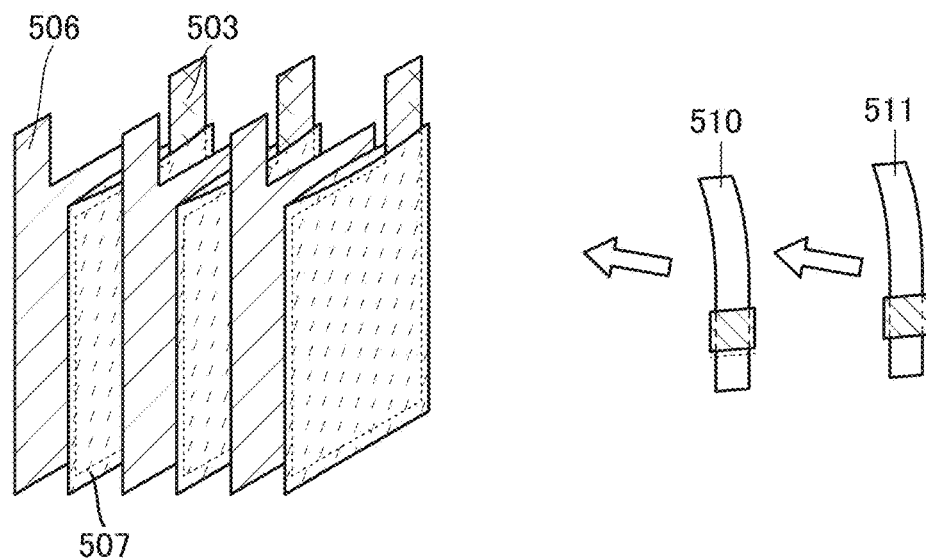
FIGS. 7A and 7B are each a diagram for illustrating a thin storage battery.
Figure 7B:
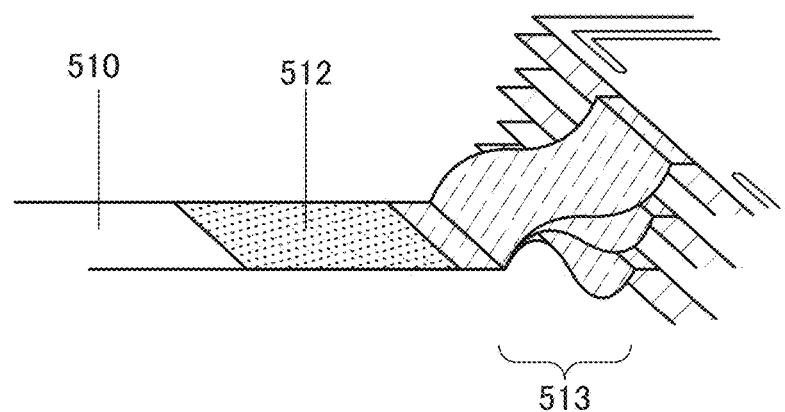

FIG. 7A illustrates an example where a current collector is welded to a lead electrode, specifically, an example where positive electrode current collectors 501 are welded to a positive electrode lead electrode 510. The positive electrode current collectors 501 are welded to the positive electrode lead electrode 510 in a welding region 512 by ultrasonic welding or the like. The positive electrode current collector 501 includes a bent portion 513 as illustrated in FIG. 7B, and it is therefore possible to relieve stress due to external force applied after fabrication of the storage battery 500. Thus, the storage battery 500 can have high reliability.

In the thin storage battery 500 illustrated in FIG. 4 and FIGS. 5A and 5B, the positive electrode current collectors 501 and the negative electrode current collectors 504 are welded to the positive electrode lead electrode 510 and a negative electrode lead electrode 511, respectively, by ultrasonic welding and part of the positive electrode lead electrode 510 and part of the negative electrode lead electrode 511 are exposed to the outside. The positive electrode current collector 501 and the negative electrode current collector 504 can double as terminals for electrical contact with the outside. In that case, the positive electrode current collector 501 and the negative electrode current collector 504 may be arranged so that part of the positive electrode current collector 501 and part of the negative electrode current collector 504 are exposed to the outside the exterior body 509 without using lead electrodes.

Figure 8:
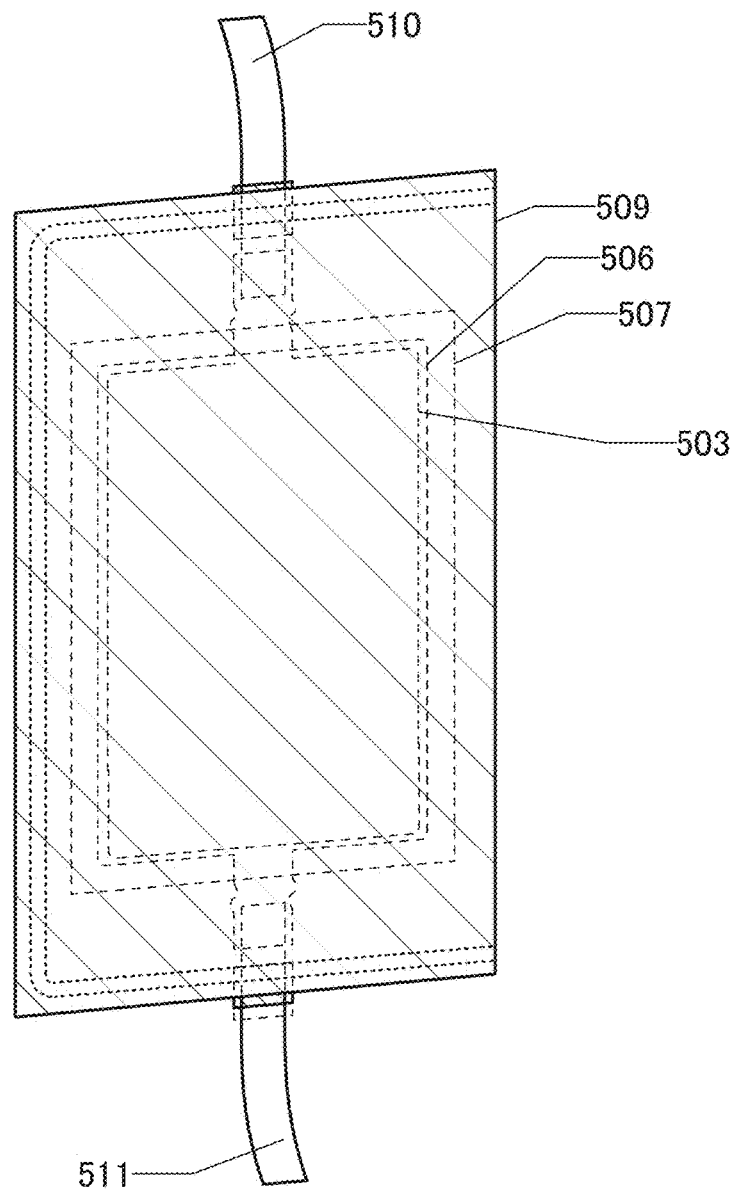
FIG. 8 is a diagram for illustrating a thin storage battery.

Although the positive electrode lead electrode 510 and the negative electrode lead electrode 511 are provided on the same side in FIG. 4, the positive electrode lead electrode 510 and the negative electrode lead electrode 511 may be provided on different sides as illustrated in FIG. 8. The lead electrodes of a storage battery of one embodiment of the present invention can be freely positioned as described above; therefore, the degree of freedom in design is high. Accordingly, a product including a storage battery of one embodiment of the present invention can have a high degree of freedom in design. Furthermore, a yield of products each including a storage battery of one embodiment of the present invention can be increased.

As the exterior body 509 in the thin storage battery 500, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

The example in FIG. 4 includes five positive electrode-negative electrode pairs (the positive and negative electrodes face each other). It is needless to say that the number of pairs of electrodes is not limited to five, and may be more than or less than five. In the case of using a large number of electrode layers, the storage battery can have high capacity. In contrast, in the case of using a small number of electrode layers, the storage battery can have a small thickness and high flexibility.

In the above structure, the exterior body 509 of the storage battery can change its form with a radius of greater than or equal to 10 mm, preferably greater than or equal to 30 mm. One or two films are used as the exterior body of the storage battery. In the case where the storage battery has a layered structure, the storage battery has a cross section sandwiched by two curved surfaces of the films when it is bent.

Figure 9A:
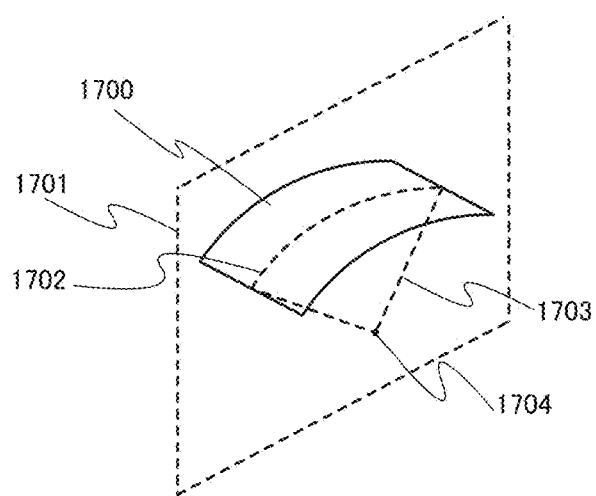
FIGS. 9A to 9C are each a diagram for illustrating a radius of curvature of a surface.
Figure 9B:
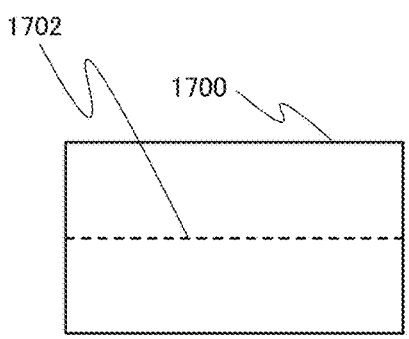
Figure 9C:
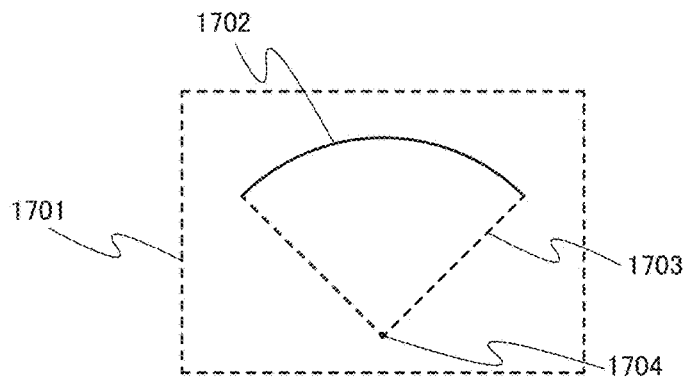

Description is given of the radius of curvature of a surface with reference to FIGS. 9A to 9C. In FIG. 9A, on a plane 1701 along which a curved surface 1700 is cut, part of a curve 1702 of the curved surface 1700 is approximate to an arc of a circle, and the radius of the circle is referred to as a radius of curvature 1703 and the center of the circle is referred to as a center 1704 of curvature. FIG. 9B is a top view of the curved surface 1700. FIG. 9C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

Figure 10A:
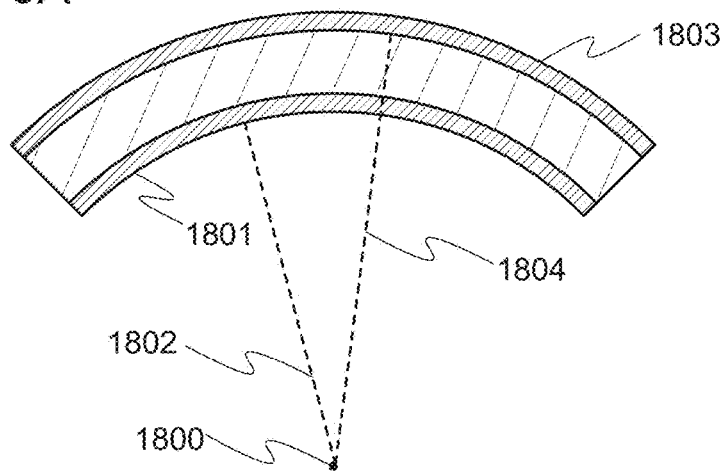
FIGS. 10A to 10D are each a diagram for illustrating a radius of curvature of a film.
Figure 10B:
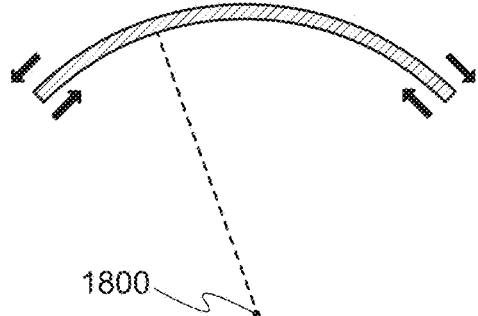

In the case of bending a secondary battery in which electrodes, an electrolytic solution, and the like are sandwiched between two films as exterior bodies, a radius of curvature 1802 of a film 1801 close to a center of curvature 1800 of the secondary battery is smaller than a radius of curvature 1804 of a film 1803 far from the center of curvature 1800 (FIG. 10A). When the secondary battery is curved and has an arc-shaped cross section, compressive stress is applied to a surface of the film on the side closer to the center of curvature 1800 and tensile stress is applied to a surface of the film on the side farther from the center of curvature 1800 (FIG. 10B). However, by forming a pattern including convex portions or concave portions on surfaces of the exterior bodies, the influence of a strain can be reduced to be acceptable even when compressive stress and tensile stress are applied. For this reason, the secondary battery can change its form such that the exterior body on the side closer to the center of curvature has a curvature radius greater than or equal to 10 mm, preferably greater than or equal to 30 mm.

Figure 10C:
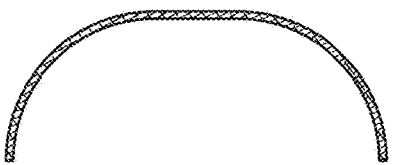
Figure 10D:

Note that the cross-sectional shape of the secondary battery is not limited to a simple arc shape, and the cross section can be partly arc-shaped; for example, a shape illustrated in FIG. 10C, a wavy shape illustrated in FIG. 10D, or an S shape can be used. When the curved surface of the secondary battery has a shape with a plurality of centers of curvature, the secondary battery can change its form such that a curved surface with the smallest radius of curvature among radii of curvature with respect to the plurality of centers of curvature, which is a surface of the exterior body on the side closer to the center of curvature, has a curvature radius greater than or equal to 10 mm, preferably greater than or equal to 30 mm.

<Coin-Type Storage Battery>

Figure 11A:
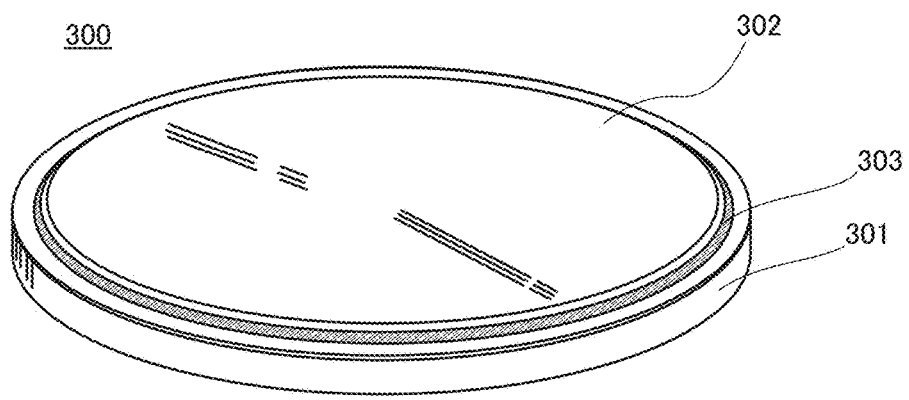
FIGS. 11A and 11B illustrate a coin-type storage battery.
Figure 11B:
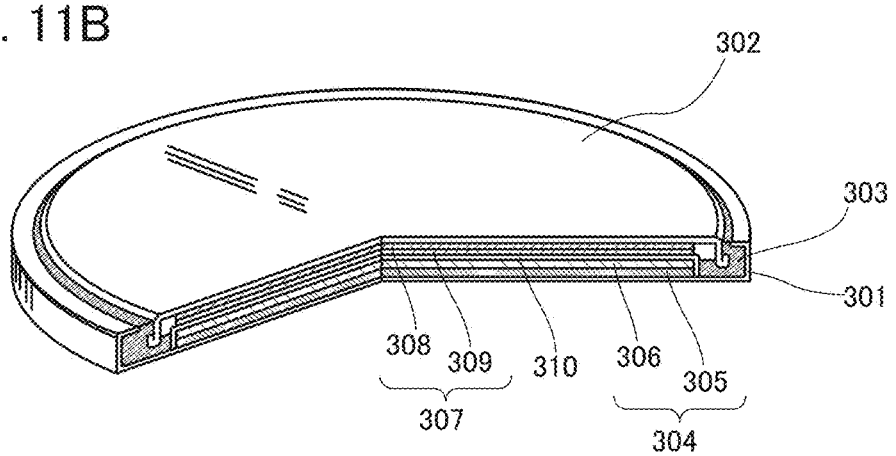

Next, an example of a coin-type storage battery will be described as an example of a power storage device with reference to FIGS. 11A and 11B. FIG. 11A is an external view of a coin-type (single-layer flat type) storage battery, and FIG. 11B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. The description of the positive electrode active material layer 502 can be referred to for the positive electrode active material layer 306.

A negative electrode 307 includes a negative electrode current collector 308 and a negative electrode active material layer 309 provided in contact with the negative electrode current collector 308. The description of the negative electrode active material layer 505 can be referred to for the negative electrode active material layer 309. The description of the separator 507 can be referred to for the separator 310. The description of the electrolytic solution 508 can be referred to for the electrolytic solution.

Note that only one surface of each of the positive electrode 304 and the negative electrode 307 used for the coin-type storage battery 300 is provided with an active material layer.

For the positive electrode can 301 and the negative electrode can 302, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the positive electrode can 301 and the negative electrode can 302 are preferably covered with nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 11B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

<Cylindrical Storage Battery>

Figure 12A:
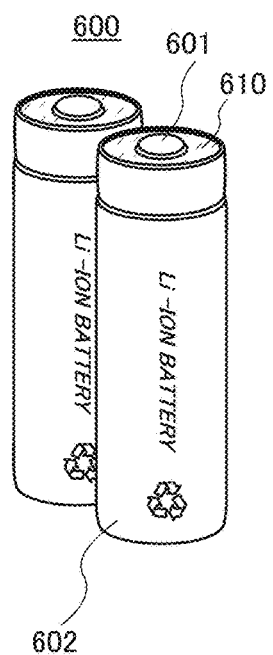
FIGS. 12A and 12B illustrate a cylindrical storage battery.

Next, an example of a cylindrical storage battery will be described as an example of a power storage device with reference to FIGS. 12A and 12B. As illustrated in FIG. 12A, a cylindrical storage battery 600 includes a positive electrode cap (battery cap) 601 on the top surface and a battery can (outer can) 602 on the side surface and bottom surface. The positive electrode cap 601 and the battery can 602 are insulated from each other by a gasket (insulating gasket) 610.

Figure 12B:
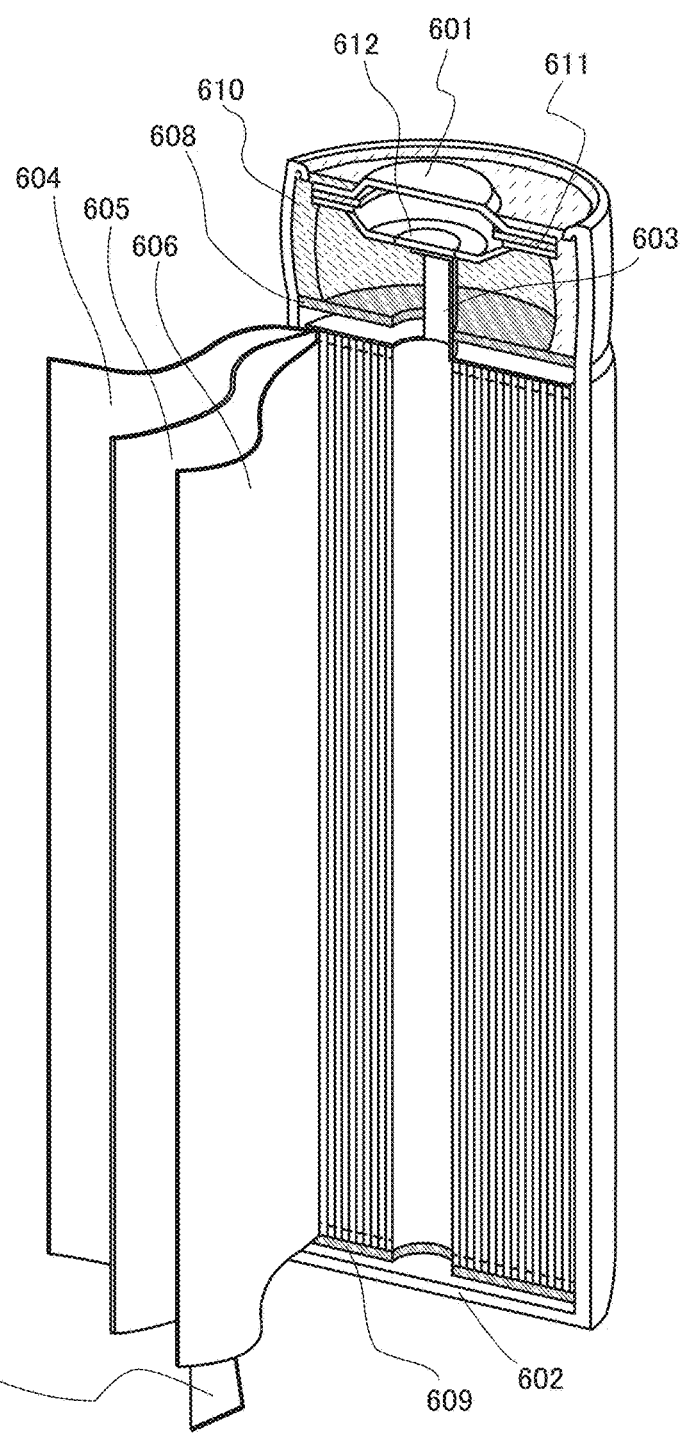

FIG. 12B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is close and the other end thereof is open. For the battery can 602, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the battery can 602 is preferably covered with nickel, aluminum, or the like in order to prevent corrosion due to the electrolytic solution. Inside the battery can 602, the battery element in which the positive electrode, the negative electrode, and the separator are wound is provided between a pair of insulating plates 608 and 609 which face each other. Furthermore, a nonaqueous electrolytic solution (not illustrated) is injected inside the battery can 602 provided with the battery element. As the nonaqueous electrolytic solution, a nonaqueous electrolytic solution that is similar to those of the coin-type storage battery can be used.

The positive electrode 604 and the negative electrode 606 can be formed in a manner similar to that of the positive electrode and the negative electrode of the thin storage battery described above. Since the positive electrode and the negative electrode of the cylindrical storage battery are wound, active materials are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element.

In the case where an electrode is wound as in the cylindrical storage battery illustrated in FIGS. 12A and 12B, a great stress is caused at the time of winding the electrode. In addition, an outward stress from an axis of winding is applied to the electrode all the time in the case where a wound body of the electrode is stored in a housing. However, the active material can be prevented from being cleaved even when such a great stress is applied to the electrode.

Note that in this embodiment, the coin-type storage battery, the cylindrical storage battery, and the thin storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed. For example, FIGS. 13A to 13C, FIGS. 14A to 14C, FIGS. 15A and 15B, FIGS. 16A1, 16A2, 16B1, and 16B2, and FIGS. 17A and 17B illustrate examples of other storage batteries.

<Structural Example of Storage Battery>

FIGS. 13A to 13C and FIGS. 14A to 14C illustrate structural examples of thin storage batteries. A wound body 993 illustrated in FIG. 13A includes a negative electrode 994, a positive electrode 995, and a separator 996.

The wound body 993 is obtained by winding a sheet of a stack in which the negative electrode 994 overlaps with the positive electrode 995 with the separator 996 therebetween. The wound body 993 is covered with a rectangular sealed container or the like; thus, a rectangular secondary battery is fabricated.

Note that the number of stacks each including the negative electrode 994, the positive electrode 995, and the separator 996 is determined as appropriate depending on capacity and element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 13A:
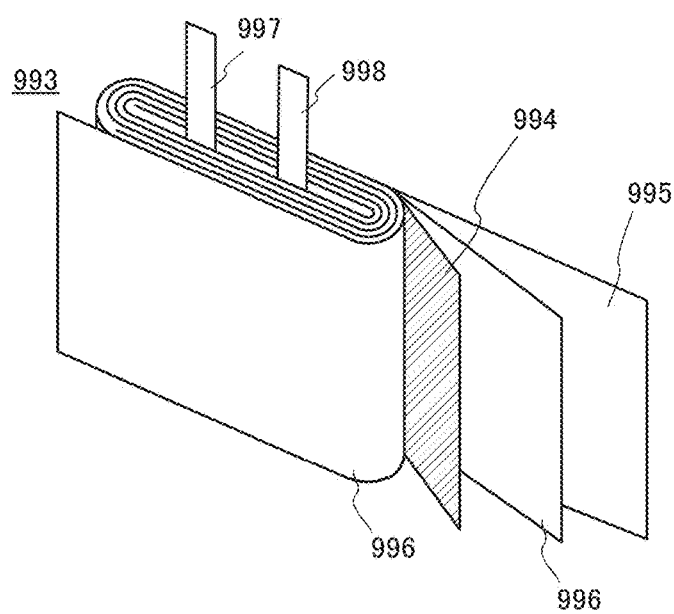
FIGS. 13A to 13C illustrate an example of a power storage device.
Figure 13B:
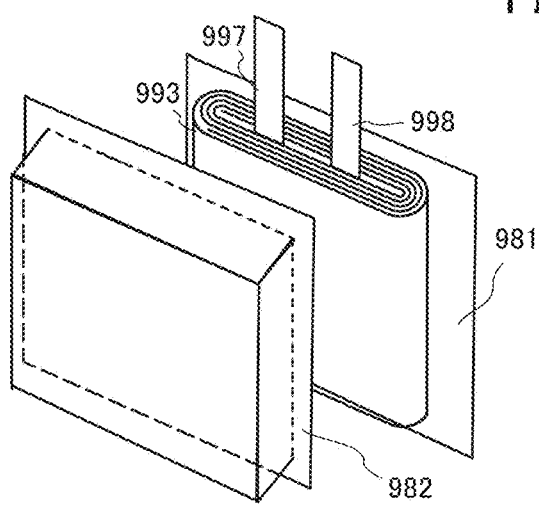
Figure 13C:
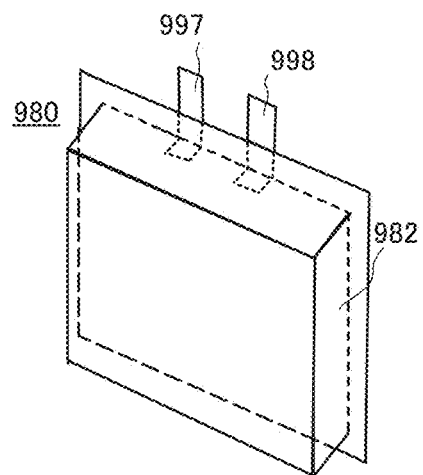

In a storage battery 980 illustrated in FIGS. 13B and 13C, the wound body 993 is packed in a space formed by bonding a film 981 and a film 982 having a concave portion that serve as exterior bodies by thermocompression bonding or the like. The wound body 993 includes the lead electrode 997 and the lead electrode 998, and is soaked in an electrolytic solution inside a space surrounded by the film 981 and the film 982 having a concave portion.

For the film 981 and the film 982 having a concave portion, a metal material such as aluminum or a resin material can be used, for example. With the use of a resin material for the film 981 and the film 982 having a concave portion, the film 981 and the film 982 having a concave portion can be changed in their forms when external force is applied; thus, a flexible storage battery can be fabricated.

Although FIGS. 13B and 13C illustrate an example where a space is formed by two films, the wound body 993 may be placed in a space formed by bending one film.

Furthermore, in manufacturing a flexible power storage device, a resin material or the like can be used for an exterior body and a sealed container of the power storage device. Note that in the case where a resin material is used for the exterior body and the sealed container, a conductive material is used for a portion connected to the outside.

For example, FIGS. 14B and 14C illustrate another example of a flexible thin storage battery. The wound body 993 illustrated in FIG. 14A is the same as that illustrated in FIG. 13A, and the detailed description thereof is omitted.

In the storage battery 990 illustrated in FIGS. 14B and 14C, the wound body 993 is packed in an exterior body 991. The wound body 993 includes the lead electrode 997 and the lead electrode 998, and is soaked in an electrolytic solution inside a space surrounded by the exterior body 991 and an exterior body 992. For example, a metal material such as aluminum or a resin material can be used for the exterior bodies 991 and 992. With the use of a resin material for the exterior bodies 991 and 992, the exterior bodies 991 and 992 can be changed in their forms when external force is applied; thus, a flexible thin storage battery can be fabricated.

When the electrode containing the active material of one embodiment of the present invention is used in the flexible thin storage battery, the active material can be prevented from being cleaved even if a stress caused by repeated bending of the thin storage battery is applied to the electrode.

When the active material in which at least part of the cleavage plane is covered with graphene is used for an electrode as described above, a decrease in the voltage and discharge capacity of a battery can be prevented. Accordingly, the charge-discharge cycle characteristics of the battery can be improved.

<Structural Example of Power Storage System>

Structural examples of power storage systems will be described with reference to FIGS. 15A and 15B, FIGS. 16A1, 16A2, 16B1, and 16B2, and FIGS. 17A and 17B. Here, a power storage system refers to, for example, a device including a power storage device.

Figure 15A:
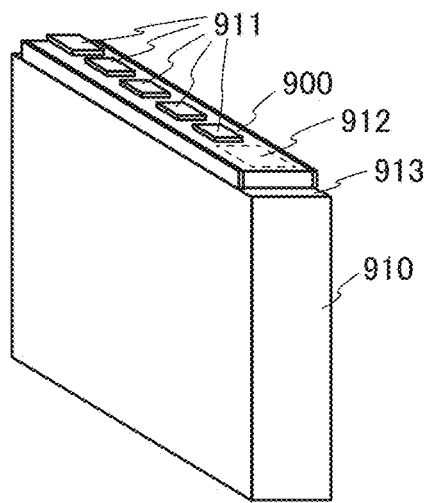
FIGS. 15A and 15B illustrate an example of a power storage device.
Figure 15B:
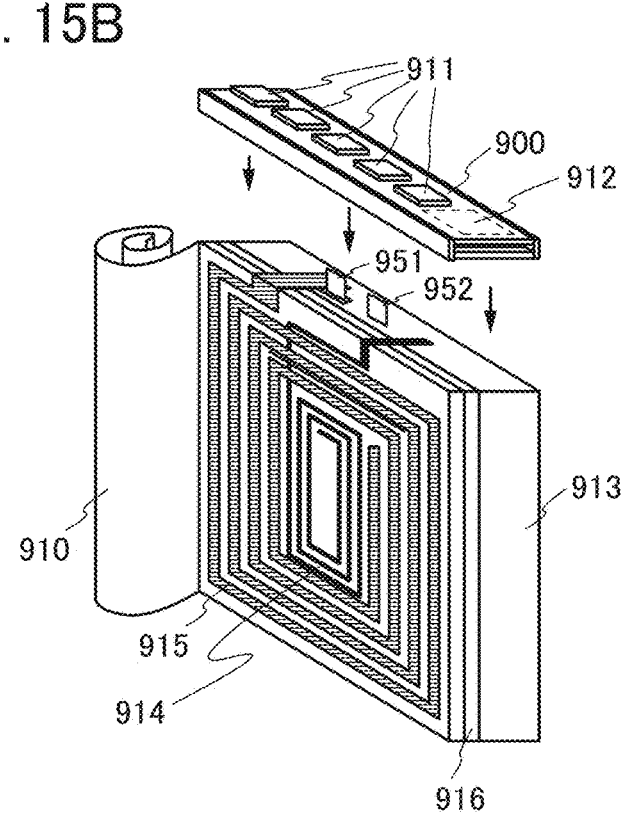

FIGS. 15A and 15B are external views of a power storage system. The power storage system includes a circuit board 900 and a storage battery 913. A label 910 is attached to the storage battery 913. As shown in FIG. 15B, the power storage system further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage system includes a layer 916 between the storage battery 913 and the antennas 914 and 915. The layer 916 may have a function of blocking an electromagnetic field by the storage battery 913. As the layer 916, for example, a magnetic body can be used. The layer 916 may serve as a shielding layer.

Note that the structure of the power storage system is not limited to that illustrated in FIGS. 15A and 15B.

For example, as shown in FIGS. 16A1 and 16A2, two opposite surfaces of the storage battery 913 in FIGS. 15A and 15B may be provided with respective antennas. FIG. 16A1 is an external view showing one side of the opposite surfaces, and FIG. 16A2 is an external view showing the other side of the opposite surfaces. For portions similar to those in FIGS. 15A and 15B, the description of the power storage system illustrated in FIGS. 15A and 15B can be referred to as appropriate.

As illustrated in FIG. 16A1, the antenna 914 is provided on one of the opposite surfaces of the storage battery 913 with the layer 916 interposed therebetween, and as illustrated in FIG. 16A2, the antenna 915 is provided on the other of the opposite surfaces of the storage battery 913 with a layer 917 interposed therebetween. The layer 917 may have a function of preventing an adverse effect on an electromagnetic field by the storage battery 913. As the layer 917, for example, a magnetic body can be used. The layer 917 may serve as a shielding layer.

With the above structure, both of the antennas 914 and 915 can be increased in size.

Alternatively, as illustrated in FIGS. 16B1 and 16B2, two opposite surfaces of the storage battery 913 in FIGS. 15A and 15B may be provided with different types of antennas. FIG. 16B1 is an external view showing one side of the opposite surfaces, and FIG. 16B2 is an external view showing the other side of the opposite surfaces. For portions similar to those in FIGS. 15A and 15B, the description of the power storage system illustrated in FIGS. 15A and 15B can be referred to as appropriate.

As illustrated in FIG. 16B1, the antennas 914 and 915 are provided on one of the opposite surfaces of the storage battery 913 with the layer 916 provided between the storage battery 913 and the antennas 914 and 915, and as illustrated in FIG. 16B2, an antenna 918 is provided on the other of the opposite surfaces of the storage battery 913 with the layer 917 provided therebetween. The antenna 918 has a function of communicating data with an external device, for example. An antenna with a shape that can be applied to the antennas 914 and 915, for example, can be used as the antenna 918. As a system for communication using the antenna 918 between the power storage system and another device, a response method that can be used between the power storage system and another device, such as NFC, can be employed.

Figure 17A:
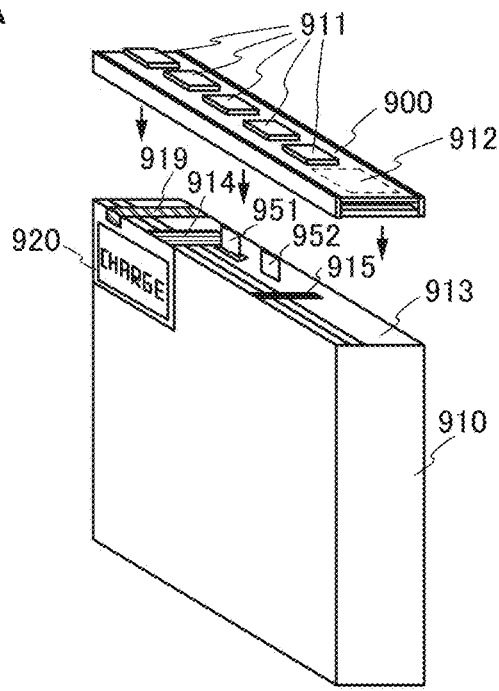
FIGS. 17A and 17B each illustrate an example of a power storage device.

Alternatively, as illustrated in FIG. 17A, the storage battery 913 in FIGS. 15A and 15B may be provided with a display device 920. The display device 920 is electrically connected to the terminal 911 via a terminal 919. It is possible that the label 910 is not provided in a portion where the display device 920 is provided. For portions similar to those in FIGS. 15A and 15B, the description of the power storage system illustrated in FIGS. 15A and 15B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 17B:
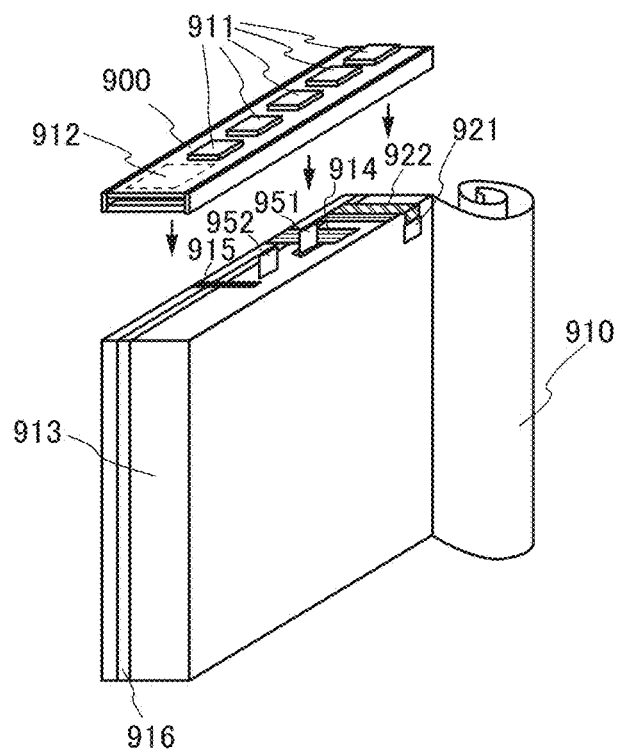

Alternatively, as illustrated in FIG. 17B, the storage battery 913 illustrated in FIGS. 15A and 15B may be provided with a sensor 921. The sensor 921 is electrically connected to the terminal 911 via a terminal 922. For portions similar to those in FIGS. 15A and 15B, the description of the power storage system illustrated in FIGS. 15A and 15B can be referred to as appropriate.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on an environment (e.g., temperature) where the power storage system is placed can be determined and stored in a memory inside the circuit 912.

The electrode of one embodiment of the present invention is used in the storage battery and the power storage system that are described in this embodiment. The capacity of the storage battery and the power storage system can thus be high. Furthermore, energy density can be high. Moreover, reliability can be high, and life can be long.

This embodiment can be implemented in appropriate combination with any of the other embodiments.

Embodiment 4

In this embodiment, an example of an electronic device including a flexible power storage device will be described.

FIGS. 18A to 18G illustrate examples of electronic devices including the flexible power storage device described in Embodiment 3. Examples of electronic devices each including the flexible power storage device include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, the flexible power storage device can be incorporated along a curved inside/outside wall surface of a house or a building or a curved interior/exterior surface of a car.

Figure 18A:
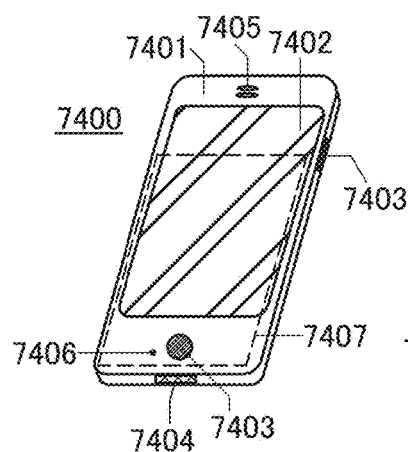
FIGS. 18A to 18G each illustrate an example of an electronic device.

FIG. 18A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 18B:
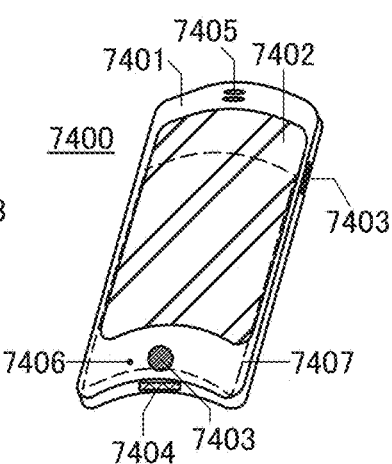
Figure 18C:
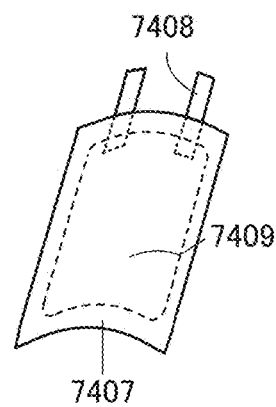

FIG. 18B illustrates the mobile phone 7400 that is bent. When the whole mobile phone 7400 is bent by the external force, the power storage device 7407 included in the mobile phone 7400 is also bent. FIG. 18C illustrates the bent power storage device 7407. The power storage device 7407 is a thin storage battery. The power storage device 7407 is fixed in a state of being bent. Note that the power storage device 7407 includes a lead electrode 7408 electrically connected to a current collector 7409. The current collector 7409 is, for example, copper foil, and partly alloyed with gallium; thus, adhesion between the current collector 7409 and an active material layer in contact with the current collector 7409 is improved and the power storage device 7407 can have high reliability even in a state of being bent.

Figure 18D:
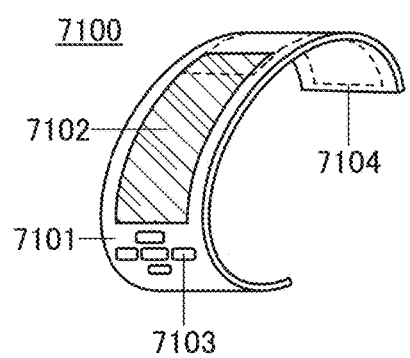
Figure 18E:

FIG. 18D illustrates an example of a bangle display device. A portable display device 7100 includes a housing 7101, a display portion 7102, an operation button 7103, and a power storage device 7104. FIG. 18E illustrates the bent power storage device 7104. When the display device is worn on a user's arm while the power storage device 7104 is bent, the housing changes its form and the curvature of a part or the whole of the power storage device 7104 is changed. Note that the radius of curvature of a curve at a point refers to the radius of the circular arc that best approximates the curve at that point. The reciprocal of the radius of curvature is curvature. Specifically, a part or the whole of the housing or the main surface of the power storage device 7104 is changed in the range of radius of curvature from 40 mm to 150 mm. When the radius of curvature at the main surface of the power storage device 7104 is greater than or equal to 40 mm and less than or equal to 150 mm, the reliability can be kept high.

Figure 18F:
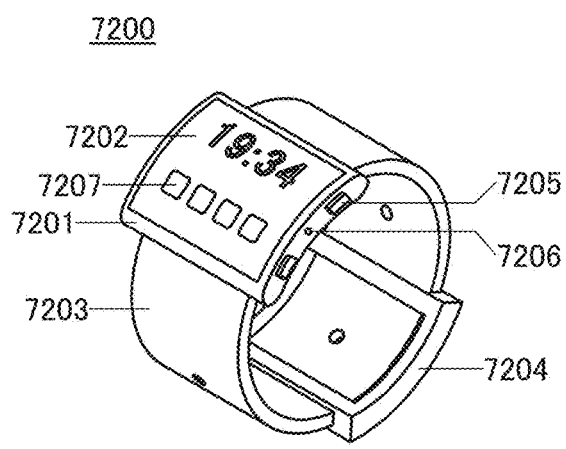

FIG. 18F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, on/off of the power, on/off of wireless communication, setting and cancellation of a manner mode, and setting and cancellation of a power saving mode can be performed. For example, the functions of the operation button 7205 can be set freely by setting the operating system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 is provided with a power storage device including the electrode member of one embodiment of the present invention. For example, the power storage device 7104 illustrated in FIG. 18E that is in the state of being curved can be provided in the housing 7201. Alternatively, the power storage device 7104 illustrated in FIG. 18E can be provided in the band 7203 such that it can be curved.

Figure 18G:
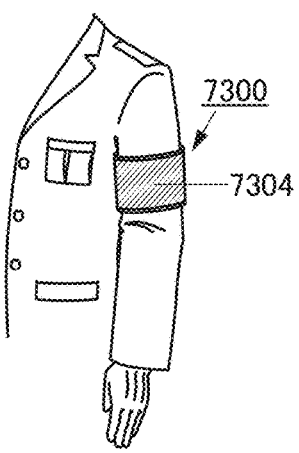

FIG. 18G illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication, which is a communication method based on an existing communication standard.

The display device 7300 includes an input output terminal, and data can be directly transmitted to and received from another information terminal via a connector. In addition, charging via the input output terminal is possible. Note that the charging operation may be performed by wireless power feeding without using the input output terminal.

This embodiment can be implemented in appropriate combination with any of the other embodiments.

Embodiment 5

In this embodiment, examples of electronic devices that can include power storage devices will be described.

Figure 19A:
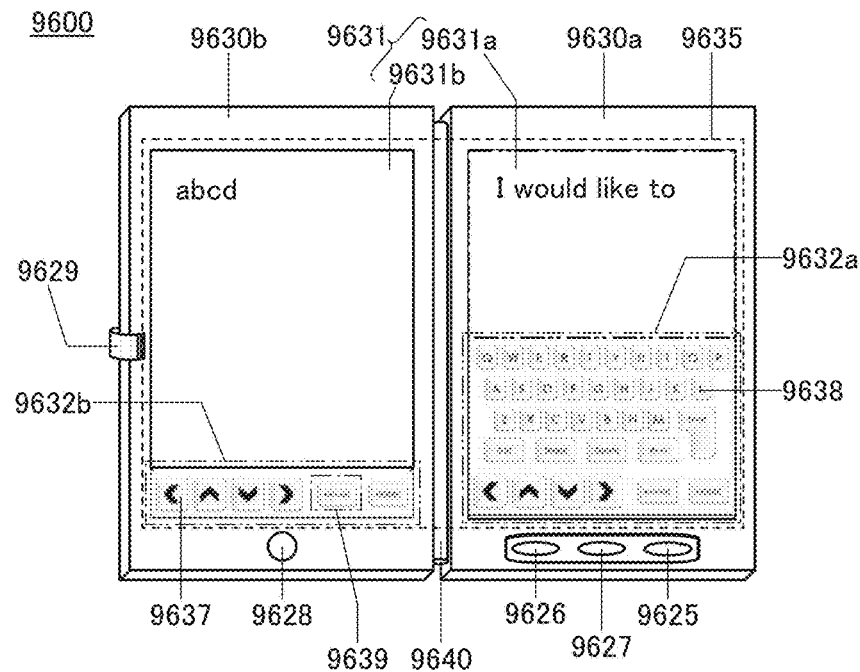
FIGS. 19A to 19C illustrate an example of an electronic device.
Figure 19B:
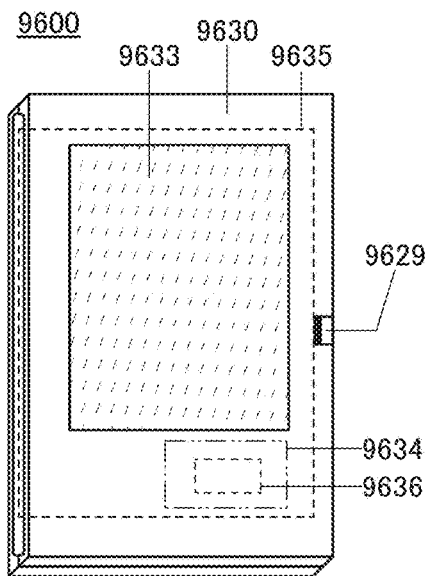

FIGS. 19A and 19B illustrate an example of a tablet terminal that can be folded in half. A tablet terminal 9600 illustrated in FIGS. 19A and 19B includes a housing 9630*a*, a housing 9630*b*, a movable portion 9640 connecting the housings 9630*a* and 9630*b*, a display portion 9631 including a display portion 9631*a* and a display portion 9631*b*, a display mode changing switch 9626, a power switch 9627, a power saving mode changing switch 9625, a fastener 9629, and an operation switch 9628. FIG. 19A illustrates the tablet terminal 9600 that is opened, and FIG. 19B illustrates the tablet terminal 9600 that is closed.

The tablet terminal 9600 includes a power storage unit 9635 inside the housings 9630*a* and 9630*b*. The power storage unit 9635 is provided across the housings 9630*a* and 9630*b*, passing through the movable portion 9640.

Part of the display portion 9631*a* can be a touch panel region 9632*a*, and data can be input by touching operation keys 9638 that are displayed. Note that FIG. 19A shows, as an example, that half of the area of the display portion 9631*a* has only a display function and the other half of the area has a touch panel function. However, the structure of the display portion 9631*a* is not limited to this, and all the area of the display portion 9631*a* may have a touch panel function. For example, all the area of the display portion 9631*a* can display a keyboard and serve as a touch panel while the display portion 9631*b* can be used as a display screen.

As in the display portion 9631*a*, part of the display portion 9631*b* can be a touch panel region 9632*b*. When a keyboard display switching button 9639 displayed on the touch panel is touched with a finger, a stylus, or the like, a keyboard can be displayed on the display portion 9631*b*.

Touch input can be performed in the touch panel region 9632*a* and the touch panel region 9632*b* at the same time.

The display mode changing switch 9626 allows switching between a landscape mode and a portrait mode, color display and black-and-white display, and the like. The power saving mode changing switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Although the display portion 9631*a* and the display portion 9631*b* have the same area in FIG. 19A, one embodiment of the present invention is not limited to this example. The display portion 9631*a* and the display portion 9631*b* may have different areas or different display quality. For example, one of the display portions 9631*a* and 9631*b* may display higher definition images than the other.

The tablet terminal is closed in FIG. 19B. The tablet terminal includes the housing 9630, a solar cell 9633, and a charge and discharge control circuit 9634 including a DCDC converter 9636. The power storage unit of one embodiment of the present invention is used as the power storage unit 9635.

The tablet terminal 9600 can be folded such that the housings 9630*a* and 9630*b* overlap with each other when not in use. Thus, the display portions 9631*a* and 9631*b* can be protected, which increases the durability of the tablet terminal 9600. In addition, the power storage unit 9635 of one embodiment of the present invention has flexibility and can be repeatedly bent without a significant decrease in charge and discharge capacity. Thus, a highly reliable tablet terminal can be provided.

The tablet terminal illustrated in FIGS. 19A and 19B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processing portion, and the like. Note that the solar cell 9633 is preferable because it can be provided on one or both surfaces of the housing 9630 and the power storage unit 9635 can be charged efficiently. The use of a lithium-ion battery as the power storage unit 9635 brings an advantage such as reduction in size.

Figure 19C:
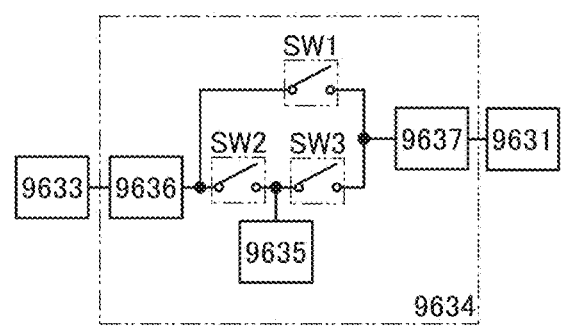

The structure and operation of the charge and discharge control circuit 9634 illustrated in FIG. 19B will be described with reference to a block diagram in FIG. 19C. The solar cell 9633, the power storage unit 9635, the DCDC converter 9636, a converter 9637, switches SW1 to SW3, and the display portion 9631 are illustrated in FIG. 19C, and the power storage unit 9635, the DCDC converter 9636, the converter 9637, and the switches SW1 to SW3 correspond to the charge and discharge control circuit 9634 in FIG. 19B.

First, an example of operation when electric power is generated by the solar cell 9633 using external light will be described. The voltage of electric power generated by the solar cell is raised or lowered by the DCDC converter 9636 to a voltage for charging the power storage unit 9635. When the display portion 9631 operates with the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module capable of performing charging by transmitting and receiving electric power wirelessly (without contact), or any of the other charge means used in combination.

FIG. 20 illustrates other examples of electronic devices. In FIG. 20, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, and the power storage device 8004. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can operate with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 20, an installation lighting device 8100 is an example of an electronic device including a power storage device 8103 of one embodiment of the present invention. Specifically, the lighting device 8100 includes a housing 8101, a light source 8102, and the power storage device 8103. Although FIG. 20 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can operate with the use of power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 20 as an example, the power storage device of one embodiment of the present invention can be used in an installation lighting device provided in, for example, a wall 8105, a floor 8106, a window 8107, or the like other than the ceiling 8104. Alternatively, the power storage device of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 20, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, and the power storage device 8203. Although FIG. 20 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the power storage devices 8203 are provided in both the indoor unit 8200 and the outdoor unit 8204, the air conditioner can operate with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 20 as an example, the power storage device of one embodiment of the present invention can be used in an air conditioner in which the functions of an indoor unit and an outdoor unit are integrated in one housing.

In FIG. 20, an electric refrigerator-freezer 8300 is an example of an electronic device including a power storage device 8304 of one embodiment of the present invention. Specifically, the electric refrigerator-freezer 8300 includes a housing 8301, a refrigerator door 8302, a freezer door 8303, and the power storage device 8304. The power storage device 8304 is provided in the housing 8301 in FIG. 20. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can operate with the use of the power storage device 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the power storage device of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electronic devices are used. For example, in the case of the electric refrigerator-freezer 8300, electric power can be stored in the power storage device 8304 in nighttime when the temperature is low and the refrigerator door 8302 and the freezer door 8303 are not often opened or closed. On the other hand, in daytime when the temperature is high and the refrigerator door 8302 and the freezer door 8303 are frequently opened and closed, the power storage device 8304 is used as an auxiliary power supply; thus, the usage rate of electric power in daytime can be reduced.

This embodiment can be implemented in combination with any of the other embodiments as appropriate.

Embodiment 6

In this embodiment, examples of vehicles using power storage devices will be described.

The use of power storage devices in vehicles enables production of next-generation clean energy vehicles such as hybrid electric vehicles (HEVs), electric vehicles (EVs), and plug-in hybrid electric vehicles (PHEVs).

Figure 21A:
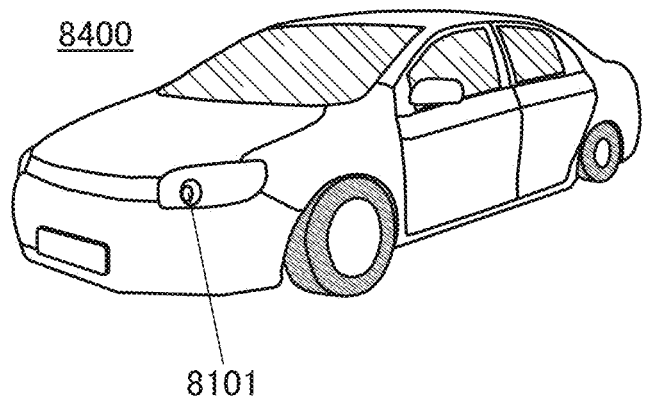
FIGS. 21A and 21B illustrate an example of an electronic device.
Figure 21B:
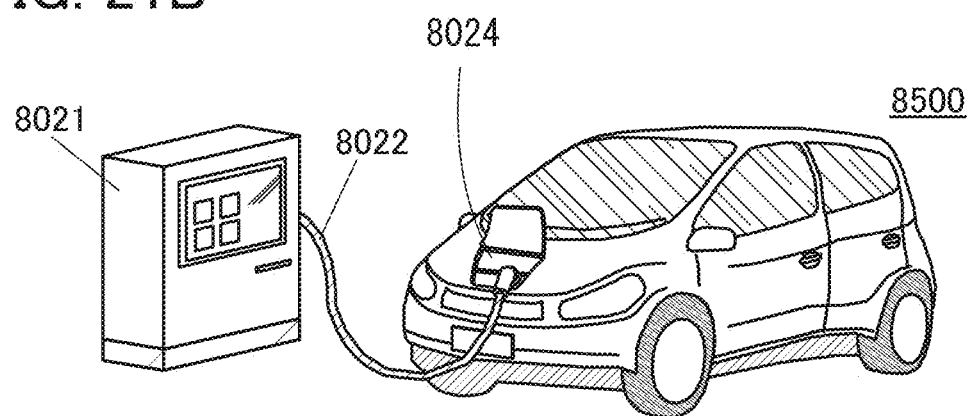

FIGS. 21A and 21B each illustrate an example of a vehicle using one embodiment of the present invention. An automobile 8400 illustrated in FIG. 21A is an electric vehicle that runs on the power of an electric motor. Alternatively, the automobile 8400 is a hybrid electric vehicle capable of driving appropriately using either the electric motor or the engine. One embodiment of the present invention can provide a high-mileage vehicle. The automobile 8400 includes the power storage device. The power storage device is used not only for driving the electric motor, but also for supplying electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

FIG. 21B illustrates an automobile 8500 including a power storage device 8024. The automobile 8500 can be charged when the power storage device 8024 is supplied with electric power through external charging equipment by a plug-in system, a contactless power feeding system, or the like. In FIG. 21B, the power storage device 8024 included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The ground-based charging apparatus 8021 may be a charging station provided in a commerce facility or a power source in a house. For example, with the use of a plug-in technique, the power storage device 8024 included in the automobile 8500 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device included in the vehicle can be used as a power source for supplying electric power to products other than the vehicle. In such a case, the use of a commercial power source can be avoided at peak time of electric power demand.

This embodiment can be implemented in appropriate combination with any of the other embodiments.

Example 1

In this example, an active material was formed by the method described in Embodiment 1. Measurement results of the characteristics of a battery including an electrode containing the active material will be described.

<Synthesis of Lithium-Manganese Composite Oxide>

First, $Li_2CO_3$, $MnCO_3$, and NiO were weighed as starting materials so that the ratio for weighing (molar ratio) of $Li_2CO_3$ to $MnCO_3$ and NiO becomes 0.84:0.8062:0.318. Then, ethanol was added to the starting materials. After that, ethanol and the starting materials were mixed for 30 minutes in a chamber of a bead mill rotating at a peripheral speed of 10 m/s to obtain a mixed material.

Next, heat treatment was performed on the mixed material at 75° C. in an air atmosphere so that ethanol contained in the mixed material was evaporated; thus, a mixed material was obtained.

Subsequently, the mixed material was put in a crucible and firing was performed at 1000° C. in an air gas (dry air) atmosphere at a flow rate of 10 L/min for 10 hours, whereby lithium-manganese composite oxides were synthesized. The lithium-manganese composite oxides were a plurality of primary particles sintered to be large secondary particles.

Then, crushing treatment was performed to separate the sintered lithium-manganese composite oxides. In crushing treatment, after ethanol was added to the sintered lithium-manganese composite oxides, crushing and grinding were performed for 10 hours in a chamber of a bead mill rotating at a peripheral speed of 4 m/s; as a result, a powdery lithium-manganese composite oxide was obtained.

After that, heat treatment was performed on the lithium-manganese composite oxides subjected to the crushing treatment. The heat treatment was performed at 75° C. in an air atmosphere so that ethanol was evaporated; thus, a powdery lithium-manganese composite oxide (sample A) was obtained. Although this lithium-manganese composite oxide is represented by a composition formula $Li_{1.68}Mn_{0.8062}Ni_{0.318}O_3$, the composition might be different.

<Cross-Sectional TEM Photograph>

Figure 22:
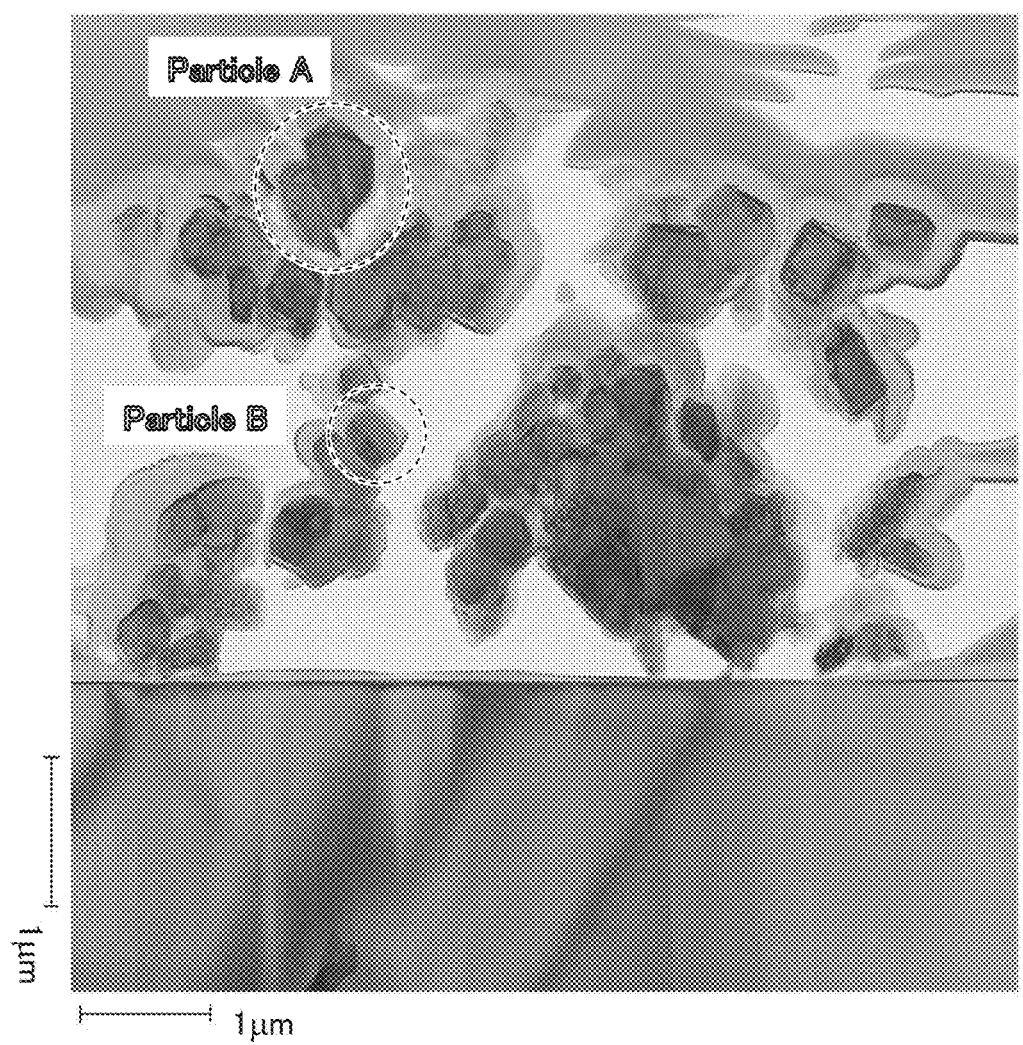
FIG. 22 shows a cross-sectional TEM observation result of lithium-manganese composite oxides.

Next, the powdery lithium-manganese composite oxide was sliced using a focused ion beam system (FIB) and then a cross section thereof was observed with a transmission electron microscope (TEM). FIG. 22 shows the TEM observation result. As shown in FIG. 22, the lithium-manganese composite oxides subjected to the crushing treatment are aggregates of the primary particles and powder of particles as small as the primary particle.

Figure 23A:
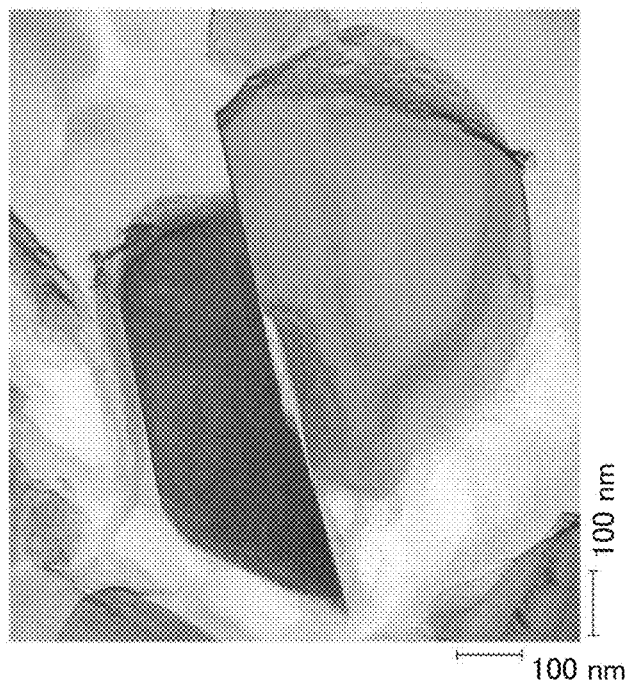
FIGS. 23A and 23B each show a cross-sectional TEM observation result of a lithium-manganese composite oxide.
Figure 23B:
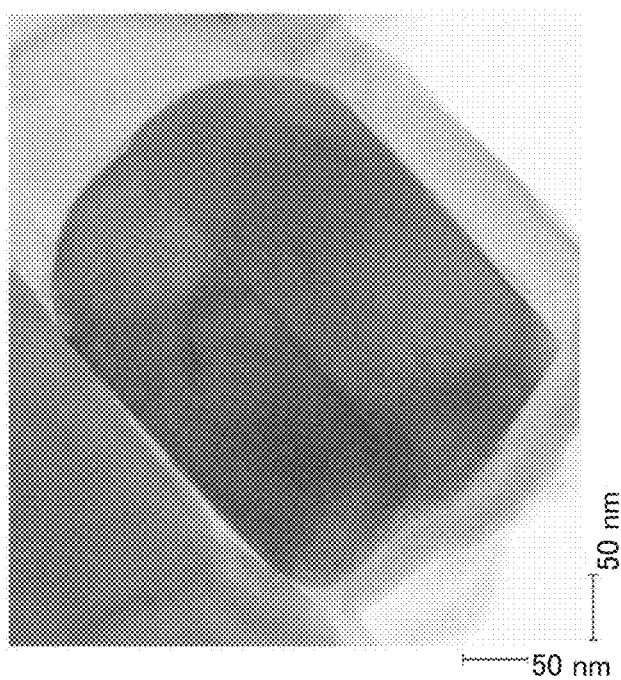

FIGS. 23A and 23B shows observation results at higher magnification than FIG. 22. FIG. 23A is an enlarged photograph of a particle A in FIG. 22 and FIG. 23B is an enlarged photograph of a particle B in FIG. 22.

As shown in FIG. 23A, one primary particle is cleaved. Furthermore, as shown in FIG. 23B, another primary particle has a linear crack. FIGS. 23A and 23B indicate that some sintered primary particles are cleaved by the crushing treatment.

<Electron Diffraction Method>

Next, measurement results of crystal orientation in the lithium-manganese composite oxide obtained by an electron diffraction method will be described.

Figure 24A:
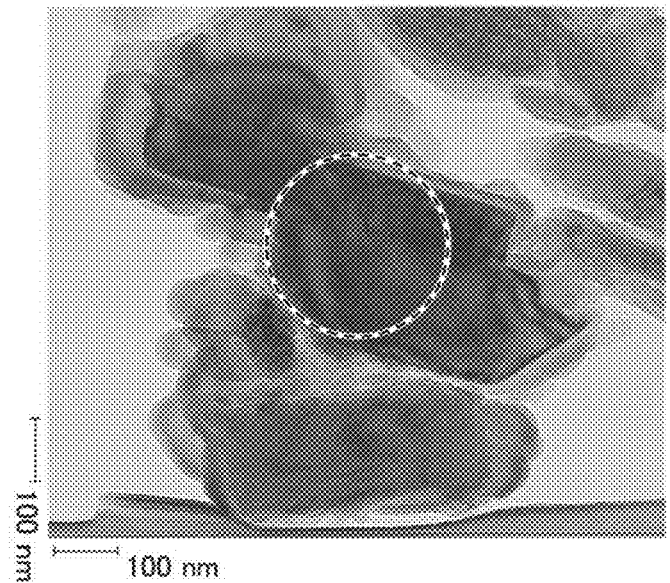
FIGS. 24A and 24B show a cross-sectional TEM observation result and an electron diffraction result of a lithium-manganese composite oxide.

As pretreatment, the lithium-manganese composite oxide was sliced using a focused ion beam system (FIB) and then a cross section thereof was observed with a transmission electron microscope (TEM). FIG. 24A shows a cross-sectional TEM observation result.

Figure 24B:
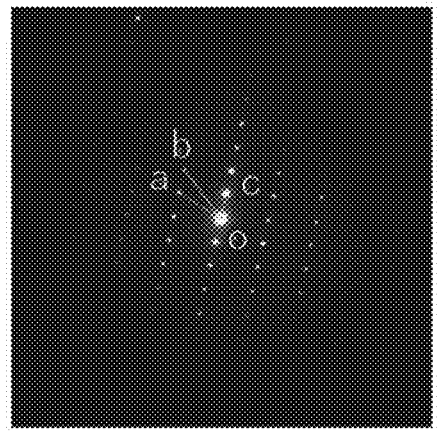

After that, an electron diffraction measurement of a region surrounded by a dotted line in FIG. 24A (approximately 0.3 μmϕ) was performed. FIG. 24B shows the result of the electron diffraction measurement.

A diffraction pattern in FIG. 24B indicates that the lattice spacing (d value) of a diffraction spot a is 0.232 nm, the d value of a diffraction spot b is 0.183 nm, and the d value of a diffraction spot c is 0.453 nm. The diffraction pattern also indicates that ∠aob is 21.8°, ∠aoc is 71.3°, and ∠boc is 50.5°.

Note that according to a database, the d value of a (200) plane of $Li_2MnO_3$ (84-1634) obtained by electron beam incident in a [010] direction is 0.233 nm, the d value of a (201) plane is 0.185 nm, the d value of a (001) plane is 0.474 nm, ∠aob is 21.6°, ∠aoc is 70.5°, and ∠boc is 48.8°, whereas the d value of a (13-1) plane obtained by electron beam incident in a [013] direction is 0.233 nm, the d value of a (23-1) plane is 0.185 nm, the d value of a (100) plane is 0.465 nm, ∠aob is 21.9°, ∠aoc is 70.3°, and ∠boc is 48.3°.

The comparison of the values obtained by the result in FIG. 24B and the values in the database suggests that the crystal plane of the cleavage plane of the lithium-manganese composite oxide is the (100) plane or the (001) plane.

Example 2

In this example, results of scanning transmission electron microscopy (STEM) and electron energy-loss spectroscopy (EELS) performed on the powdery lithium-manganese composite oxide formed in Example 1 on which a layer containing carbon was formed will be described.

First, 0.03 g of graphene oxide and 5 g of water were mixed in a mixer to form a dispersion solution of the graphene oxide. In the mixing, ⅕ of the water was used in the first mixing, another ⅕ of the water was added in the second mixing, another ⅕ of the water was added in the third mixing, and ⅖ of the water was added in the fourth mixing. Five-minute mixing was performed at 2000 rpm four times.

Next, 15 g of the lithium manganese composite oxide obtained in Example 1 (sample A) and 4.0 g of water were put in the formed aqueous dispersion solution, and the mixture was kneaded four times. Five-minute kneading was performed at 2000 rpm in a mixer four times.

The obtained mixture was dried under reduced pressure in a bell jar at 50° C. and then ground in an alumina mortar, so that the lithium manganese composite oxide covered with graphene oxide was obtained.

Then, the graphene oxide covering the surface of the lithium manganese composite oxide was reduced. Ascorbic acid was used as a reducing agent, and an ethanol water solution at a concentration of 80% was used as a solvent. After that, 16.87 wt % of the ascorbic acid and 3.9 wt % of lithium hydroxide, the weight percentages were with respect to the weight of the lithium-manganese composite oxides covered with graphene oxide, were put and a reducing solution was formed. The obtained powder was put in the reducing solution, and reduction was performed at 60° C. for 3 hours.

Then, the obtained solution was filtrated by suction filtration. For the filtration, filter paper with a particle retention capability of 1 μm was used. After that, washing and another filtration were performed, and the resulting powder was ground in a mortar. After that, drying was performed at 170° C. under reduced pressure for 10 hours.

Through the above steps, a powdery lithium-manganese composite oxide (sample B) in which graphene was formed on a surface was formed.

Figure 25:
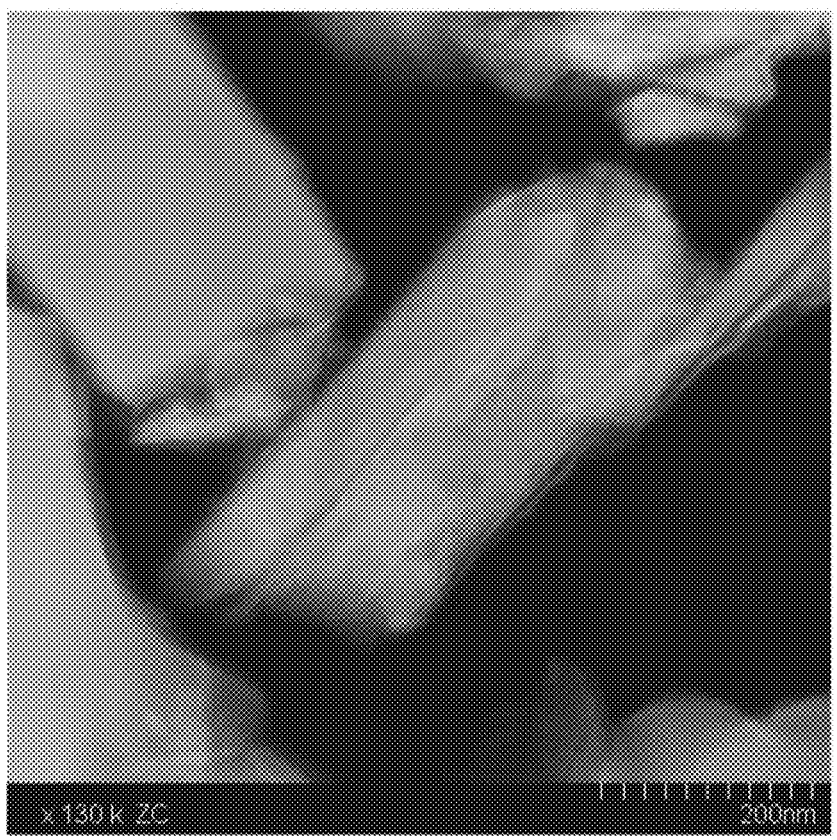
FIG. 25 shows a STEM observation result of an active material.

FIG. 25 shows a result of STEM observation performed on the lithium-manganese composite oxide in which graphene was formed on the surface.

Figure 26:
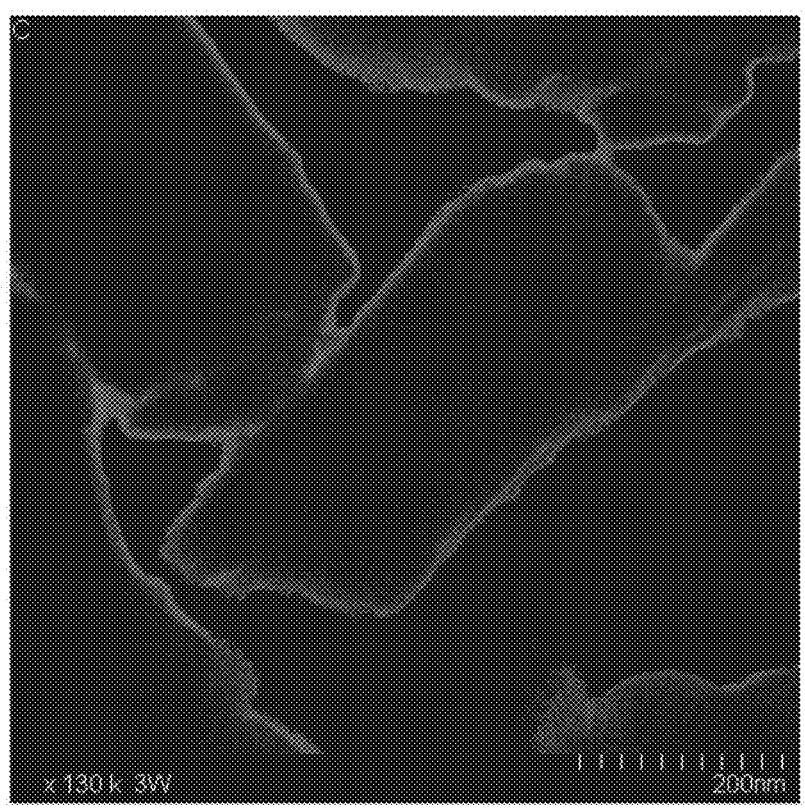
FIG. 26 shows an EELS analysis result of an active material.
Figure 27:
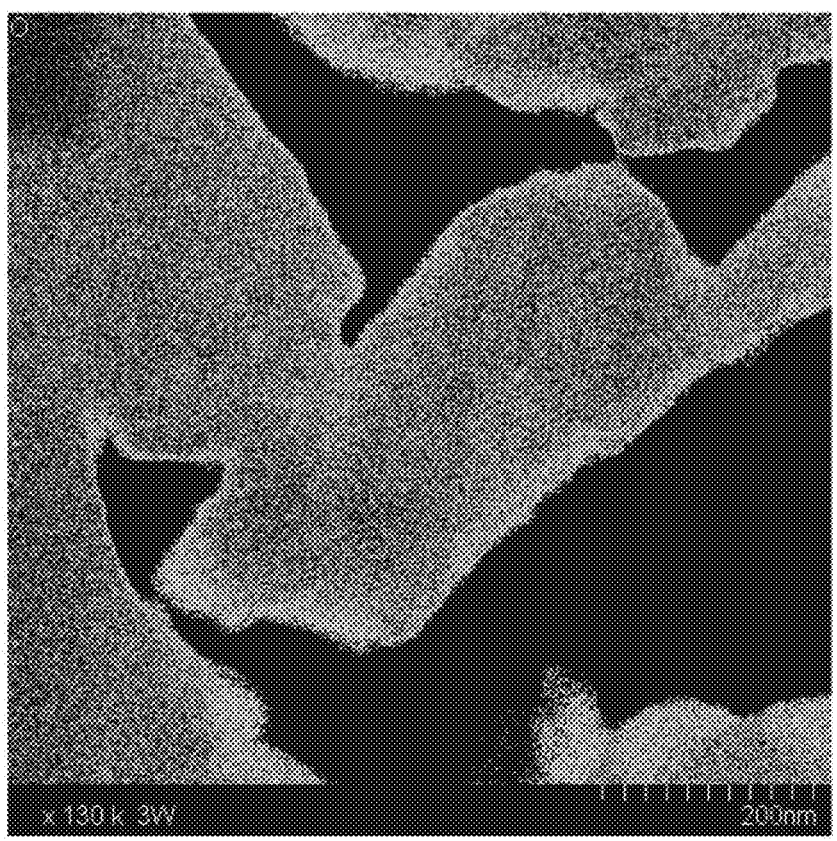
FIG. 27 shows an EELS analysis result of an active material.
Figure 28:
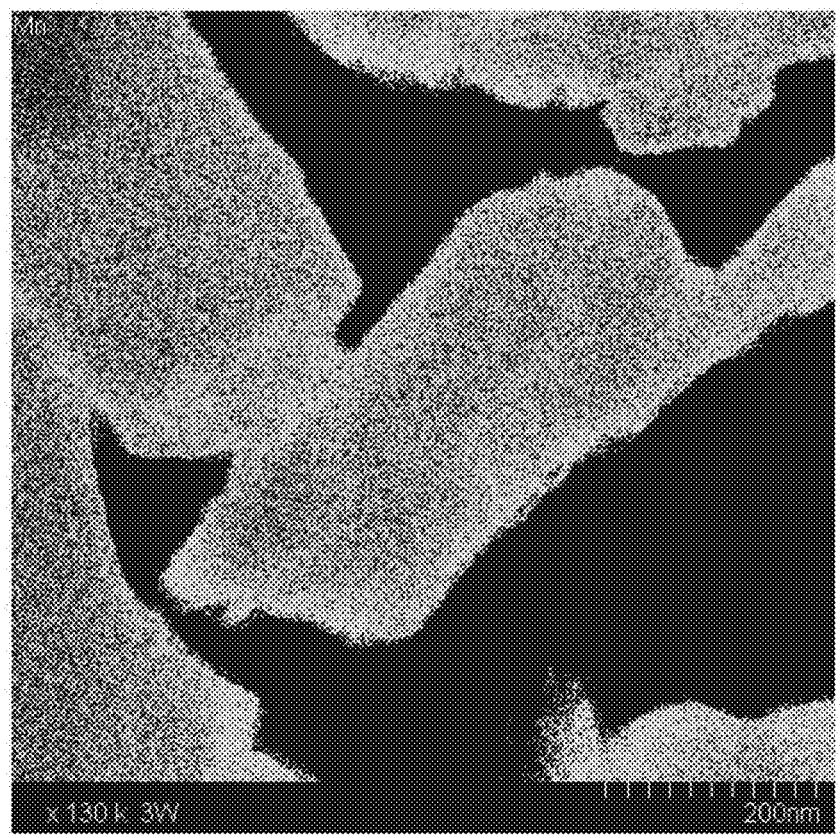
FIG. 28 shows an EELS analysis result of an active material.

An EELS analysis was also performed on a region on which the STEM observation was performed. FIG. 26 to FIG. 28 show EELS analysis results of the same portion as that of the observation image in FIG. 25. FIG. 26 is an analysis result of carbon, FIG. 27 is an analysis result of oxygen, and FIG. 28 is an analysis result of manganese.

Figure 29A:
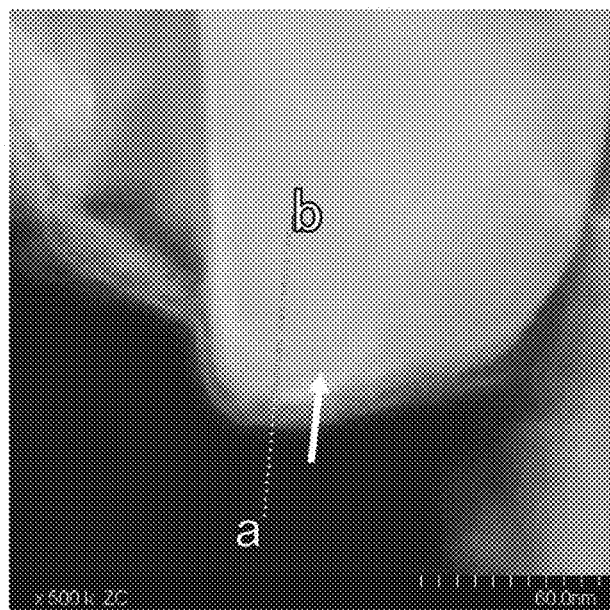
FIG. 29A shows a STEM observation result of an active material and FIG. 29B shows EELS linear analysis results of the active material.
Figure 29B:
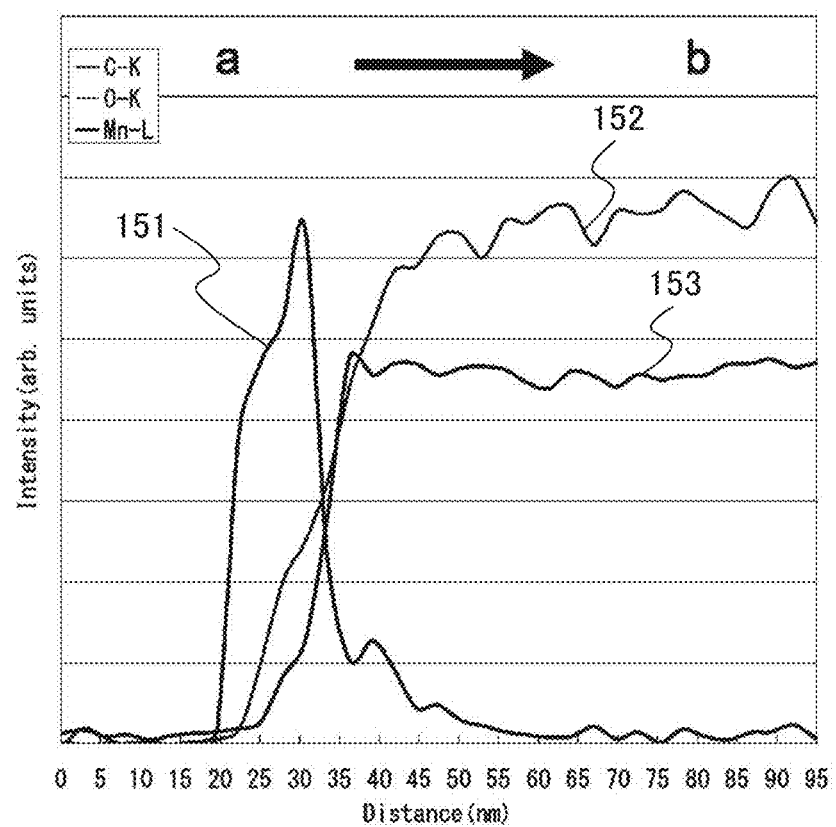

FIG. 29A shows a portion subjected to a linear analysis, and FIG. 29B shows linear analysis results of C, O, and Mn. In FIG. 29B, a solid line 151, a solid line 152, and a solid line 153 indicate the linear analysis result of C, the linear analysis result of O, and the linear analysis result of Mn, respectively. FIGS. 29A and 29B suggest that there is a region in a film form that contains C and O and is in contact with the lithium-manganese composite oxide.

Example 3

In this example, measurement results of the cycle characteristics of half cells, which were fabricated using electrodes containing the active material of one embodiment of the present invention, will be described.

Table 1 shows components of the electrodes and the half cells used in this example.

TABLE 1

|  | Cell | Electrode | Active material | Conductive additive | Binder | Ratio [wt %] |
| --- | --- | --- | --- | --- | --- | --- |
| Half cell | Comparative cell A | Comparative electrode A | Sample A | AB | PVdF | Sample A:AB:PVdF = 90:5:5 |
|  | Cell B | Electrode B | Sample B | AB | PVdF | Sample B:AB:PVdF = 90:5:5 |
|  | Cell C | Electrode C | Sample C | AB | PVdF | Sample C:AB:PVdF = 90:5:5 |
|  | Cell D | Electrode D | Sample D | AB | PVdF | Sample D:AB:PVdF = 90:5:5 |
|  | Cell E | Electrode E | Sample E | AB | PVdF | Sample E:AB:PVdF = 90:5:5 |

First, a comparative electrode A, an electrode B, an electrode C, an electrode D, and an electrode E used to fabricate the half cells will be described.

The sample A formed in Example 1 was used as an active material of the comparative electrode A, and the sample B formed in Example 2 was used as an active material of the electrode B.

Here, samples C to E which were used as active materials of the electrodes C to E will be described.

A powdery lithium-manganese composite oxide was formed in a manner similar to that of the sample A described in Example 1. After that, heat treatment was performed on the powdery lithium-manganese composite oxide in an air gas (dry air) atmosphere at a flow rate of 10 L/min for 10 hours. The heating temperatures were set to 600° C., 700° C., and 800° C.

Then, the powdery lithium-manganese composite oxide subjected to the heat treatment was covered with graphene in a manner similar to that in Example 2. The lithium-manganese composite oxides formed at a heating temperature of 600° C., 700° C., and 800° C. were the sample C, the sample D, and the sample E, respectively.

Here, a method for forming the electrode B including the sample B is described.

To form the electrode B, the sample B described in Example 2 was used as an active material, acetylene black (AB) was used as a conductive additive, and PVdF was used as a binder.

First, PVdF which was a binder and acetylene black (AB) which was a conductive additive were mixed with N-methyl-2-pyrrolidone (NMP) which was a polar solvent. Note that five-minute mixing was performed at 2000 rpm five times. Then, the sample B was added as an active material and five-minute mixing was performed at 2000 rpm five times. After that, NMP was added and ten-minute mixing was performed at 2000 rpm twice. Through the above steps, a slurry electrode binder composition was obtained. The compounding ratio of the sample B to AB and PVdF in the electrode binder composition was 90:5:5 (weight ratio).

Next, the electrode binder composition was applied to aluminum foil which was a current collector. Note that a surface of the aluminum foil was covered with an undercoat in advance. After that, drying was performed at 80° C. for 30 minutes in a circulation drying furnace. An electrode formed through the above steps was the electrode B.

Then, the electrode was pressed with a roller press machine while the press pressure was adjusted so that the thickness after application of the electrode binder composition was reduced by 20%. The press temperature was 120° C.

As the comparative electrode A, an electrode was formed using the sample A described in Example 1. The comparative electrode A was formed in the same manner as the electrode B except that the sample A was used as an active material.

The electrodes C to E were formed using the samples C to E. The electrode C was formed in the same manner as the electrode B except that the sample C was used as an active material. The electrode D was formed in the same manner as the electrode B except that the sample D was used as an active material. The electrode E was formed in the same manner as the electrode B except that the sample E was used as an active material.

Next, a half cell was fabricated using the electrode B as a positive electrode. For the cell, a coin cell was used. Lithium was used for a counter electrode of the half cell. An electrolytic solution was formed by dissolving $LiPF_6$ as an electrolyte in a mixed solution containing ethylene carbonate and diethyl carbonate, which are aprotic organic solvents, at a volume ratio of 1:1. As the separator, polypropylene (PP) was used. A half cell fabricated using the electrode B was a cell B.

A half cell was fabricated using the comparative electrode A as a positive electrode. The comparative half cell was fabricated in the same manner as the cell B except that the comparative electrode A was used as a positive electrode. The half cell fabricated using the comparative electrode A is a comparative cell A.

Cells C to E were fabricated using the electrodes C to E. The cell C was formed in the same manner as the cell B except that the electrode C was used as a positive electrode. The cell D was formed in the same manner as the cell B except that the electrode D was used as a positive electrode. The cell E was formed in the same manner as the cell B except that the electrode E was used as a positive electrode.

Then, the cycle characteristics of the comparative cell A and the cells B to E were measured. In a cycle test, constant current charging was performed with a current density per active material weight of 30 mA/g until the voltage reached a termination voltage of 4.8 V. Constant current discharging was performed with a current density of 30 mA/g until the voltage reached a termination voltage of 2.0 V. The temperature during the charging and discharging was 25° C. In the cycle test, constant current charging and discharging were repeated.

Figure 30A:
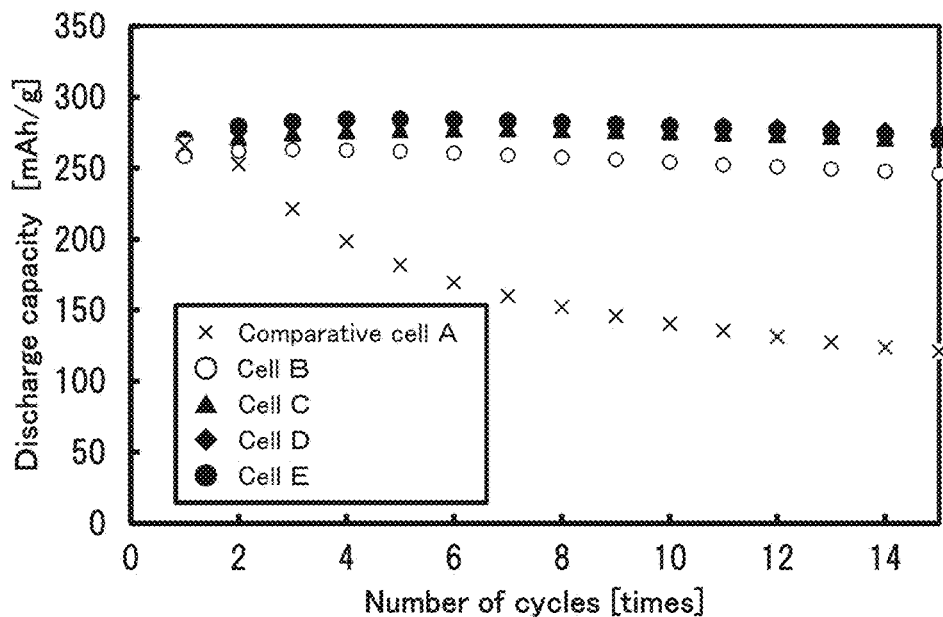
FIGS. 30A and 30B each show discharge capacity associated with charge and discharge cycles.
Figure 30B:
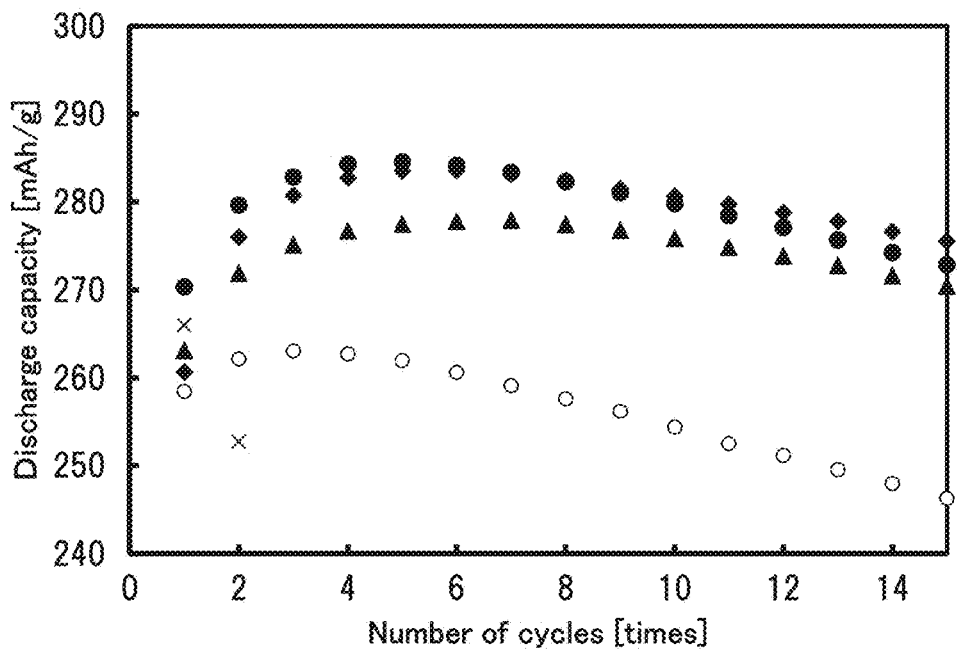

FIGS. 30A and 30B show the charge-discharge cycle characteristics of the comparative cell A and the cells B to E. In FIGS. 30A and 30B, a longitudinal axis represents discharge capacity (mAh/g) and a lateral axis represents the number of cycles (times). Here, capacity was normalized by the weight of the positive electrode active material. In FIGS. 30A and 30B, a plot of the cell B is indicated by open circles, a plot of the comparative cell A is indicated by crosses, a plot of the cell C is indicated by black triangles, a plot of the cell D is indicated by black squares, and a plot of the cell E is indicated by black circles. Note that FIG. 30A shows discharge capacity greater than or equal to 0 mAh/g and less than or equal to 350 mAh/g, and FIG. 30B shows discharge capacity greater than or equal to 240 mAh/g and less than or equal to 300 mAh/g.

As shown in FIG. 30A, the discharge capacity of the comparative cell A decreases after the third cycle whereas the discharge capacity of the cell B does not greatly change even after the fifteenth cycle. In addition, as shown in FIG. 30B, the discharge capacity of each of the cells C to E is greater than that of the cell B.

Figure 31:
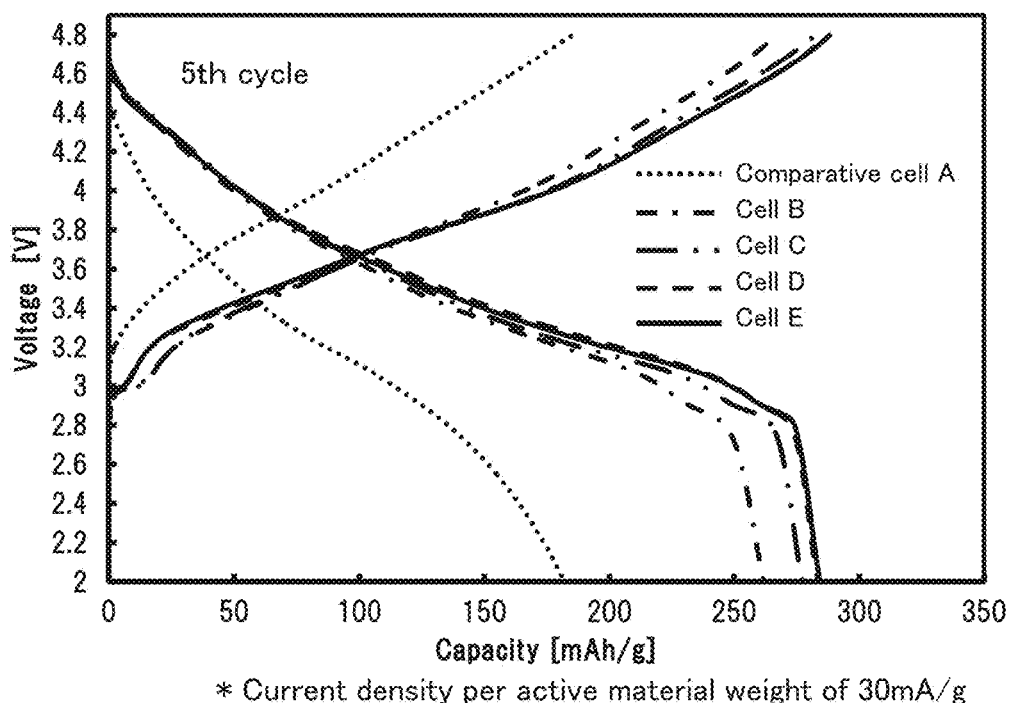
FIG. 31 shows charge and discharge characteristics after the fifth cycle.

FIG. 31 shows the charge and discharge characteristics of the comparative cell A and the cells B to E after the fifth cycle. In FIG. 31, a longitudinal axis represents voltage (V) and a lateral axis represents capacity (mAh/g). In FIG. 31, a dashed-dotted line indicates the charge and discharge characteristics of the cell B, a dotted line indicates the charge and discharge characteristics of the comparative cell A, a two-dot chain line indicates the charge and discharge characteristics of the cell C, a dashed line indicates the charge and discharge characteristics of the cell D, and a solid line indicates the charge and discharge characteristics of the cell E.

As shown in FIG. 31, although the discharge capacity of the comparative cell A decreases to less than 200 mAh/g, the discharge capacity of each of the cells B to E is greater than or equal to 250 mAh/g.

The results in FIGS. 30A and 30B and FIG. 31 indicate that owing to the lithium-manganese composite oxides covered with graphene, the capacity is increased and the cycle characteristics are improved. The results also indicate that heat treatment after the crushing treatment further increases the capacity and further improves the cycle characteristics.

Example 4

In this example, measurement results of the cycle characteristics of full cells, which were fabricated using electrodes containing the active material of one embodiment of the present invention, will be described.

Table 2 shows components of the positive electrodes and the full cells used in this example.

TABLE 2

| | Cell | Electrode | Active material | Conductive additive | Binder | Ratio [wt %] |
|---|---|---|---|---|---|---|
| Full cell | Cell F | Electrode F | Sample B | AB | PVdF | Sample B:AB:PVdF = 90:5:5 |
| | Comparative cell G | Comparative electrode G | Sample A | AB | PVdF | Sample A:AB:PVdF = 90:5:5 |
| | Cell H | Electrode H | Sample F | AB | PVdF | Sample F:AB:PVdF = 90:5:5 |

First, a method for fabricating a sample F used in this example will be described.

<Synthesis of Lithium-Manganese Composite Oxide>

First, $Li_2CO_3$, $MnCO_3$, and NiO were weighed as starting materials so that the ratio for weighing (molar ratio) of $Li_2CO_3$ to $MnCO_3$ and NiO becomes 0.84:0.8062:0.318. Then, NiO was ground with a bead mill. The grinding treatment was performed for 30 minutes in a chamber of the bead mill rotating at a peripheral speed of 12 m/s. After that, $Li_2CO_3$ and $MnCO_3$ were added to NiO. Subsequently, $Li_2CO_3$, $MnCO_3$, and NiO were mixed for 30 minutes in a chamber of a bead mill rotating at a peripheral speed of 10 m/s to obtain a mixed material.

Next, heat treatment was performed on the mixed material at 75° C. in an air atmosphere so that ethanol contained in the mixed material was evaporated; thus, a mixed material was obtained.

Subsequently, the mixed material was put in a crucible and firing was performed at 1000° C. in an air gas (dry air) atmosphere at a flow rate of 10 L/min for 10 hours, whereby lithium-manganese composite oxides were synthesized.

Then, crushing treatment was performed to separate the sintered lithium-manganese composite oxides. In crushing treatment, after ethanol was added to the sintered lithium-manganese composite oxides, crushing and grinding were performed for 35 hours in a chamber of a bead mill rotating at a peripheral speed of 4 m/s; as a result, a powdery lithium-manganese composite oxide was obtained.

After that, heat treatment was performed on the lithium-manganese composite oxides subjected to the crushing treatment, at 800° C. in an air gas (dry air) atmosphere at a flow rate of 10 L/min for 3 hours. Although this lithium-manganese composite oxide is represented by a composition formula $Li_{1.68}Mn_{0.8062}Ni_{0.318}O_3$, the composition might be different.

Then, 0.03 g of graphene oxide and 5 g of water were mixed in a mixer to form a dispersion solution of the graphene oxide. In the mixing, ⅕ of the water was used in the first mixing, another ⅕ of the water was added in the second mixing, another ⅕ of the water was added in the third mixing, and ⅖ of the water was added in the fourth mixing. Five-minute mixing was performed at 2000 rpm four times.

Next, 15 g of the lithium manganese composite oxide and 4.0 g of water were put in the formed aqueous dispersion solution, and the mixture was kneaded four times. Five-minute kneading was performed at 2000 rpm in a mixer four times.

The obtained mixture was dried under reduced pressure in a bell jar at 50° C. and then ground in an alumina mortar, so that the lithium manganese composite oxide covered with graphene oxide was obtained.

Then, the graphene oxide covering the surface of the lithium manganese composite oxide was reduced. Ascorbic acid was used as a reducing agent, and an ethanol water solution at a concentration of 80% was used as a solvent. After that, 16.3 wt % of the ascorbic acid and 3.9 wt % of lithium hydroxide, the weight percentages were with respect to the weight of the lithium-manganese composite oxides covered with graphene oxide, were put and a reducing solution was formed. The obtained powder was put in the reducing solution, and reduction was performed at 60° C. for 3 hours.

Then, the obtained dispersion liquid was filtrated by suction filtration. For the filtration, filter paper with a particle retention capability of 1 μm was used. After that, washing and another filtration were performed.

Next, pure water was added to the substance from which the solvent was separated to obtain a dispersion liquid at a concentration of 15 g/l. Subsequently, the obtained dispersion liquid was heated at 60° C., supplied to a spray dryer device, and subjected to spray dry treatment at 150° C.

Then, powder obtained by the spray dry treatment was dried at 170° C. under reduced pressure for 10 hours.

Through the above steps, a powdery lithium-manganese composite oxide (sample F) in which graphene was formed on a surface was formed.

Here, a method for forming an electrode F including the sample B is described.

To form the electrode F, the sample B was used as an active material, acetylene black was used as a conductive additive, and PVdF was used as a binder.

First, PVdF which was a binder and acetylene black (AB) which was a conductive additive were mixed with N-methyl-2-pyrrolidone (NMP) which was a polar solvent. Note that five-minute mixing was performed at 2000 rpm five times. Then, the sample B was added as an active material and five-minute mixing was performed at 2000 rpm five times. After that, NMP was added and ten-minute mixing was performed at 2000 rpm twice. Through the above steps, a slurry electrode binder composition was obtained. The compounding ratio of the sample B to AB and PVdF in the electrode binder composition was 90:5:5 (weight ratio).

Next, the electrode binder composition was applied to aluminum foil which was a current collector. Note that a surface of the aluminum foil was covered with an undercoat in advance. After that, drying was performed at 80° C. for 30 minutes in a circulation drying furnace.

Then, the electrode was pressed with a roller press machine while the press pressure was adjusted so that the thickness after application of the electrode binder composition was reduced by 20%. The press temperature was 120° C.

After that, another heat treatment was performed at 250° C. in a reduced pressure atmosphere (1 kPa) for 10 hours.

Through the above process, the electrode F including the sample B was formed.

A comparative electrode G was formed using the sample A in a manner similar to that of the comparative electrode A. An electrode H was formed using the sample F. The electrode H was formed under the same conditions as the electrode F except that the sample B in the electrode F was changed to the sample F.

Then, a negative electrode in the full cell was formed.

First, MCMB graphite was used as an active material, VGCF was used as a conductive additive, and CMC and SBR were used as binders to form a paste electrode binder composition in which the weight ratio of MCMB graphite to VGCF, CMC, and SBR was 96:1:1:2. Pure water was used as a solvent of the electrode binder composition.

In forming the electrode binder composition, MCMB graphite with the film containing silicon oxide, VGCF, and a small amount of pure water were mixed first, an aqueous solution where CMC was uniformly dissolved in pure water was added to the mixture, and then mixing was performed. The mixing was performed with a planetary mixer.

Then, an SBR dispersion liquid was added to the mixture, and mixing was performed with a mixer.

Pure water was then added to the mixture until a predetermined viscosity was obtained, and mixing was performed with a mixer for 5 minutes twice.

Subsequently, the electrode binder composition was applied to a current collector with the use of a blade and then dried. For the drying, the surface of the paste was dried at 30° C. in an air atmosphere and then the temperature was raised to 50° C., and the surface of the slurry was further dried at 100° C. in a reduced pressure atmosphere for ten hours. As the current collector, 18-μm-thick rolled copper foil was used.

Through the above steps, the negative electrode was formed.

Next, single-layer thin storage batteries (full cells) were fabricated using the formed positive and negative electrodes. An aluminum film covered with a heat sealing resin was used as an exterior body. The electrolytic solution was formed in such a manner that an additive such as VC or PS was added to a solvent mainly containing EC, DEC, and ethyl methyl carbonate (EMC). As each separator, 25-μm-thick polypropylene (PP) was used. A full cell fabricated using the electrode F as a positive electrode was a cell F, a full cell fabricated using the comparative electrode G as a positive electrode was a cell G, and a full cell fabricated using the electrode H as a positive electrode was a cell H.

The cell F, the comparative cell G, and the cell H were subjected to aging. Note that rates were calculated using 240 mAh/g as a reference. First, charging was performed at 0.01 C with the upper voltage limit set to 4.0 V, and then degassing was performed to reseal. After that, discharging was performed at 0.1 C with the lower voltage limit set to 2 V, charging was performed at 0.01 C with the upper voltage limit set to 4.1 V, discharging was performed at 0.1 C with the lower voltage limit set to 2 V, charging was performed at 0.01 C with the upper voltage limit set to 4.2 V, discharging was performed at 0.1 C with the lower voltage limit set to 2 V, charging was performed at 0.01 C with the upper voltage limit set to 4.3 V, discharging was performed at 0.1 C with the lower voltage limit set to 2 V, charging was performed at 0.01 C with the upper voltage limit set to 4.4 V, discharging was performed at 0.1 C with the lower voltage limit set to 2 V, charging was performed at 0.01 C with the upper voltage limit set to 4.5 V, discharging was performed at 0.1 C with the lower voltage limit set to 2 V, charging was performed at 0.01 C with the upper voltage limit set to 4.6 V, and discharging was performed at 0.1 C with the lower voltage limit set to 2 V. Then, degassing was performed again to reseal.

After the aging, the cycle characteristics of the cell F, the comparative cell G, and the cell H were measured. Constant current charging and discharging at a rate of 0.2 C were repeated for a cycle test. In the cycle test, charging and discharging were repeated 50 times with the upper voltage limit set to 4.6 V and the lower voltage limit set to 2 V. Note that rates were calculated using 184.40 mAh/g as a reference when the electrode F or the electrode H was used as the positive electrode and 192.05 mAh/g as a reference when the comparative electrode G was used as the positive electrode.

Figure 32:
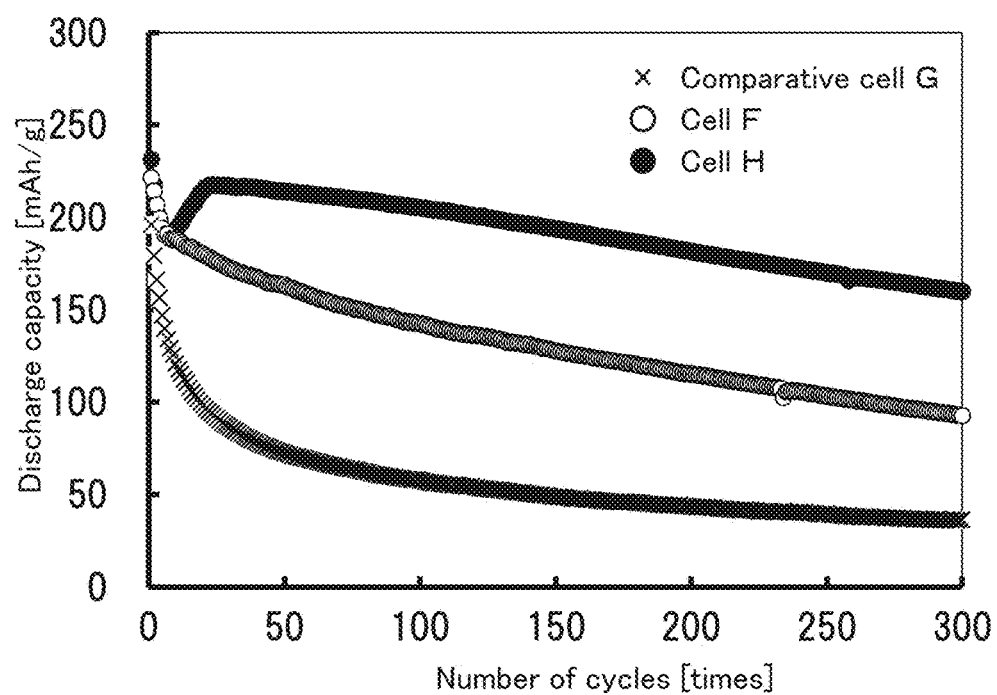
FIG. 32 shows discharge capacity associated with charge and discharge cycles.

FIG. 32 is a plot of a change in capacity associated with the number of cycles. In FIG. 32, a longitudinal axis represents discharge capacity (mAh/g) and a lateral axis represents the number of cycles (times). Here, capacity was normalized by the weight of the positive electrode active material. In FIG. 32, a plot of the cell F is indicated by open circles, a plot of the comparative cell G is indicated by crosses, and a plot of the cell H is indicated by black circles. As shown in FIG. 32, a reduction rate of the discharge capacity of the cell H is the lowest and a reduction rate of the discharge capacity of the cell F is lower than that of the discharge capacity of the comparative cell G.

The above results indicate that forming graphene on the surfaces of the lithium-manganese composite oxides after the crushing and grinding in the method for forming the lithium-manganese composite oxides can lower a reduction rate of the discharge capacity associated with the number of cycles.

Example 5

In this example, a result of an x-ray absorption fine structure (XAFS) analysis performed on a battery including the electrode containing the sample A described in Example 1 will be described. In addition, the calculation results of examination of $Li_2MnO_3$ that does not contain Ni will be described. For the examination, differential charge density before and after Li deintercalation was measured to determine whether O compensates charges and whether Li deintercalation promotes oxygen deintercalation.

Table 3 shows components of the electrodes and the half cells used in this example.

TABLE 3

| Cell | | Electrode | Active material | Conductive additive | Binder | Ratio [wt %] |
|---|---|---|---|---|---|---|
| Half cell | Cell I1 | Electrode I1 | Sample A | AB | PVdF | Sample A:AB:PVdF = 90:5:5 |
| | Cell I2 | Electrode I2 | Sample A | AB | PVdF | Sample A:AB:PVdF = 90:5:5 |
| | Cell I3 | Electrode I3 | Sample A | AB | PVdF | Sample A:AB:PVdF = 90:5:5 |

Electrodes I1 to I3 used in this example will be described. The sample A described in Example 1 was used as an active material of the electrodes I1 to I3. Furthermore, the electrodes I1 to I3 were formed in a manner similar to that of the comparative electrode A described in Example 3.

Next, a cell I1 and a cell I2 were fabricated using the electrode I1 and the electrode I2, respectively. The cells I1 and I2 were fabricated in a manner similar to that of the comparative cell A described in Example 3.

Then, the cell I1 was charged at 25° C. at a constant current with a current density per active material weight of 30 mA/g until the voltage reached a termination voltage of 4.8 V. The cell I2 was charged at 25° C. at a constant current with a current density per active material weight of 30 mA/g until the voltage reached a termination voltage of 4.8 V, and discharged at a constant current with a current density of 30 mA/g until the voltage reached a termination voltage of 2.0 V.

After that, the cell I1 and the cell I2 were disassembled in a glove box to take out the electrode I1 and the electrode I2.

Next, the electrodes I1 to I3 were subjected to an XAFS measurement. In the XAFS measurement, data of a surface of the lithium manganese oxide (sample A) was obtained by a total electron yield (TEY) method, and data of bulk of the lithium manganese oxide (sample A) was obtained by a partial fluorescent yield (PFY) method. Note that the electrode 13 was used as a reference.

Figure 33A:
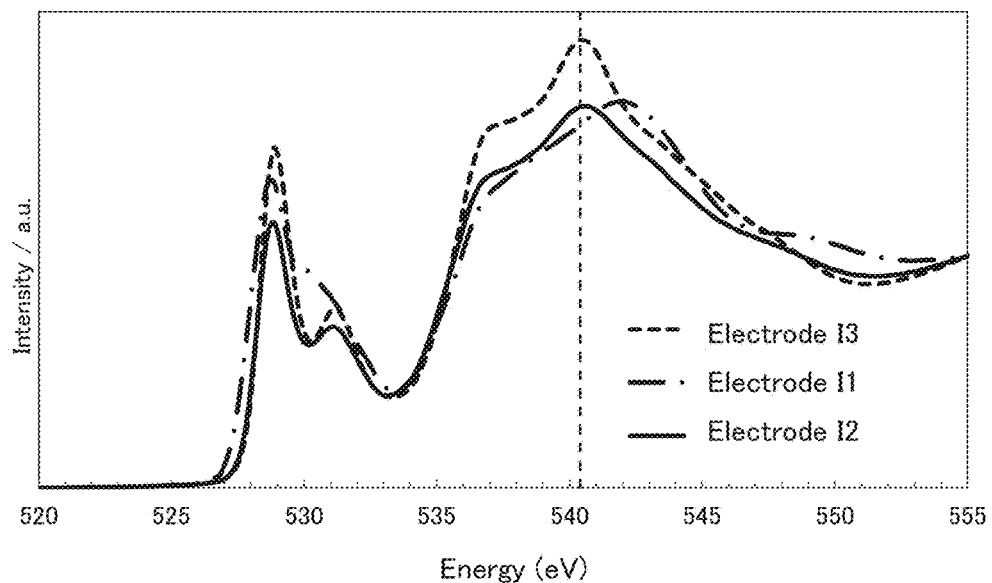
FIGS. 33A and 33B show XAFS measurement results of lithium-manganese composite oxides.
Figure 33B:
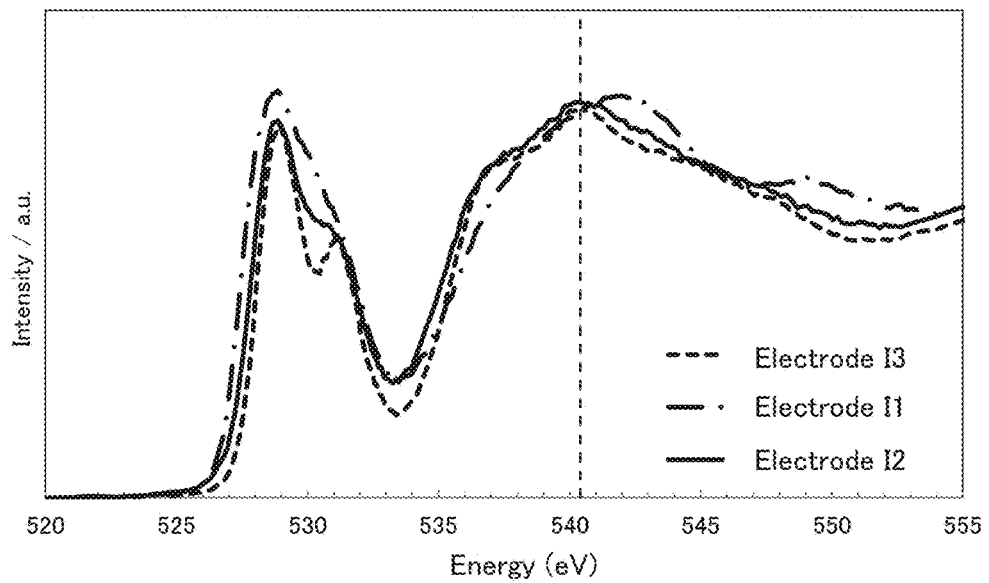
Figure 34A:
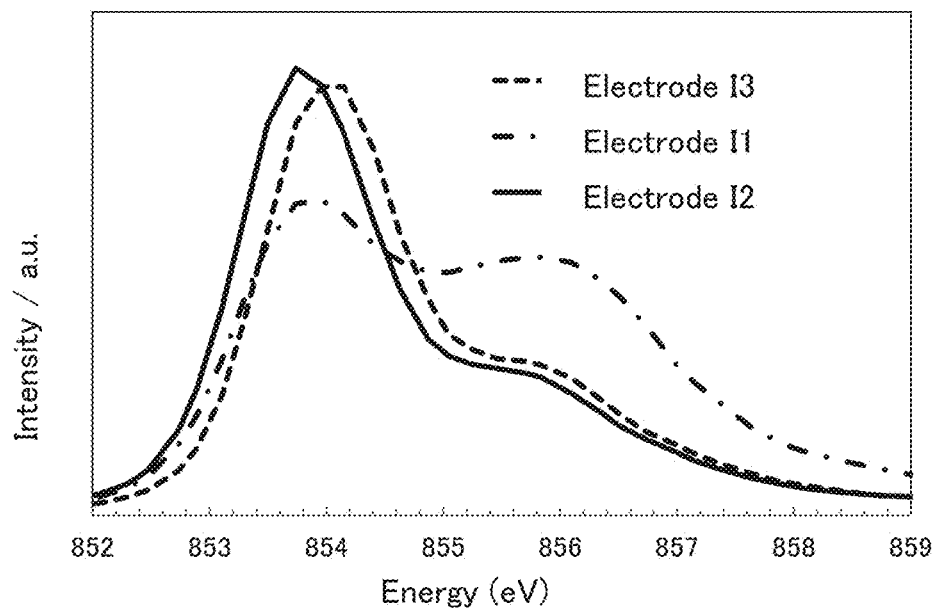
FIGS. 34A and 34B show XAFS measurement results of lithium-manganese composite oxides.

FIG. 33A shows the oxygen K-edge spectra obtained by a TEY method, and FIG. 33B shows the oxygen K-edge spectra obtained by a PFY method. FIG. 34A shows the nickel L-edge spectra obtained by a TEY method, and FIG. 34B shows the nickel L-edge spectra obtained by a PFY method.

As shown in FIGS. 33A and 33B, both on the surface and in the bulk, a peak at around 540 eV shifts toward the high-energy side after charging and the metal-O bond length becomes short, and it is likely to cancel after discharging.

Figure 34B:
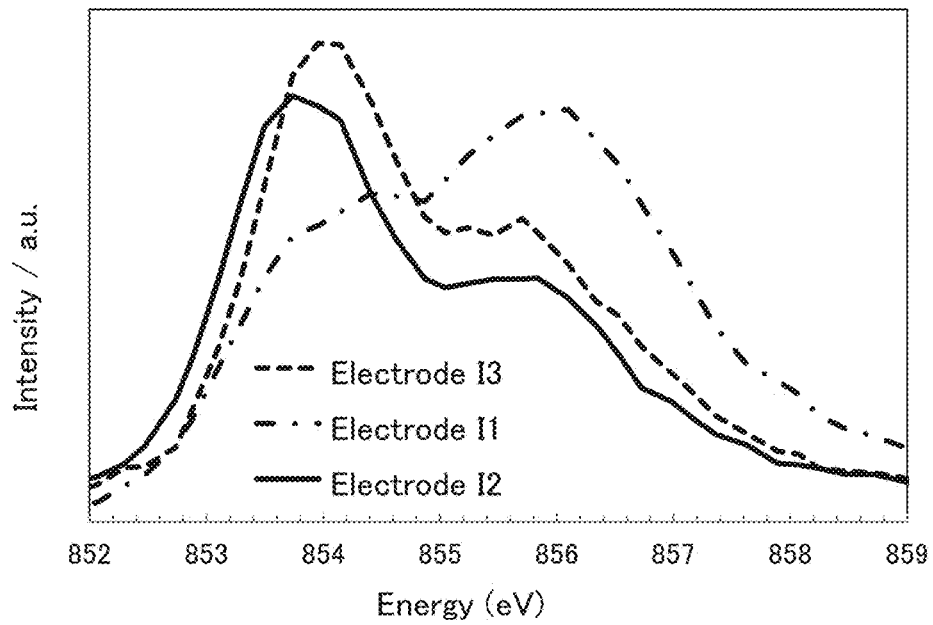

In addition, changes in two peak intensities in FIGS. 34A and 34B indicate that the valence number of a metal (Ni) is likely to increase after charging and decrease after discharging both on the surface and in the bulk.

In FIG. 33A, the peak intensity after charging is lower than that of the reference, which suggests that oxygen deintercalation might occur.

In FIG. 33B, there is not significant difference in the peak intensity after discharging and that of the reference.

When a change in the K-edge of an O atom due to discharging in the sample A ($Li_{1.68}Mn_{0.8062}M_{0.318}O_3$) described in Example 1 is examined by an XAFS measurement, a change in pre-edge peak as shown in FIGS. 33A and 33B suggests that some O atoms might be released during discharging. Thus, to examine $Li_2MnO_3$ that does not contain Ni by calculation, differential charge density before and after Li deintercalation was measured to determine whether O compensates charges and whether Li deintercalation promotes oxygen deintercalation.

The differential charge density can be an indicator for identifying a charge compensation source. Here, the differential charge density is a difference in electron density distribution before and after Li deintercalation. An atom that compensates charges and an orbital of an electron that compensates charges can be confirmed by the measurement of the differential charge density.

<Measurement of Differential Charge Density>

In this example, location dependence of charge compensation of $Li_2MnO_3$ (layered rock salt structure) and location dependence of Li deintercalation were verified. It was found that a charge compensation source is not a Mn atom but the 2p orbital of an O atom around a deintercalated Li atom. The analysis of the K-edge of a Mn atom by XAFS measurement also showed that a Mn atom does not compensate charges. In addition, energy comparison at the time of Li deintercalation revealed that some Li atoms are more likely to deintercalate than the others.

Figure 35:
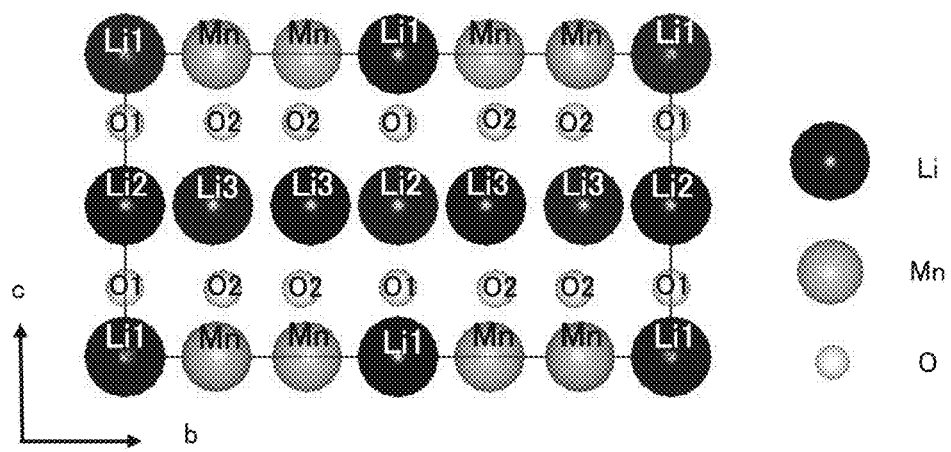
FIG. 35 illustrates a crystal structure of $Li_2MnO_3$.

Table 4 shows the calculation conditions. FIG. 35 illustrates a structure of an active material ($Li_2MnO_3$) used for the calculation.

TABLE 4

| | |
|---|---|
| Software | VASP |
| Model | $Li_2MnO_3$ (24 atoms) |
| Functional | HSE06 |
| Mixture ratio of exchange terms | 0.25 |
| Pseudo potential | PAW |
| Cut-off energy | 800 V |
| k-point | 2 × 1 × 2 (Single point calculation) |

In FIG. 35, symmetry atoms are denoted by the same number. According to FIG. 35, three positions of Li should be examined. Hereinafter, a structure obtained by deintercalation of one Li atom at Li1, a structure obtained by deintercalation of one Li atom at Li2, and a structure obtained by deintercalation of one Li atom at Li3 are called Structure 1, Structure 2, and Structure 3, respectively, for convenience.

Figure 36:
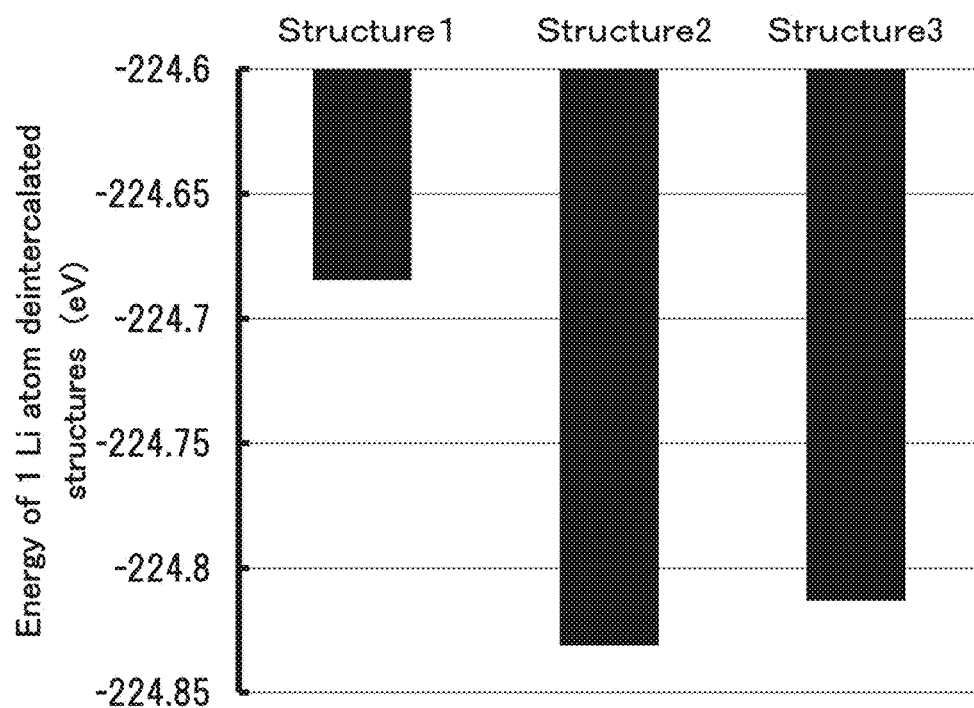
FIG. 36 is a graph showing Li position dependence of energy at the time of Li deintercalation.

First, energy at the time of Li deintercalation was compared to determine which of Structures 1 to 3 is stable. FIG. 36 shows the comparison results.

FIG. 36 shows that Structures 2 and 3 have lower energy than Structure 1 does and thus are more stable than Structure 1. This means that deintercalation of an Li atom at Li1 from $Li_2MnO_3$ requires high energy. Thus, deintercalation of an Li atom at Li1 is probably less likely to occur.

Figure 37A:
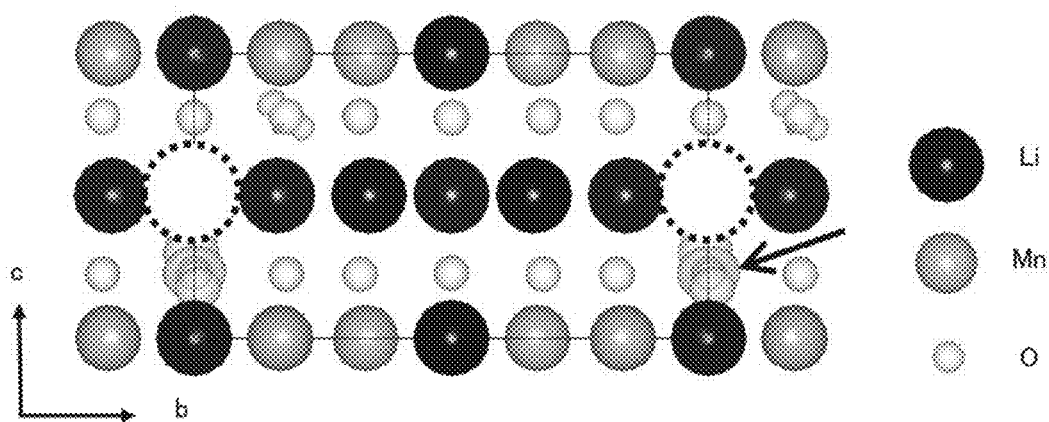
FIG. 37A illustrates differential charge density of Structure 2 and FIG. 37B illustrates differential charge density of Structure 2 (seen from the b-axis direction).
Figure 37B:
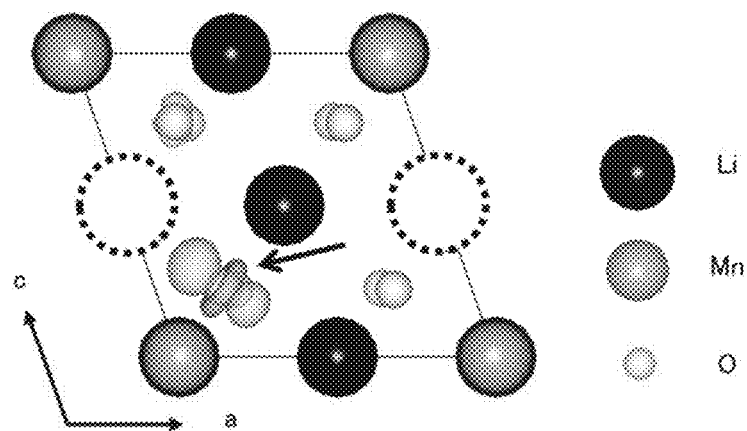
Figure 38:
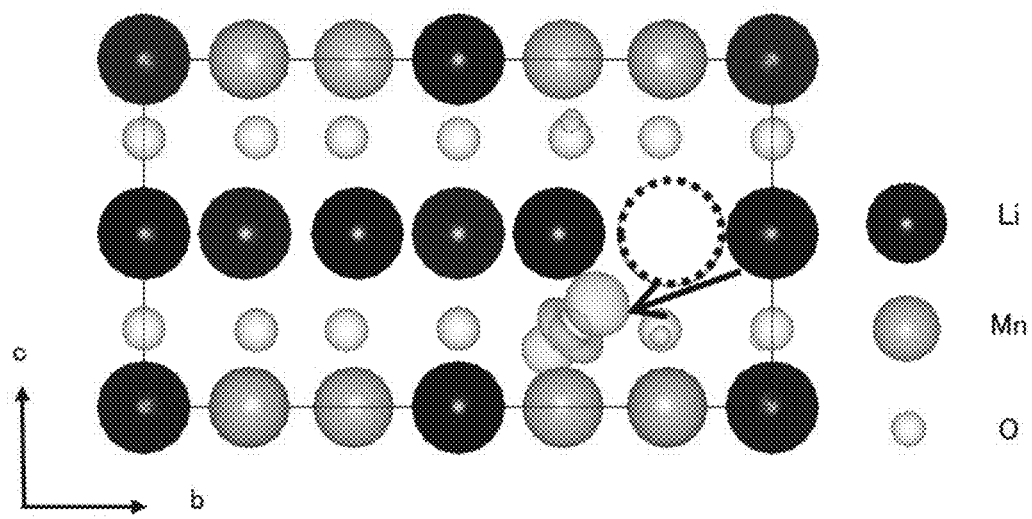
FIG. 38 illustrates differential charge density of Structure 3.

To identify the charge compensation source, the differential charge densities of the structures (Structures 2 and 3) each obtained by Li deintercalation at Li2 or Li3 where Li deintercalation is considered to occur easily were calculated. FIGS. 37A and 37B show results of Structure 2 and FIG. 38 shows results of Structure 3. FIGS. 37A and 37B illustrate the same structure seen from different directions. Since FIGS. 37A and 37B illustrate a wider region than a unit cell, two deintercalated Li atoms are shown: however, only one Li atom is deintercalated per unit cell.

FIGS. 37A and 37B and FIG. 38 show that in the case of Li deintercalation, not a Mn atom but an O atom around the deintercalated Li atom compensates charges in each structure. The shape of an isosurface of the differential charge density indicates that the charge compensation source is probably the 2p orbital of an O atom.

<Measurement of Deintercalation Energy of O>

Next, the easiness of oxygen deintercalation from $Li_{(2-x)}MnO_3$, which was obtained by Li deintercalation from $Li_2MnO_3$ was measured. The formation energy defined as follows was used to determine how easily oxygen vacancies are generated.

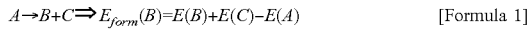

$$A \rightarrow B+C \Rightarrow E_{form}(B)=E(B)+E(C)-E(A) \quad \text{[Formula 1]}$$

The above formula indicates that as the value of $E_{form}(B)$ becomes smaller, a substance B becomes more easily to be formed as a result of a reaction "$A \rightarrow B+C$."

Figure 39:
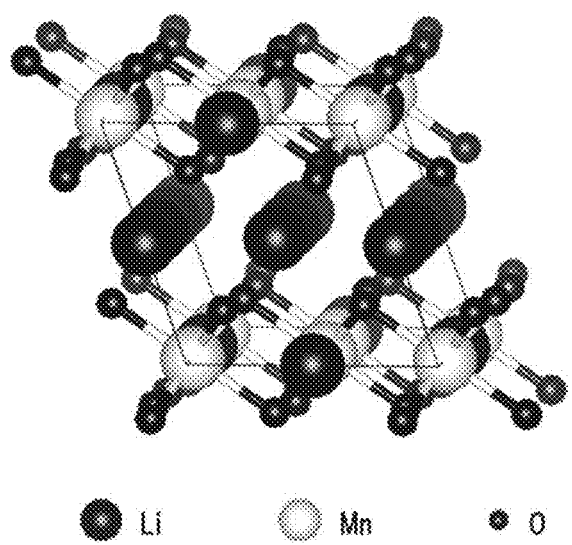
FIG. 39 illustrates a unit cell of $Li_2MnO_3$.

The formation energy of an oxygen vacancy in the lithium-manganese composite oxide $Li_2MnO_3$ having a layered rock-salt crystal structure was measured by the electronic structure calculation package VASP. The cut-off energy was 800 eV, and the effect of functional/inner-shell-electron was calculated by HSE06/PAW. To measure the formation energy of an oxygen vacancy with respect to the composition of Li, the formation energy of an oxygen vacancy in $Li_aMnO_3$ was measured within a range where a is from 1.0 to 2.0. In the case where a is 2, $Li_2MnO_3$ including 96 atoms (32 Li atoms, 16 Mn atoms, and 48 O atoms) was used as a model structure, whereas in the case where a is smaller than 2, a structure in which Li atoms were deintercalated depending on the composition was used. FIG. 39 illustrates the structure of a unit cell of $Li_2MnO_3$.

The following reaction was assumed as an example for the formation energy of an oxygen vacancy in $Li_2MnO_3$.

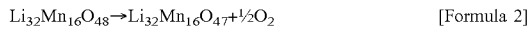

$$Li_{32}Mn_{16}O_{48} \rightarrow Li_{32}Mn_{16}O_{47} + \tfrac{1}{2}O_2 \quad \text{[Formula 2]}$$

Figure 40:
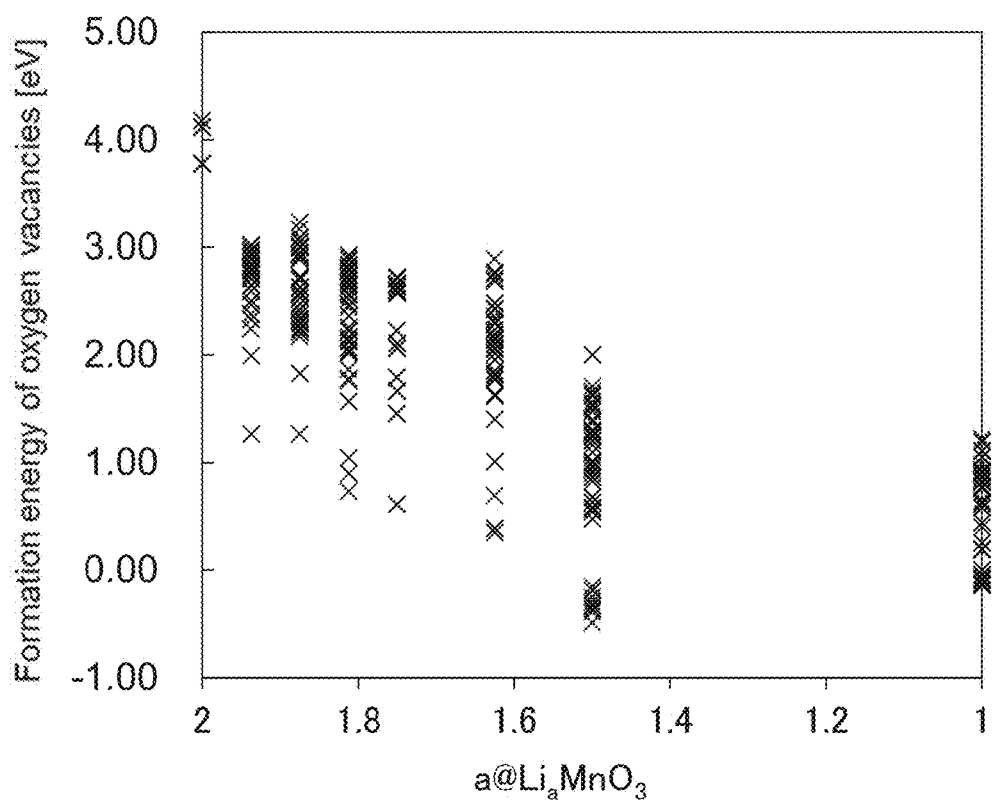
FIG. 40 is a graph showing calculation results of formation energy of an oxygen vacancy.

Note that in the above formula, the relaxation energy at an atomic position is not taken into consideration. Furthermore, for easy understanding, it is assumed that an electrically neutral oxygen vacancy is formed. The calculation results of the formation energy for each case are as shown in FIG. 40.

The results indicate that formation of oxygen vacancies and oxygen deintercalation easily occur when a is smaller than 2.

In other words, it is conceivable that oxygen vacancies are formed when Li atoms in $Li_2MnO_3$ are reduced, leading to easy oxygen deintercalation.

The above two calculations suggest that Li deintercalation from $Li_2MnO_3$ causes charge compensation from the p orbital of oxygen and a bond with a metal element is weakened, leading to oxygen deintercalation.

The results obtained in this example suggest that oxygen deintercalation is likely to occur in the lithium-manganese composite oxides described in Example 1. In the case where the lithium-manganese composite oxides whose surfaces are not covered with graphene is used as an active material, the cycle characteristics deteriorate as shown in FIGS. 30A and 30B and FIG. 32. This is probably because of oxygen deintercalation from the lithium-manganese composite oxides. In contrast, when the lithium-manganese composite oxides whose surfaces are covered with graphene are used as an active material, the cycle characteristics are improved as shown in FIGS. 30A and 30B and FIG. 32. This is probably because graphene prevents oxygen deintercalation from the lithium-manganese composite oxides.

Example 6

In this example, examination results of crystal orientation of a cleavage plane of the active material of one embodiment of the present invention will be described.

First, an active material used in this example is described. The active material used in this example was formed under the same conditions as the sample F in Example 4. An electrode was formed using the active material under the same conditions as the electrode H in Example 4 and then, one active material particle was observed by cross-sectional TEM.

Figure 41:
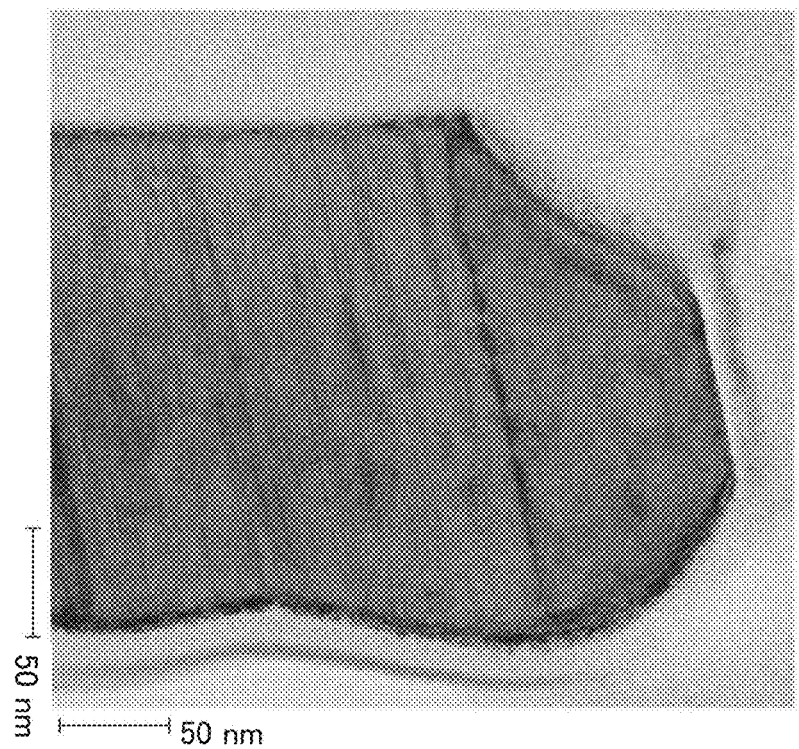
FIG. 41 shows a cross-sectional TEM observation result of an active material.
Figure 42A:
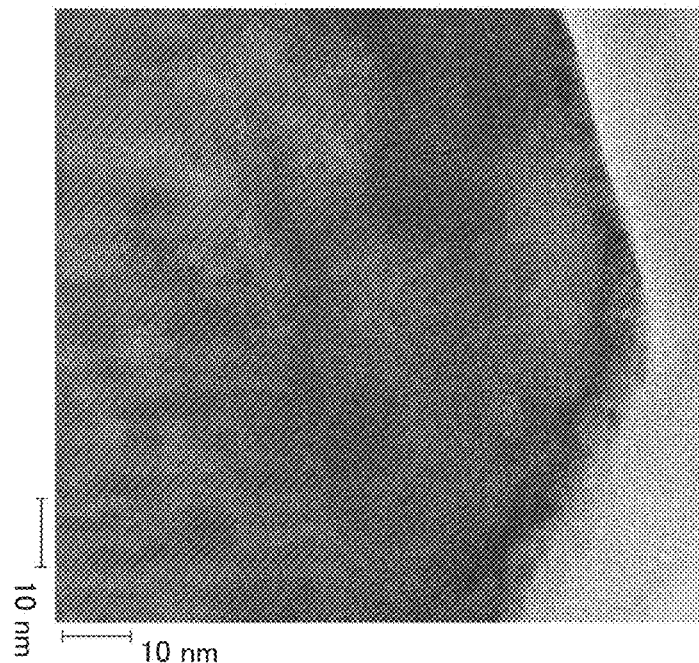
FIG. 42A shows a TEM observation result of an active material and FIG. 42B shows a Fourier transform diffraction pattern.
Figure 42B:
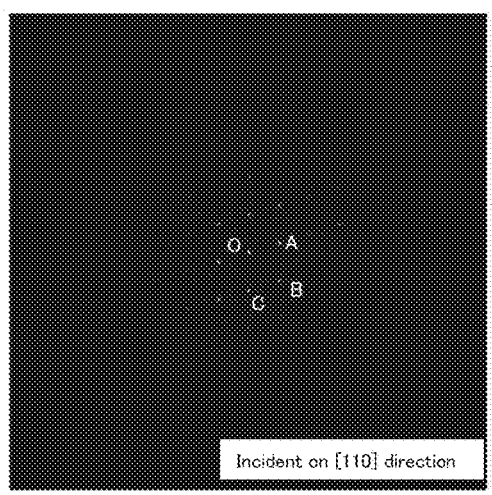

FIG. 41 shows a cross section of one active material particle (crystal grain) contained in the electrode. FIG. 42A is a high-resolution TEM image of one portion in FIG. 41, and FIG. 42B shows a Fourier transform diffraction pattern and fitting results on a crystal database. Note that layer structures in the images in FIG. 41 and FIG. 42A are parallel to each other.

A diffraction pattern in FIG. 42B indicates that the lattice spacing (d value) of a diffraction spot A is 0.479 nm, the d value of a diffraction spot B is 0.368 nm, and the d value of a diffraction spot C is 0.399 nm. The diffraction pattern also indicates that ∠AOB is 60.3°, ∠AOC is 107.7°, and ∠BOC is 47.4°.

Note that according to the database, the d value of a (001) plane of $Li_2MnO_3$ (84-1634) obtained by electron beam incident in a [110] direction is 0.474 nm, the d value of a (−111) plane is 0.367 nm, the d value of a (−110) plane is 0.408 nm, ∠AOB is 59.2°, ∠AOC is 107.0°, and ∠BOC is 47.8°.

The comparison of the values obtained by the result in FIG. 42B and the values in the database indicates that the crystal structure agrees with that of $Li_2MnO_3$ (JCPDS84-1634).

FIG. 41 shows that the crystal is cleaved along a plane at a right end of the crystal grain. The directions of the spots in FIG. 42B indicate that the cleavage plane at the right end in FIG. 41 is a (001) plane. The (001) plane is equivalent to a (00-1) plane because of the crystal symmetry of $Li_2MnO_3$. Accordingly, the active material of one embodiment of the present invention is probably cleaved along the (001) plane or the (00-1) plane.

Figure 43:
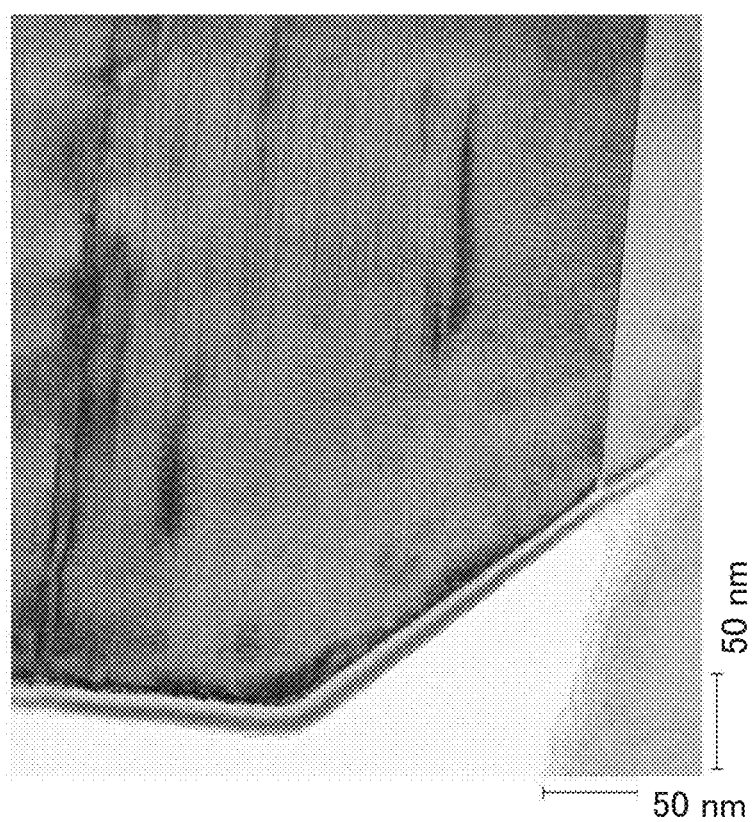
FIG. 43 shows a cross-sectional TEM observation result of an active material.
Figure 44A:
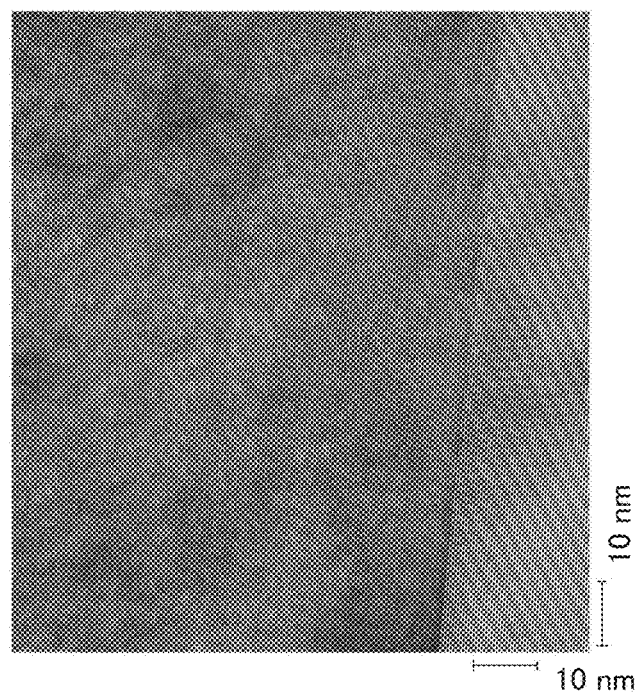
FIG. 44A shows a TEM observation result of an active material and FIG. 44B shows a Fourier transform diffraction pattern.
Figure 44B:
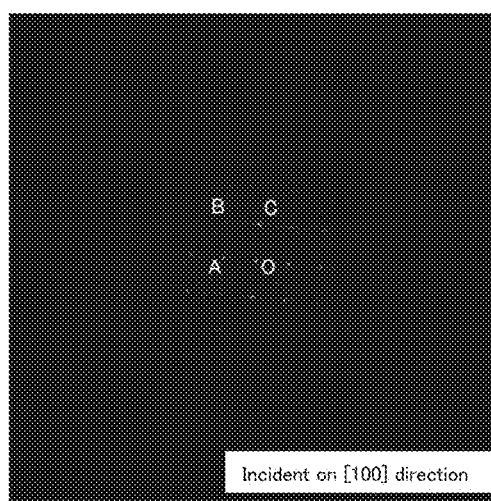

FIG. 43 shows a cross section of different active material particle (crystal grain) contained in the electrode. FIG. 44A is a high-resolution TEM image of one portion in FIG. 43, and FIG. 44B shows a Fourier transform diffraction pattern and fitting results on a crystal database. Note that layer structures in the images in FIG. 43 and FIG. 44A are parallel to each other.

A diffraction pattern in FIG. 44B indicates that the lattice spacing (d value) of a diffraction spot A is 0.478 nm, the d value of a diffraction spot B is 0.319 nm, and the d value of a diffraction spot C is 0.430 nm. The diffraction pattern also indicates that ∠AOB is 48.7°, ∠AOC is 89.9°, and ∠BOC is 41.2°.

Note that according to the database, the d value of a (001) plane of $Li_2MnO_3$ (84-1634) obtained by electron beam incident in a [100] direction is 0.474 nm, the d value of a (021) plane is 0.317 nm, the d value of a (020) plane is 0.426 nm, ∠AOB is 48.0°, ∠AOC is 90.0°, and ∠BOC is 42.0°.

The comparison of the values obtained by the result in FIG. 44B and the values in the database indicates that the crystal structure agrees with that of $Li_2MnO_3$ (JCPDS84-1634).

FIG. 43 shows that the crystal is cleaved along a plane at a lower end and at a right end of the crystal grain. The directions of the spots in FIG. 44B indicate that the cleavage plane at the lower end in FIG. 43 is a (0-10) plane and the cleavage plane at the right end is a (0-2-1) plane. The (0-10) plane is equivalent to a (010) plane and the (0-2-1) plane is equivalent to a (021) plane, a (02-1) plane, and a (0-21) plane because of the crystal symmetry of $Li_2MnO_3$. Accordingly, the active material of one embodiment of the present invention is probably cleaved along the (010) plane, the (0-10) plane, the (021) plane, the (02-1) plane, the (0-21) plane, or the (0-2-1) plane.

Example 7

In this example, measurement results of the rate characteristics and temperature characteristics of a cell J and a comparative cell K will be described. The cell J included an electrode J formed using the sample F in Example 4, and the comparative cell K includes a comparative electrode K formed using $LiCoO_2$.

Table 5 shows components of the electrodes and the half cells used in this example.

TABLE 5

| Cell | | Electrode | Active material | Conductive additive | Binder | Ratio [wt %] |
|---|---|---|---|---|---|---|
| Half cell | Cell J | Electrode J | Sample F | AB | PVdF | Sample F:AB:PVdF = 90:5:5 |
| | Comparative cell K | Comparative electrode K | $LiCoO_2$ | AB | PVdF | $LiCoO_2$:AB:PVdF = 90:5:5 |

The electrode J used in this example was formed under conditions similar to those of the electrode H formed in Example 4. The comparative electrode K was formed under the same conditions as the comparative electrode A described in Example 3 except that the sample A in the comparative electrode A was changed to $LiCoO_2$.

The cell J was fabricated using the electrode J and the comparative cell K was fabricated using the comparative electrode K. The cell J and the comparative cell K were fabricated under conditions similar to those of the cell B described in Example 3.

Figure 45:
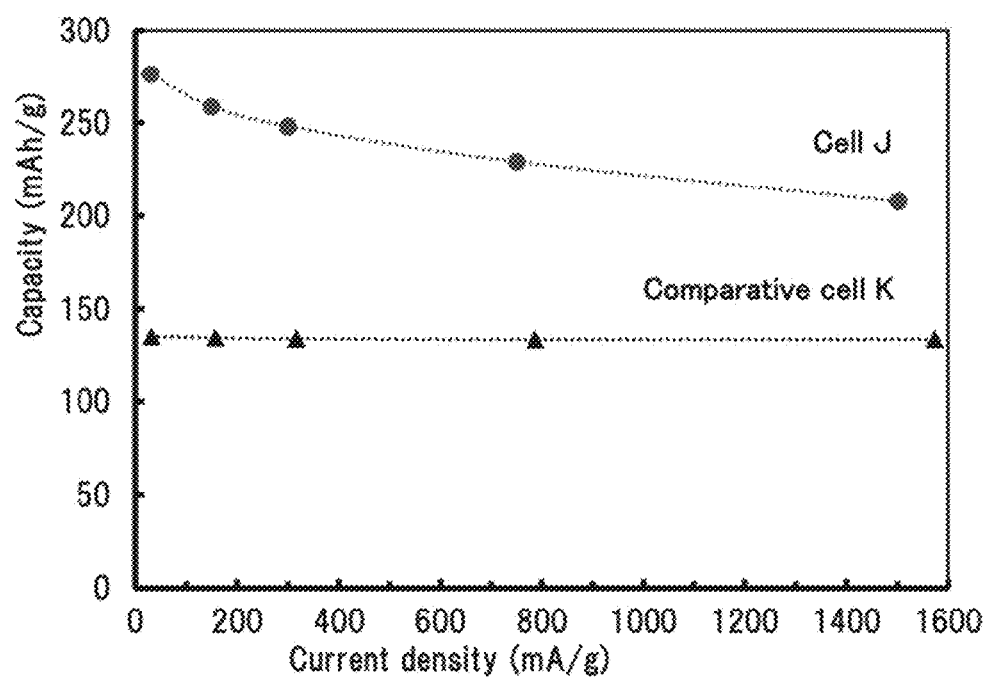
FIG. 45 shows measurement results of the rate characteristics of a cell of Example.

After that, the rate characteristics of the cell J and the comparative cell K were measured. The measurement was performed with a charge-discharge measuring instrument (produced by TOYO SYSTEM Co., LTD) at room temperature (25° C.). The cell J and the comparative cell K were charged at a constant current with a current density of approximately 30 mA/g with the upper voltage limit set to 4.8 V. The cell J was discharged with a current density of 30 mA/g, 150 mA/g, 300 mA/g, 750 mA/g, and 1500 mA/g. The comparative cell K was discharged with a current density of 30 mA/g, 157 mA/g, 315 mA/g, 786 mA/g, and 1570 mA/g. FIG. 45 shows discharge capacity with respect to the current density. In FIG. 45, a lateral axis represents current density during discharging and a longitudinal axis represents discharge capacity per positive electrode active material weight measured with each current density. A plot of the cell J is indicated by circles and a plot of the comparative cell K is indicated by triangles in FIG. 45. The results show that the cell J has better characteristics than the comparative cell K.

Figure 46:
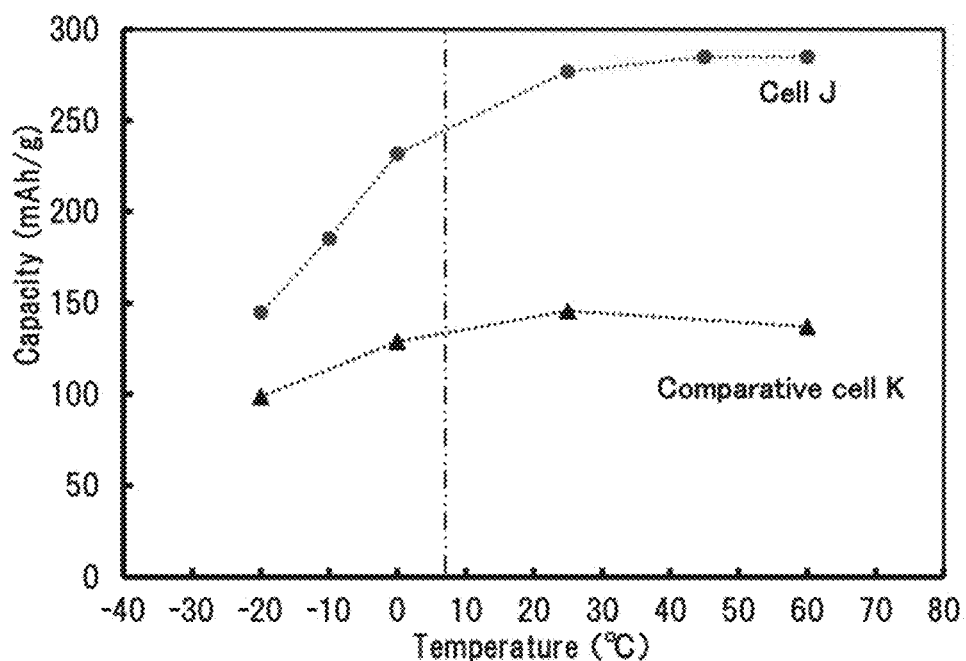
FIG. 46 shows measurement results of the temperature characteristics of a cell of Example.

Then, the charge and discharge characteristics of the cell J and the comparative cell K depending on temperature were measured. The measurement was performed with a charge-discharge measuring instrument (produced by TOYO SYSTEM Co., LTD) in a constant temperature bath. The measurement temperatures of the cell J were set to 60° C., 45° C., 25° C., 0° C., −10° C., and −20° C. The measurement temperatures of the comparative cell K were set to 60° C., 25° C., 0° C., and −20° C. In the measurement, constant current charging was performed with a current density of 30 mA/g and then, discharging was performed with a current density of 30 mA/g. Note that the charging was performed at 25° C. FIG. 46 shows the measurement results of the charge and discharge characteristics depending on temperature. In FIG. 46, a lateral axis represents temperature (° C.) and a longitudinal axis represents capacity per positive electrode active material weight (mAh/g). A plot of the cell J is indicated by circles and a plot of the comparative cell K is indicated by triangles in FIG. 46. The results show that the cell J has better characteristics than the comparative cell K.

Figure 47:
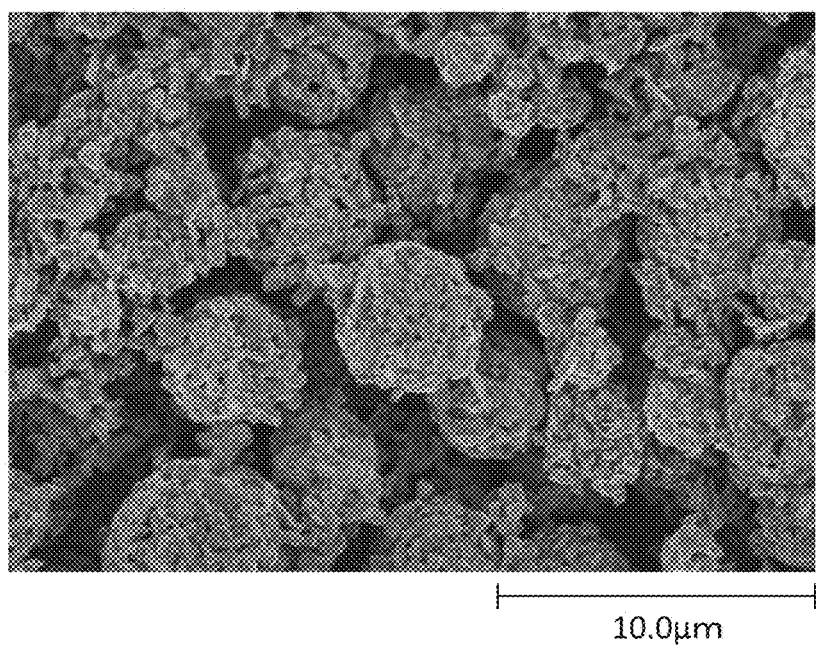
FIG. 47 shows a SEM observation result of an active material of Example.

FIG. 47 is a SEM photograph of the sample F. As shown in FIG. 47, the lithium-manganese composite oxides covered with graphene are aggregated. The aggregated lithium-manganese composite oxides covered with graphene have a spherical shape.

In the sample F described in this example, a surface of a lithium-manganese composite oxide having a cleavage plane was covered with graphene, and the lithium-manganese composite oxides covered with graphene were aggregated by spray dry treatment to be a secondary particle. In the active material, which includes the secondary particle, the lithium-manganese composite oxides were bound with graphene. This is probably the reason why the conductivity of the active material was increased, the resistance of the electrode J was reduced, and the rate characteristics and temperature characteristics of the cell J fabricated using the electrode J were improved.

Example 8

In this example, an effect of aging performed on the electrodes of one embodiment of the present invention will be described with reference to FIG. 48.

Table 6 shows components of positive electrodes used in this example.

TABLE 6

| Electrode | Active material | Conductive additive | Binder | Ratio [wt %] |
|---|---|---|---|---|
| Postive electrode L1 | Sample F | AB | PVdF | Sample F:AB:PVdF = 90:5:5 |
| Postive electrode L2 | Sample F | AB | PVdF | Sample F:AB:PVdF = 90:5:5 |
| Postive electrode L3 | Sample F | AB | PVdF | Sample F:AB:PVdF = 90:5:5 |
| Postive electrode L4 | Sample F | AB | PVdF | Sample F:AB:PVdF = 90:5:5 |

TABLE 6-continued

| Electrode | Active material | Conductive additive | Binder | Ratio [wt %] |
|---|---|---|---|---|
| Postive electrode L5 | Sample F | AB | PVdF | Sample F:AB:PVdF = 90:5:5 |
| Postive electrode L6 | Sample F | AB | PVdF | Sample F:AB:PVdF = 90:5:5 |

First, positive electrodes L1 to L6 were formed using the sample F in Example 4, under conditions similar to those of the electrode H.

Next, negative electrodes M1 to M5 were formed under conditions similar to the conditions described in Example 4.

Then, a half cell was fabricated using the positive electrode L1 and a counter electrode containing a lithium metal. The characteristics were measured with the use of a CR2032 coin-type secondary battery (with a diameter of 20 mm and a height of 3.2 mm). As a separator, polypropylene was used. An electrolytic solution was formed in such a manner that lithium hexafluorophosphate (LiPF$_6$) was dissolved at a concentration of 1 mol/L in a mixed solution in which ethylene carbonate (EC) and diethyl carbonate (DEC) were mixed at a volume ratio of 1:1. A positive electrode can and a negative electrode can were formed of stainless steel (SUS). Note that half cells with similar structures were formed using the positive electrodes L2, L3, and L6.

The positive electrodes L1 to L3 were subjected to aging. For the aging, charging and discharging with a current density of 30 mA/g were repeated three times with the upper charging voltage limit set to 4.8 V and the lower discharging voltage limit set to 2.0 V.

Then, a half cell was fabricated using the negative electrode M1 and a counter electrode containing a lithium metal. The characteristics were measured with the use of a CR2032 coin-type secondary battery (with a diameter of 20 mm and a height of 3.2 mm). As a separator, polypropylene was used. An electrolytic solution was formed in such a manner that lithium hexafluorophosphate (LiPF$_6$) was dissolved at a concentration of 1 mol/L in a mixed solution in which ethylene carbonate (EC) and diethyl carbonate (DEC) were mixed at a volume ratio of 1:1. A positive electrode can and a negative electrode can were formed of stainless steel (SUS). Note that a half cell with a similar structure was formed using the negative electrode M4.

Then, CCCV (0.1 C, 0.01 V) discharging was performed on the negative electrodes M1, M3, and M4 and Li was intercalated until the current value at CV reached 0.01, and then Li was deintercalated during CC (0.1 C, 1 V) charging. In addition, CC (0.1 C) discharging was performed on the negative electrodes M1 and M4 and Li equivalent to a capacity per graphite weight of 50 mAh/g was intercalated.

Then, the half cells including the positive electrodes L1 to L3 and the half cells including the negative electrodes M1 and M4 were disassembled and washed with DMC three times.

A cell L1 (full cell) was fabricated using the positive electrode L1 and the negative electrode M1. A CR2032 coin-type secondary battery (with a diameter of 20 mm and a height of 3.2 mm) was fabricated. As a separator, polypropylene was used. An electrolytic solution was formed in such a manner that lithium hexafluorophosphate (LiPF$_6$) was dissolved at a concentration of 1 mol/L in a mixed solution in which ethylene carbonate (EC) and diethyl carbonate (DEC) were mixed at a volume ratio of 1:1. A positive electrode can and a negative electrode can were formed of stainless steel (SUS).

A cell L2 was fabricated using the positive electrode L2 and the negative electrode M2, a cell L3 was fabricated using the positive electrode L3 and the negative electrode M3, a cell L4 was fabricated using the positive electrode L4 and the negative electrode M4, and a cell L5 was fabricated using the positive electrode L5 and the negative electrode M5. Note that the cells L2 to L5 had the same structure as the cell L1 except for the positive electrode and the negative electrode.

Table 7 shows components of the full cells and the half cell used in this example.

TABLE 7

| | Cell | Positive electrode | Negative electrode |
|---|---|---|---|
| Full cell | Cell L1 | Positive electrode L1 (aging) | Negative electrode M1 (pre-doping) |
| | Cell L2 | Positive electrode L2 (aging) | Negative electrode M2 (no pre-doping) |
| | Cell L3 | Positive electrode L3 (aging) | Negative electrode M3 (no pre-doping but 1st charge/discharge) |
| | Cell L4 | Positive electrode L4 (no aging) | Negative electrode M4 (pre-doping) |
| | Cell L5 | Positive electrode L5 (no aging) | Negative electrode M5 (no pre-doping) |
| Half cell | Cell L6 | Positive electrode L6 (no aging) | — |

The cycle characteristics of the fabricated cells L1 to L6 were measured. In a cycle test, constant current charging was performed with a current density per active material weight of 30 mA/g until the voltage reached a termination voltage of 4.6 V. Constant current discharging was performed with a current density of 30 mA/g until the voltage reached a termination voltage of 2.0 V. The temperature during the charging and discharging was 25° C. In the cycle test, constant current charging and discharging were repeated.

Figure 48:
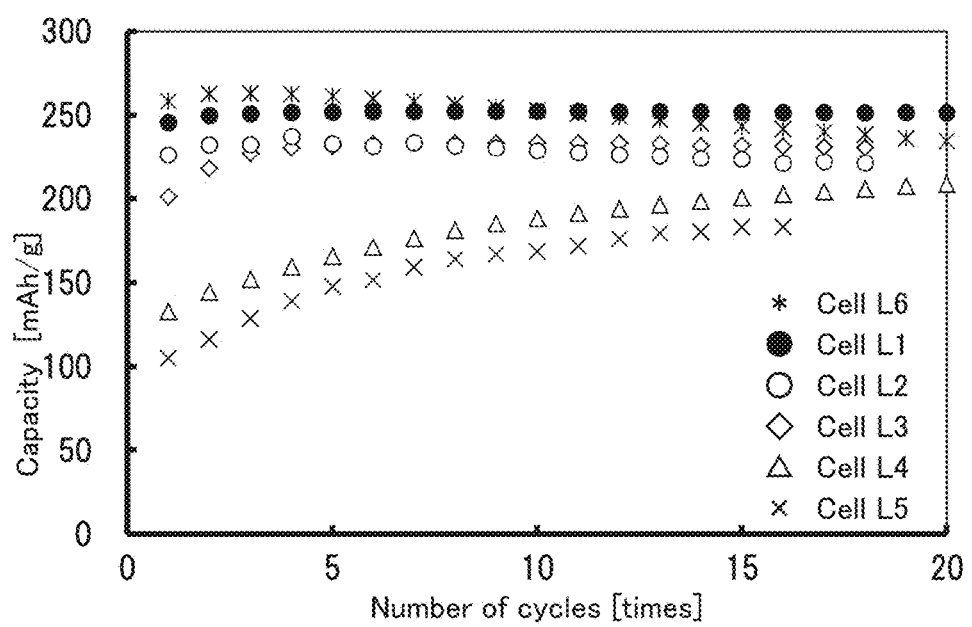
FIG. 48 shows the cycle characteristics of cells of Example.

FIG. 48 shows the charge-discharge cycle characteristics of the cells L1 to L6. In FIG. 48, a longitudinal axis represents capacity [mAh/g] and a lateral axis represents the number of cycles [times]. Here, capacity was normalized by the weight of the positive electrode active material. In FIG. 48, a plot of the cell L1 is indicated by black circles, a plot of the cell L2 is indicated by open circles, a plot of the cell L3 is indicated by white squares, a plot of the cell L4 is indicated by white triangles, a plot of the cell L5 is indicated by crosses, and a plot of the cell L6 is indicated by stars.

As shown in FIG. 48, the cell L1 whose positive electrode was subjected to aging and whose negative electrode was pre-doped with lithium has favorable characteristics which are equivalent to those of the half cell including the cell L6. Furthermore, the cells L2 and L3 whose positive electrodes were subjected to aging and whose negative electrodes were not pre-doped with lithium also have favorable characteristics behind the cell L1. In addition, the initial capacities of the cells L4 and L5 whose positive electrodes were not subjected to aging are lower than those of the cells L1 to L3 whose positive electrodes were subjected to aging. Moreover, the capacities of the cells L4 and L5 are lower than those of the cells L1 to L3 even after some cycles. The results in FIG. 48 show that aging performed on the electrode of one embodiment of the present invention improves cycle characteristics.

Example 9

In this example, results of aging performed on the electrode of one embodiment of the present invention under conditions different from those in Example 8 will be described with reference to FIG. 50.

Electrodes used in this example will be described.

First, a positive electrode n was formed using the sample F in Example 4, under conditions similar to those of the electrode H. Furthermore, a negative electrode o was formed under conditions similar to the conditions of the negative electrode in Example 4.

Then, a laminated cell including the positive electrode n and a negative electrode formed of a graphite electrode was fabricated and constant current driving was performed two cycles at 25° C. at a rate of 0.1 C until the charging voltage reached a termination voltage of 4.6 V or until the discharging voltage reached a termination voltage of 2.0 V. The positive electrode after the two cycles is a positive electrode N. After that, the laminated cell was unsealed to take out the positive electrode N.

Next, a laminated cell including a positive electrode formed using $LiFePO_4$ and the negative electrode o was fabricated and charged at 25° C. at a constant current at a rate of 0.01 C until the voltage reached a termination voltage of 3.2 V. After that, the laminated cell was unsealed for degassing and then sealed again. Subsequently, the laminated cell was charged at 25° C. at a constant current at a rate of 0.1 C until the voltage reached a termination voltage of 4.0 V and discharged at 0.2 C until the voltage reached a termination voltage of 2.0 V. Then, the laminated cell was discharged at 25° C. until the voltage reached a termination voltage of 2.0 V. Lastly, a positive electrode capacity of 40 mAh/g was charged at 25° C. at a constant current at a rate of 0.2 C. The negative electrode at this time in which Li equivalent to a positive electrode capacity of 40 mAh/g was intercalated was a negative electrode O. After that, the laminated cell was unsealed to take out the negative electrode O.

A cell M (full cell) was fabricated using the positive electrode N and the negative electrode O. A laminated secondary battery was fabricated as the full cell. As a separator, polypropylene was used. An electrolytic solution was formed in such a manner that lithium hexafluorophosphate ($LiPF_6$) was dissolved at a concentration of 1 mol/L in a mixed solution in which ethylene carbonate (EC), diethyl carbonate (DEC), and ethylmethyl carbonate (EMC) were mixed at a volume ratio of 3:6:1.

Then, the cycle characteristics of the cell M were measured. In one cycle of a cycle test, charging until the voltage reached a termination voltage of 4.6 V and discharging until the voltage reached a termination voltage of 2.0 V were performed at 25° C. at a constant current at a rate of 0.2 C.

Figure 50:
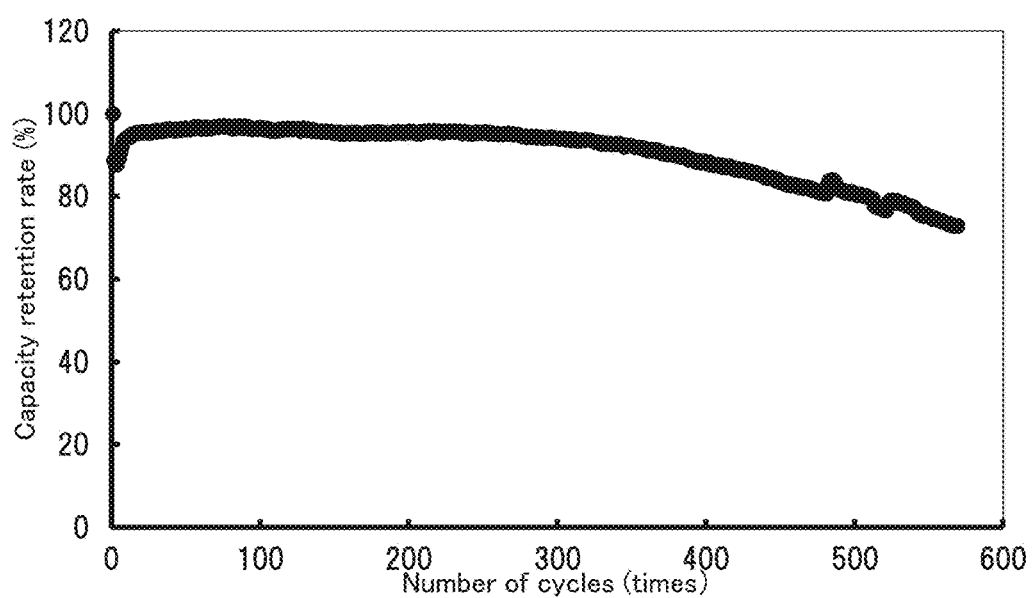
FIG. 50 shows the cycle characteristics of a cell of Example.

FIG. 50 shows the charge-discharge cycle characteristics of the cell M. In FIG. 50, a longitudinal axis represents capacity retention rate (%) and a lateral axis represents the number of cycles (times). As shown in FIG. 50, the capacity retention rate is approximately 80% even after 500 cycles, indicating that the cell M has favorable characteristics.

Example 10

In this example, measurement results of the charge and discharge characteristics of a cell fabricated using the electrode of one embodiment of the present invention will be described.

An electrode used in this example will be described.

First, a positive electrode P was formed as a positive electrode using the sample F in Example 4, under conditions similar to those of the electrode H. Note that in the positive electrode P, the compounding ratio of the sample F to AB and PVdF in the electrode binder composition was 85:5:10 (weight ratio).

Next, a half cell was fabricated using the electrode P. For the cell, a coin cell was used. Lithium was used for a counter electrode of the half cell. An electrolytic solution was formed by dissolving $LiPF_6$ as an electrolyte in a mixed solution containing EC and DEC, which are aprotic organic solvents, at a volume ratio of 1:1. As the separator, polypropylene (PP) was used.

Then, aging was performed on the fabricated half cell at 25° C. Specifically, constant current charging was performed at a rate of 0.1 C (current density of 30 mA/g) with a capacity of 150 mAh/g and constant current discharging was performed at a rate of 0.1 C with the lower voltage limit set to 2 V in the first cycle, constant current charging was performed at a rate of 0.1 C with a capacity of 180 mAh/g and constant current discharging was performed at a rate of 0.1 C with the lower voltage limit set to 2 V in the second cycle, constant current charging was performed at a rate of 0.1 C with a capacity of 210 mAh/g and constant current discharging was performed at a rate of 0.1 C with the lower voltage limit set to 2 V in the third cycle, constant current charging was performed at a rate of 0.1 C with a capacity of 240 mAh/g and constant current discharging was performed at a rate of 0.1 C with the lower voltage limit set to 2 V in the fourth cycle, and constant current charging was performed at a rate of 0.1 C with a capacity of 270 mAh/g and constant current discharging was performed at a rate of 0.1 C with the lower voltage limit set to 2 V in the fifth cycle.

Figure 51:
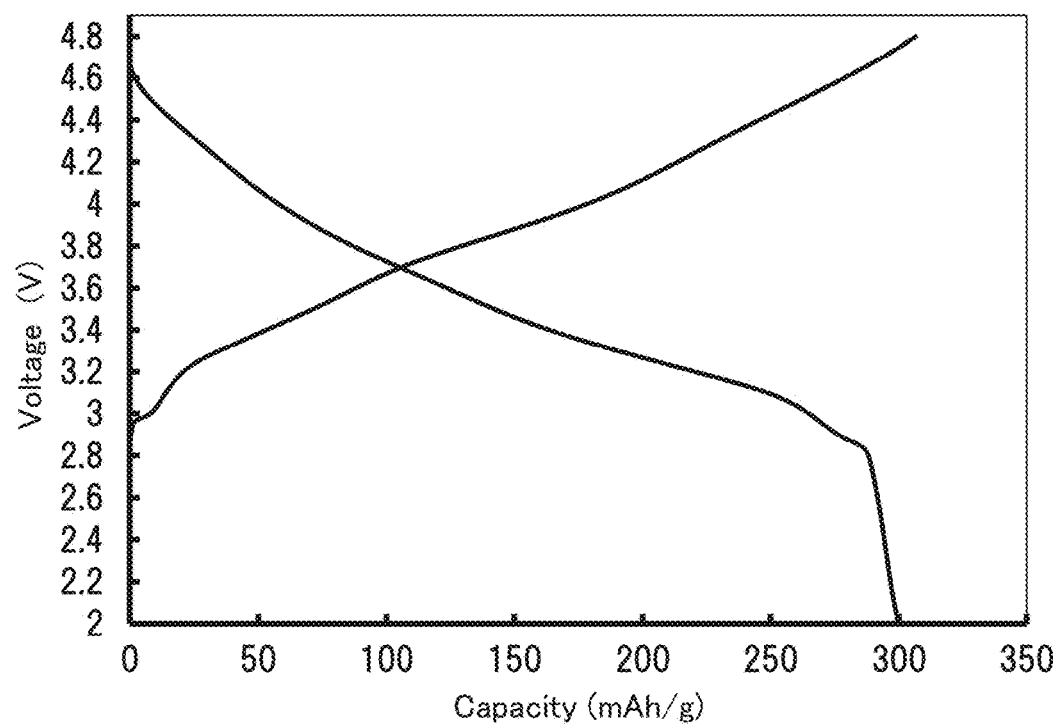
FIG. 51 shows the charge and discharge characteristics of a cell of Example.

The charge and discharge characteristics were measured at 25° C. after the above aging. Constant current charging was performed at a rate of 0.1 C with the upper voltage limit set to 4.8 V and constant current discharging was performed at a rate of 0.1 C with the lower voltage limit set to 2 V. FIG. 51 shows charge and discharge curves. In FIG. 51, a longitudinal axis represents voltage (V) and a lateral axis represents capacity (mAh/g). The results show that a high discharge capacity higher than 300 mAh/g is achieved when the active material of one embodiment of the present invention.

EXPLANATION OF REFERENCE

100: electrode, 101: current collector, 102: active material layer, 110: primary particle, 110a: particle, 110b: particle, 111: primary particle, 111a: particle, 111b: particle, 112: primary particle, 113a: particle, 120a: graphene, 120b: graphene, 121a: graphene, 122: graphene, 130a: graphene, 151: solid line, 152: solid line, 153: solid line, 300: storage battery, 301: positive electrode can, 302: negative electrode can, 303: gasket, 304: positive electrode, 305: positive electrode current collector, 306: positive electrode active material layer, 307: negative electrode, 308: negative electrode current collector, 309: negative electrode active material layer, 310: separator, 500: storage battery, 501: positive electrode current collector, 502: positive electrode active material layer, 503: positive electrode, 504: negative electrode current collector, 505: negative electrode active material layer, 506: negative electrode, 507: separator, 508: electrolyte solution, 509: exterior body, 510: the positive electrode Lead electrode, 511: negative electrode: lead electrode, 512: welding region, 513: bent portion, 514: sealing portion, 600: storage battery, 601: positive electrode cap, 602: battery can, 603: positive electrode terminal, 604: positive electrode, 605: separator, 606: negative electrode, 607: negative electrode terminal, 608: insulating plate, 609:

insulating plate, 611: PTC element, 612: safety valve mechanism, 721: two-fluid nozzle, 722: heating means, 723: spray cylinder, 724: cyclone, 725: container, 900: circuit board, 910: label, 911: terminal, 912: circuit, 913: storage battery, 914: antenna, 915: antenna, 916: layer, 917: layer, 918: antenna, 919: terminal, 920: display device, 921: sensor, 922: terminal, 951: terminal, 952: terminal, 980: storage battery, 981: film, 982: film, 990: storage battery, 991: exterior body, 992: exterior body, 993: wound body, 994: negative electrode, 995: positive electrode, 996: separator, 997: lead electrode, 998: lead electrode, 1700: curved surface, 1701: plane, 1702: curve, 1703: radius of curvature, 1704: center of curvature, 1800: center of curvature, 1801: film, 1802: radius of curvature, 1803: film, 1804: radius of curvature, 7100: portable display device, 7101: housing, 7102: display portion, 7103: operation button, 7104: power storage device, 7200: portable information terminal, 7201: housing, 7202: display portion, 7203: band, 7204: buckle, 7205: operation button, 7206: input-output terminal, 7207: icon, 7300: display device, 7304: display portion, 7400: mobile phone, 7401: housing, 7402: display portion, 7403: operation button, 7404: external connection port, 7405: speaker, 7406: microphone, 7407: power storage device, 7408: lead electrode, 7409: current collector, 8000: display device, 8001: housing, 8002: display portion, 8003: speaker portion, 8004: power storage device, 8021: charging device, 8022: cable, 8024: power storage device, 8100: lighting device, 8101: housing, 8102: light source, 8103: power storage device, 8104: ceiling, 8105: wall, 8106: floor, 8107: window, 8200: indoor unit, 8201: housing, 8202: air outlet, 8203: power storage device, 8204: outdoor unit, 8300: electric refrigerator-freezer, 8301: housing, 8302: refrigerator door, 8303: freezer door, 8304: power storage device, 8400: automobile, 8401: headlight, 8500: automobile, 9600: tablet terminal, 9625: switch, 9626: switch, 9627: power source switch, 9628: operation switch, 9629: fastener, 9630: housing, 9630a: housing, 9630b: housing, 9631: display portion, 9631a: display portion, 9631b: display portion, 9632a: region, 9632b: region, 9633: solar cell, 9634: charge and discharge control circuit, 9635: power storage unit, 9636: DCDC converter, 9637: converter, 9638: operation key, 9639: button, and 9640: movable portion.

This application is based on Japanese Patent Application serial no. 2014-097946 filed with Japan Patent Office on May 9, 2014, Japanese Patent Application serial no. 2014-105515 filed with Japan Patent Office on May 21, 2014, and Japanese Patent Application serial no. 2014-219383 filed with Japan Patent Office on Oct. 28, 2014, the entire contents of which are hereby incorporated by reference.

The invention claimed is:
1. A lithium-ion secondary battery comprising:
an electrode comprising an active material, a conductive additive, and a binder,
wherein the active material comprises a first particle having a first cleavage plane, a second particle having a second cleavage plane, and a layer containing graphene covering at least part of the first cleavage plane and at least part of the second cleavage plane,
wherein the first particle and the second particle are bound with the graphene,
wherein the graphene contains oxygen,
wherein the first particle and the second particle each contain lithium, manganese, nickel, and oxygen, and
wherein a charge and discharge capacity is greater than or equal to 260 mAh/g in the first 15 cycles with an oxidation-reduction potential of lithium used as a reference potential and a voltage range of higher than or equal to 2.0 V and lower than or equal to 4.8 V.

2. The lithium-ion secondary battery according to claim 1, wherein a proportion of oxygen in the graphene is higher than or equal to 2 atomic % and lower than or equal to 20 atomic %.

3. The lithium-ion secondary battery according to claim 1, wherein the layer containing graphene has a function of preventing oxygen deintercalation from the first particle or the second particle.

4. The lithium-ion secondary battery according to claim 1, wherein a thickness of the layer containing graphene is greater than or equal to 1 nm and less than or equal to 50 nm.

5. The lithium-ion secondary battery according to claim 1, wherein the first cleavage plane or the second cleavage plane has a crystal plane of a (001) plane or a (100) plane.

6. The lithium-ion secondary battery according to claim 1, wherein the first particle or the second particle has a layered rock-salt crystal structure.

7. The lithium-ion secondary battery according to claim 1, wherein the first particle or the second particle has a layered rock-salt crystal structure and a spinel crystal structure.

8. An electronic device comprising:
the lithium-ion secondary battery according to claim 1; and
at least one of a display device, an operation button, an external connection port, a speaker, and a microphone.

9. An active material comprising:
a first particle having a first cleavage plane;
a second particle having a second cleavage plane; and
a layer containing graphene covering at least part of the first cleavage plane and at least part of the second cleavage plane,
wherein the first particle and the second particle are bound with the graphene,
wherein the graphene contains oxygen, and
wherein the first particle and the second particle each contain lithium, manganese, nickel, and oxygen.

10. The active material according to claim 9, wherein a proportion of oxygen in the graphene is higher than or equal to 2 atomic % and lower than or equal to 20 atomic %.

11. The active material according to claim 9, wherein the layer containing graphene has a function of preventing oxygen deintercalation from the first particle or the second particle.

12. The active material according to claim 9, wherein a thickness of the layer containing graphene is greater than or equal to 1 nm and less than or equal to 50 nm.

13. The active material according to claim 9, wherein the first cleavage plane or the second cleavage plane has a crystal plane of a (001) plane or a (100) plane.

14. The active material according to claim 9, wherein the first particle or the second particle has a layered rock-salt crystal structure.

15. The active material according to claim 9, wherein the first particle or the second particle has a layered rock-salt crystal structure and a spinel crystal structure.

16. An electrode comprising the active material according to claim 9, a conductive additive, a binder, and a current collector.

17. An active material comprising:
a first particle having a first cleavage plane;
a second particle having a second cleavage plane; and
a layer containing graphene covering at least part of the first cleavage plane and at least part of the second cleavage plane, wherein the first particle and the second particle are bound with the graphene, wherein the graphene contains oxygen, and wherein the first particle and the second particle each contain lithium, vanadium, iron, and oxygen.

18. The active material according to claim 17, wherein a proportion of oxygen in the graphene is higher than or equal to 2 atomic % and lower than or equal to 20 atomic %.

19. The active material according to claim 17, wherein the layer containing graphene has a function of preventing oxygen deintercalation from the first particle or the second particle.

20. The active material according to claim 17, wherein a thickness of the layer containing graphene is greater than or equal to 1 nm and less than or equal to 50 nm.

* * * * *